US012503341B2

(12) United States Patent
Alexanian

(10) Patent No.: US 12,503,341 B2
(45) Date of Patent: Dec. 23, 2025

(54) CABIN MECHANICS OF PANORAMIC VACUUM ELEVATOR

(71) Applicant: BLISSERA CORP., Los Altos, CA (US)

(72) Inventor: Suren Alex Alexanian, Los Altos, CA (US)

(73) Assignee: Blissera Corp., Los Altos, CA (US)

( * ) Notice: Subject to any disclaimer, the term of this patent is extended or adjusted under 35 U.S.C. 154(b) by 131 days.

(21) Appl. No.: 18/134,193

(22) Filed: Apr. 13, 2023

(65) Prior Publication Data

US 2023/0249945 A1 Aug. 10, 2023

Related U.S. Application Data

(63) Continuation-in-part of application No. 17/371,019, filed on Jul. 8, 2021, now Pat. No. 12,110,208.

(Continued)

(51) Int. Cl.

*B66B 11/02* (2006.01)
*B66B 9/04* (2006.01)
*B66B 13/30* (2006.01)

(52) U.S. Cl.

CPC ............ *B66B 11/0226* (2013.01); *B66B 9/04* (2013.01); *B66B 11/0206* (2013.01); *B66B 13/30* (2013.01)

(58) Field of Classification Search

CPC ............. B66B 11/0226; B66B 11/0206; B66B 11/0005

See application file for complete search history.

(56) References Cited

U.S. PATENT DOCUMENTS 265,129 A 9/1882 Needham
3,949,953 A * 4/1976 Hopkins ................ B65G 51/06 406/185

(Continued)

FOREIGN PATENT DOCUMENTS

CN 103693529 A 4/2014
CN 104787645 A 7/2015

(Continued)

OTHER PUBLICATIONS

"Extended European search report" by European Patent Office in application No. EP21838665 (PCT/US 2021/040959), dated Oct. 18, 2023, 9 pages.

(Continued)

*Primary Examiner* — Michael A Riegelman
(74) *Attorney, Agent, or Firm* — ARLUYS IP, P.C.

(57) ABSTRACT

Techniques are described for an elevator apparatus that includes a cabin apparatus and a hoistway apparatus. In an embodiment, the cabin head apparatus of the cabin apparatus extends parallel to a cross-section of the hoistway apparatus. The air pressure in the part of the hoistway is maintained to be different from the air pressure inside the cabin apparatus and may cause the cabin apparatus to ascend or to stay steady within the hoistway apparatus. The cabin head apparatus is partially load-bearing for the cabin apparatus and any load. In an embodiment, the air pressure difference is maintained by seal(s) that are peripherally coupled to the cabin apparatus, generating an airtight connection of the cabin apparatus with an inner periphery of a cross section of the hoistway apparatus. The seals substantially prevent the air in the top portion of the hoistway apparatus from entering the bottom portion and vice versa.

22 Claims, 37 Drawing Sheets

Perspective exploded view of the Cabin

Related U.S. Application Data

(60) Provisional application No. 63/331,517, filed on Apr. 15, 2022, provisional application No. 63/049,642, filed on Jul. 9, 2020.

(56) References Cited

U.S. PATENT DOCUMENTS

| | | | | | |
|---|---|---|---|---|---|
| 4,231,148 | A * | 11/1980 | Harding | E04F 17/005 | 29/469 |
| 4,462,193 | A * | 7/1984 | Ericson | B66B 11/0253 | 411/548 |
| 4,637,176 | A * | 1/1987 | Acock, Jr. | B66B 11/004 | 52/2.17 |
| 4,650,702 | A * | 3/1987 | Whitmyer | E04B 2/92 | 52/204.593 |
| 4,703,835 | A * | 11/1987 | Negrutsky | B66B 1/04 | 254/389 |
| 4,986,041 | A * | 1/1991 | Prewer | E04F 17/005 | 52/270 |
| 5,083,639 | A * | 1/1992 | Kappeler | B66B 13/308 | 187/324 |
| 5,217,764 | A * | 6/1993 | Eich | E06B 5/165 | 52/786.13 |
| 5,220,979 | A * | 6/1993 | Matsuda | B66B 11/0226 | 187/401 |
| 5,447,211 | A * | 9/1995 | Sors | B66B 9/04 | 187/277 |
| 5,448,864 | A * | 9/1995 | Rosamond | E04C 2/546 | 52/307 |
| 5,583,326 | A * | 12/1996 | Sors | B66B 9/04 | 187/277 |
| 5,597,358 | A * | 1/1997 | Marcu | B66B 9/04 | 472/137 |
| 5,644,871 | A * | 7/1997 | Cohen | E04B 5/04 | 52/125.4 |
| 5,845,745 | A * | 12/1998 | Lane | B66B 11/0045 | 187/406 |
| 5,975,249 | A * | 11/1999 | Tomaseti | B66B 11/0206 | 187/401 |
| 6,085,873 | A * | 7/2000 | Macchi | B65G 51/04 | 187/400 |
| 6,371,249 | B1 * | 4/2002 | Schops | B66B 7/024 | 187/408 |
| 7,188,705 | B1 * | 3/2007 | Fuhrmann | A62B 1/20 | 182/48 |
| 7,918,314 | B2 * | 4/2011 | Korchagin | B65G 1/0478 | 187/239 |
| 8,544,217 | B2 * | 10/2013 | Andreini | E04C 2/54 | 52/246 |
| 8,800,724 | B1 * | 8/2014 | Foster | B66B 19/00 | 187/414 |
| 8,991,560 | B2 * | 3/2015 | Fritz | B66B 11/0005 | 187/256 |
| 9,248,995 | B2 * | 2/2016 | Ascua | F16K 7/14 | |
| 9,845,155 | B2 * | 12/2017 | Brown | B66B 11/0226 | |
| 10,106,375 | B1 * | 10/2018 | Ascua | B66B 9/04 | |
| 10,137,667 | B2 * | 11/2018 | Cleary | B32B 17/10036 | |
| 10,221,045 | B2 * | 3/2019 | Hall | B66B 13/30 | |
| 10,233,055 | B1 * | 3/2019 | Ascua | B66B 11/026 | |
| 10,351,388 | B2 * | 7/2019 | Ascua | B66B 9/04 | |
| 11,136,219 | B2 * | 10/2021 | Steiner | B66B 11/0226 | |
| 11,498,801 | B2 | 11/2022 | Derbarmdiger | | |
| 11,584,618 | B2 | 2/2023 | Hänninen | | |
| 11,919,743 | B2 * | 3/2024 | Darnley, III | B66B 11/0206 | |
| 12,110,208 | B2 * | 10/2024 | Alexanian | B32B 17/10119 | |
| 2003/0213652 | A1 * | 11/2003 | Long | B66B 15/06 | 187/349 |
| 2004/0006939 | A1 * | 1/2004 | Jobs | E04F 11/1045 | 52/235 |
| 2005/0105303 | A1 * | 5/2005 | Emde | B32B 17/10045 | 362/616 |
| 2007/0170013 | A1 * | 7/2007 | Rivera | B66B 7/024 | 187/408 |
| 2008/0011546 | A1 * | 1/2008 | Korchagin | B65G 1/0407 | 187/239 |
| 2009/0070131 | A1 * | 3/2009 | Chen | E04H 1/005 | 52/741.1 |
| 2010/0300010 | A1 * | 12/2010 | Vallejo | E04B 1/3211 | 52/741.11 |
| 2011/0232226 | A1 * | 9/2011 | Geyer | E04C 3/30 | 52/831 |
| 2011/0266413 | A1 * | 11/2011 | Fritz | E04F 17/005 | 248/669 |
| 2014/0305749 | A1 * | 10/2014 | Manner | B66B 11/0226 | 187/401 |
| 2015/0183619 | A1 * | 7/2015 | Oh | B66B 11/006 | 414/277 |
| 2017/0113899 | A1 * | 4/2017 | Hettema | B66B 3/02 | |
| 2017/0137262 | A1 * | 5/2017 | Miller | A47H 23/02 | |
| 2018/0050887 | A1 * | 2/2018 | Hall | B66B 13/30 | |
| 2018/0127242 | A1 * | 5/2018 | Witczak | B66B 11/0005 | |
| 2018/0283727 | A1 * | 10/2018 | Grabon | B66B 11/00 | |
| 2019/0367327 | A1 * | 12/2019 | Kallio | B66B 7/024 | |
| 2020/0071221 | A1 * | 3/2020 | Willis | E04C 2/02 | |
| 2020/0115190 | A1 * | 4/2020 | Xiong | B66B 7/024 | |
| 2020/0217087 | A1 * | 7/2020 | Greschbach | B66B 11/0005 | |
| 2021/0179388 | A1 * | 6/2021 | Darnley, III | B66B 11/0226 | |
| 2021/0331893 | A1 | 10/2021 | Thum | | |
| 2022/0009747 | A1 * | 1/2022 | Alexanian | C03C 21/002 | |
| 2022/0055862 | A1 * | 2/2022 | Wang | B66B 19/00 | |
| 2022/0274804 | A1 * | 9/2022 | Li | E04B 1/5831 | |
| 2023/0249945 | A1 * | 8/2023 | Alexanian | B66B 11/0005 | 187/250 |
| 2025/0026612 | A1 * | 1/2025 | Alexanian | B32B 7/12 | |

FOREIGN PATENT DOCUMENTS

| | | | |
|---|---|---|---|
| CN | 106044486 | A * | 10/2016 |
| DE | 202015006773 | U1 | 1/2016 |
| EP | 1197464 | A2 | 4/2002 |
| KR | 20110053443 | A * | 5/2011 |
| RU | 10745 | U1 | 8/1999 |
| RU | 49809 | U1 | 12/2005 |
| WO | 99/64692 | A1 | 12/1999 |
| WO | 2015033363 | A1 | 3/2015 |
| WO | 2020021243 | A1 | 1/2020 |

OTHER PUBLICATIONS

Esat Yildiz, "Vacuum, elevator home lift, disabled lift, fast track installation vakumlu asansör", Jan. 30, 2018, retrieved from the Internet (URL: https://www.youtube.com/watch?v =- IIL08VPnE8) Oct. 6, 2023, 2 page.

"PCT International Search Report" by the US Patent and Trademark Office (US) in application No. PCT/US 23/18461, dated Jul. 28, 2023, 2 pages.

International Claims examined by the US Patent and Trademark Office (US) in application No. PCT/US 23/18461, Apr. 2023, 5 pages.

"PCT International Search Report" by Federal Institute of Industrial Property (RU) in application No. PCT/US 2021/040959, dated Oct. 21, 2021, 3 pages.

International Claims examined by Federal Institute of Industrial Property (RU) in application No. PCT/US 2021/040959, Oct. 2021, 5 pages.

U.S. Appl. No. 17/371,019, filed Jul. 8, 2021, Final Office Action mailed Apr. 23, 2024.

Non-Final Office Action in U.S. Appl. No. 17/371,019 mailed on Dec. 15, 2023.

U.S. Appl. No. 17/371,019, filed Jul. 8, 2021, Notice of Allowance, Aug. 28, 2024.

"Extended European Search Report" by European Patent Office (EPO) in application No. 23788936.5-1015/4507992 PCT/US202301846, dated Mar. 7, 2.

(56) References Cited

OTHER PUBLICATIONS

International Claims examined by European Patent Office (EPO) in application No. 23788936.5-1015/4507992 PCT/US202301846, dated Mar. 7, 2025, 5 pages.

* cited by examiner

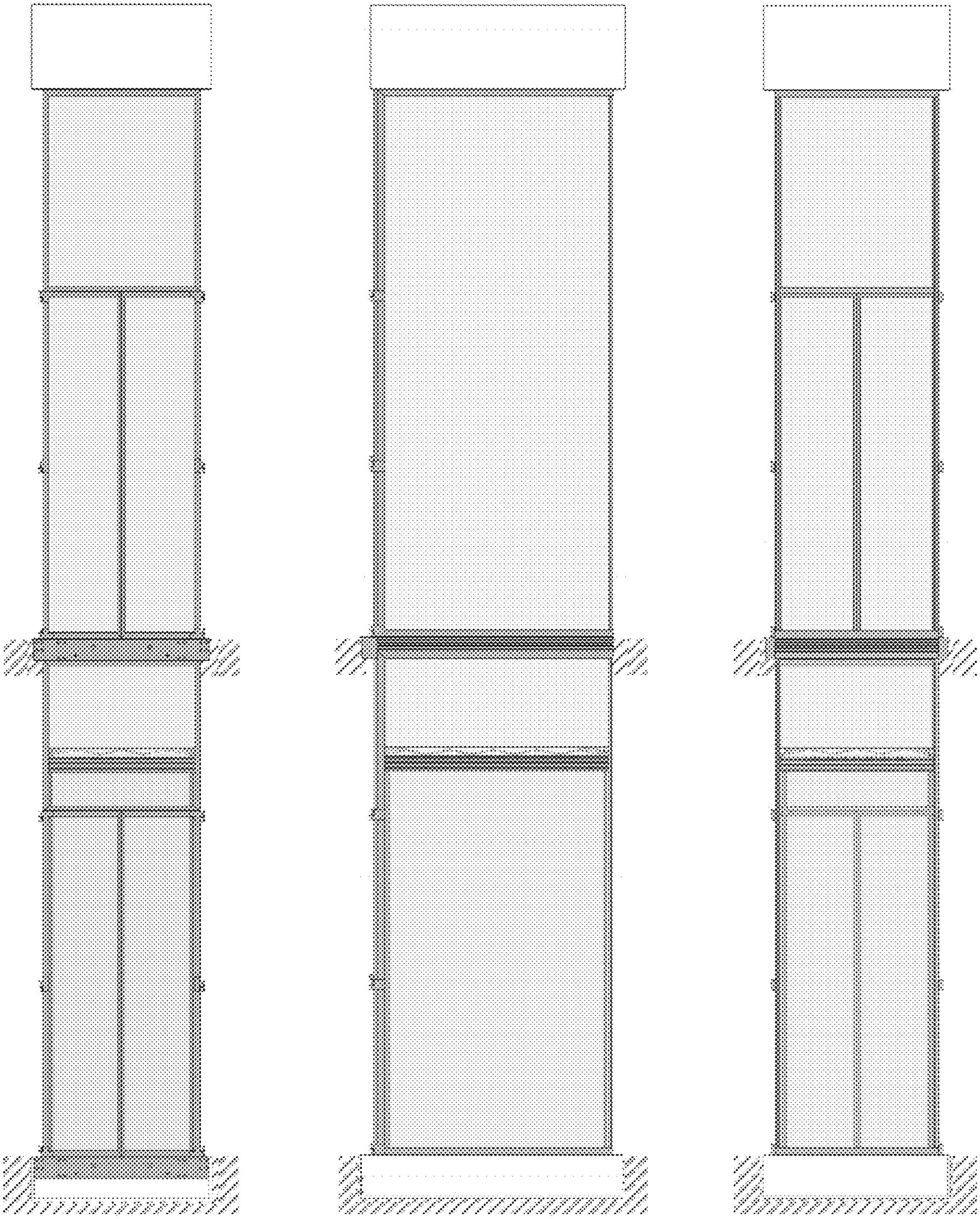
FIG. 1. Front, side and back views of a 2-story Blissera Elevator system

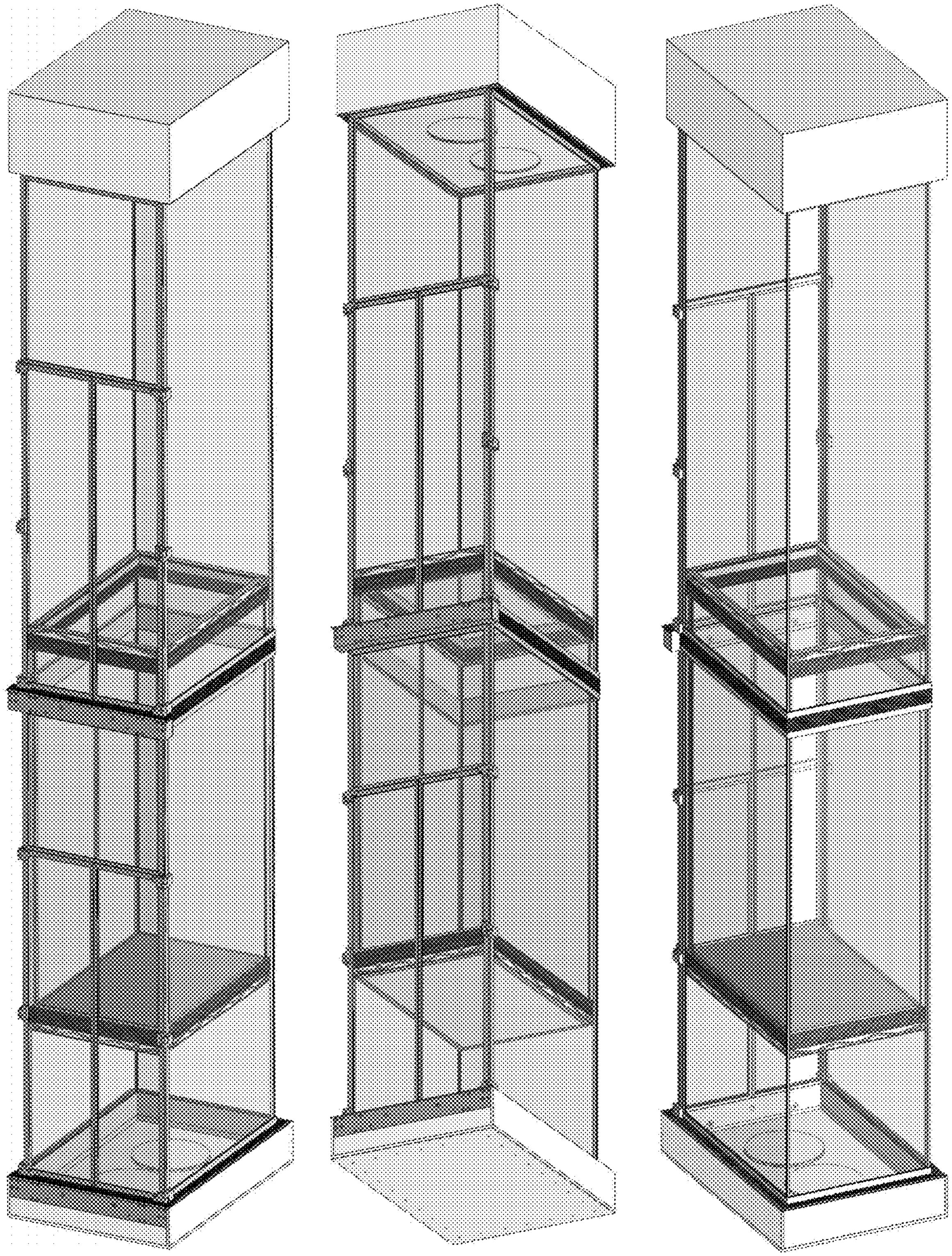
FIG. 2. Perspective views of a 2-story Blissera Elevator system with Cabin in motion

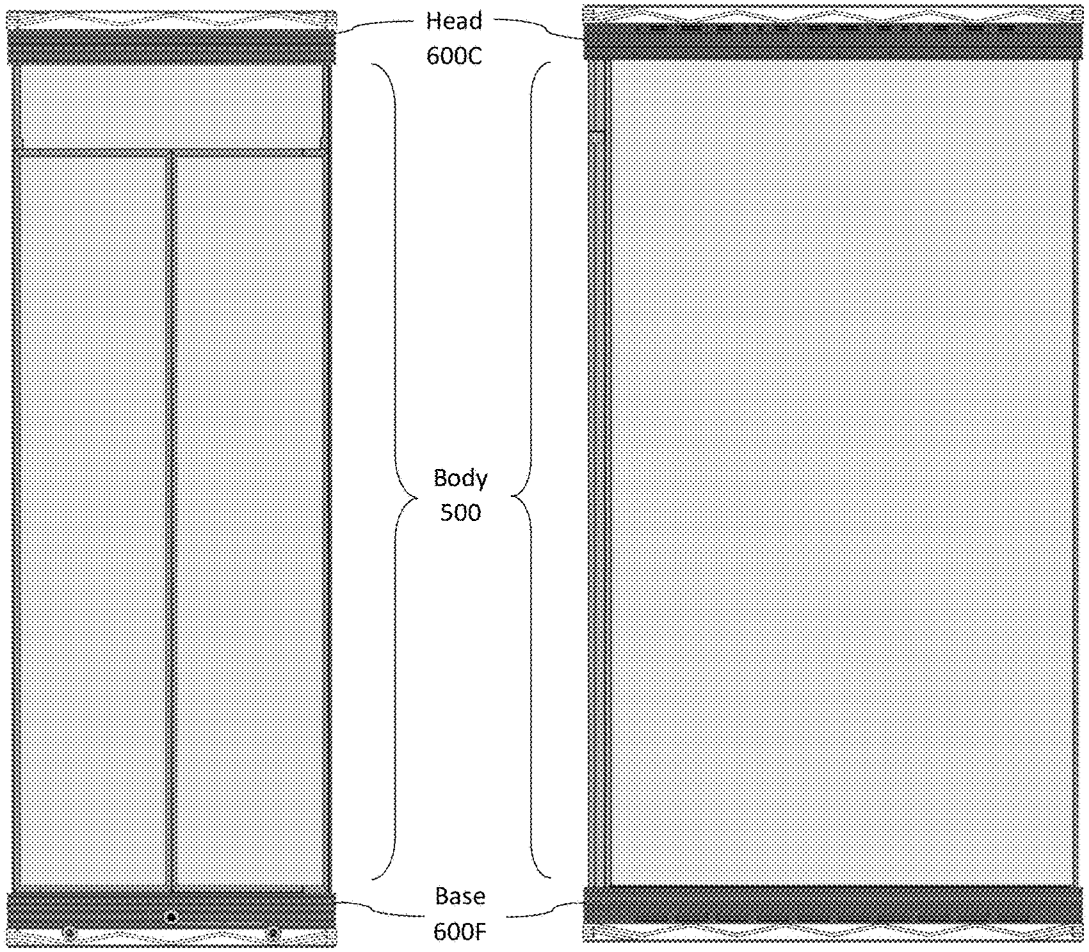
FIG. 3. Front and side views of the Cabin
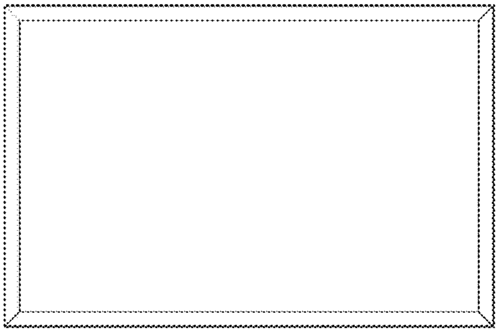
FIG. 4. Bottom view of the Cabin
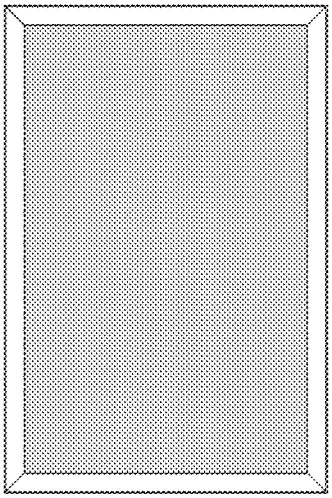
FIG. 5. Top view of the Cabin

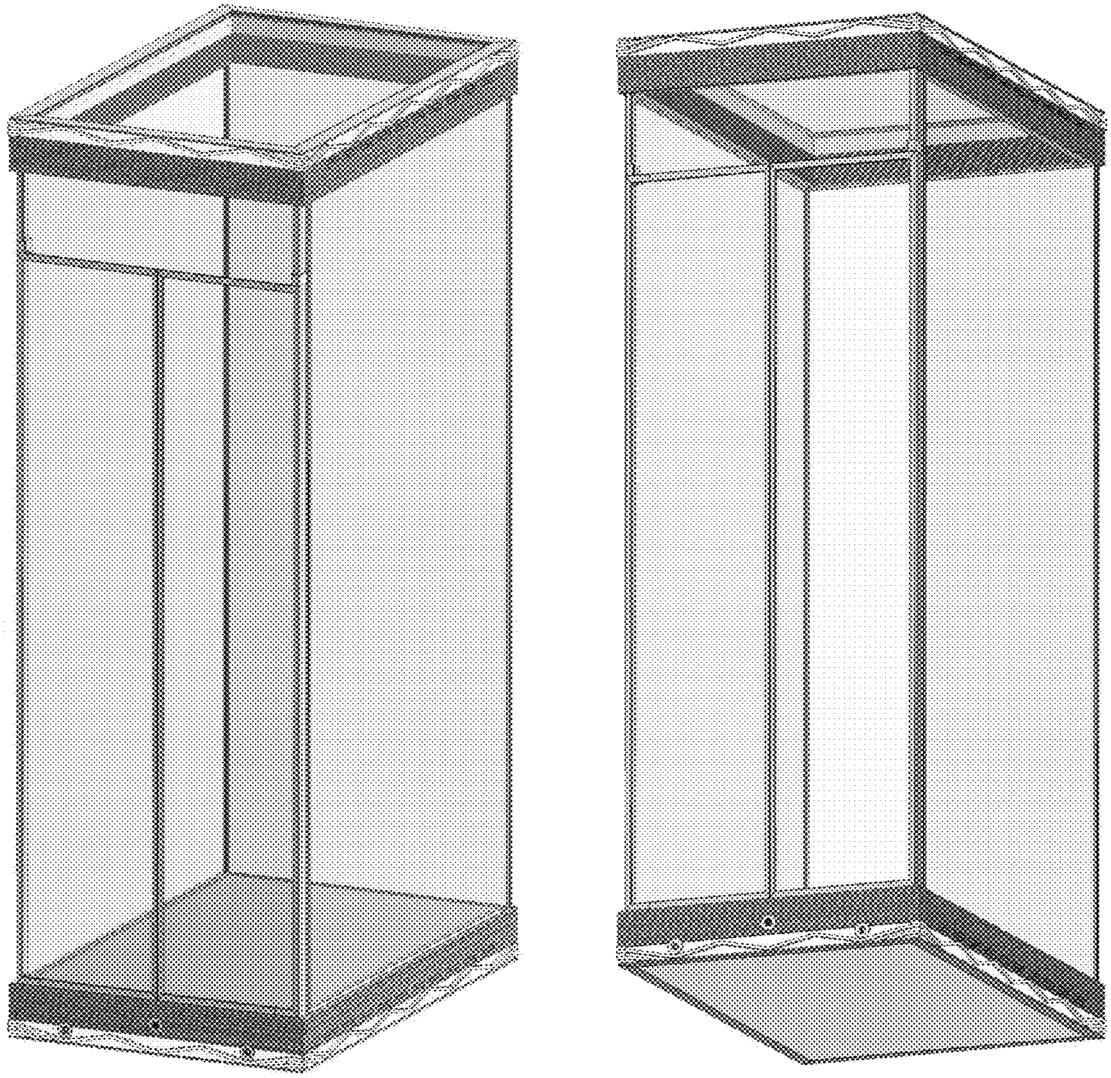
FIG. 6. Perspective upper front and lower front views of the Cabin
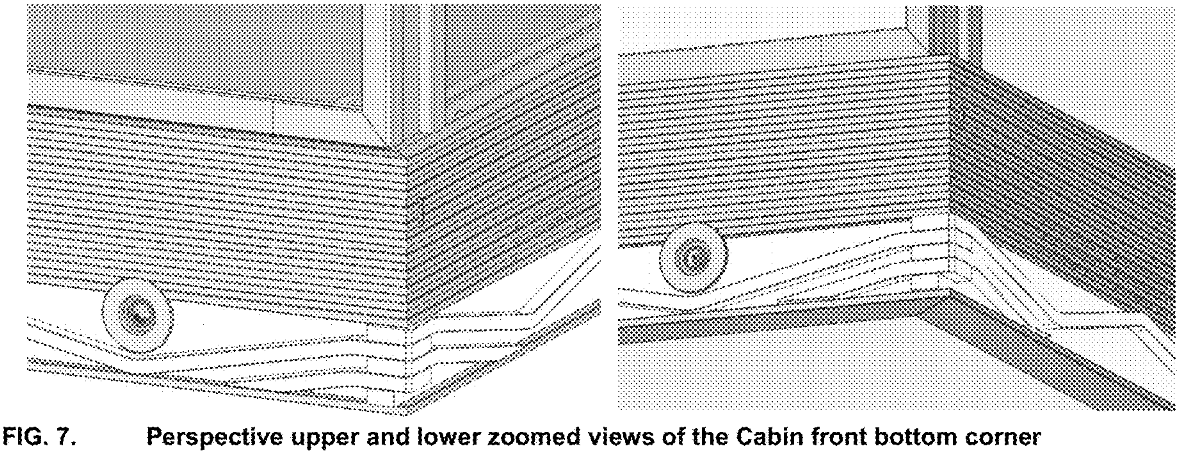
FIG. 7. Perspective upper and lower zoomed views of the Cabin front bottom corner

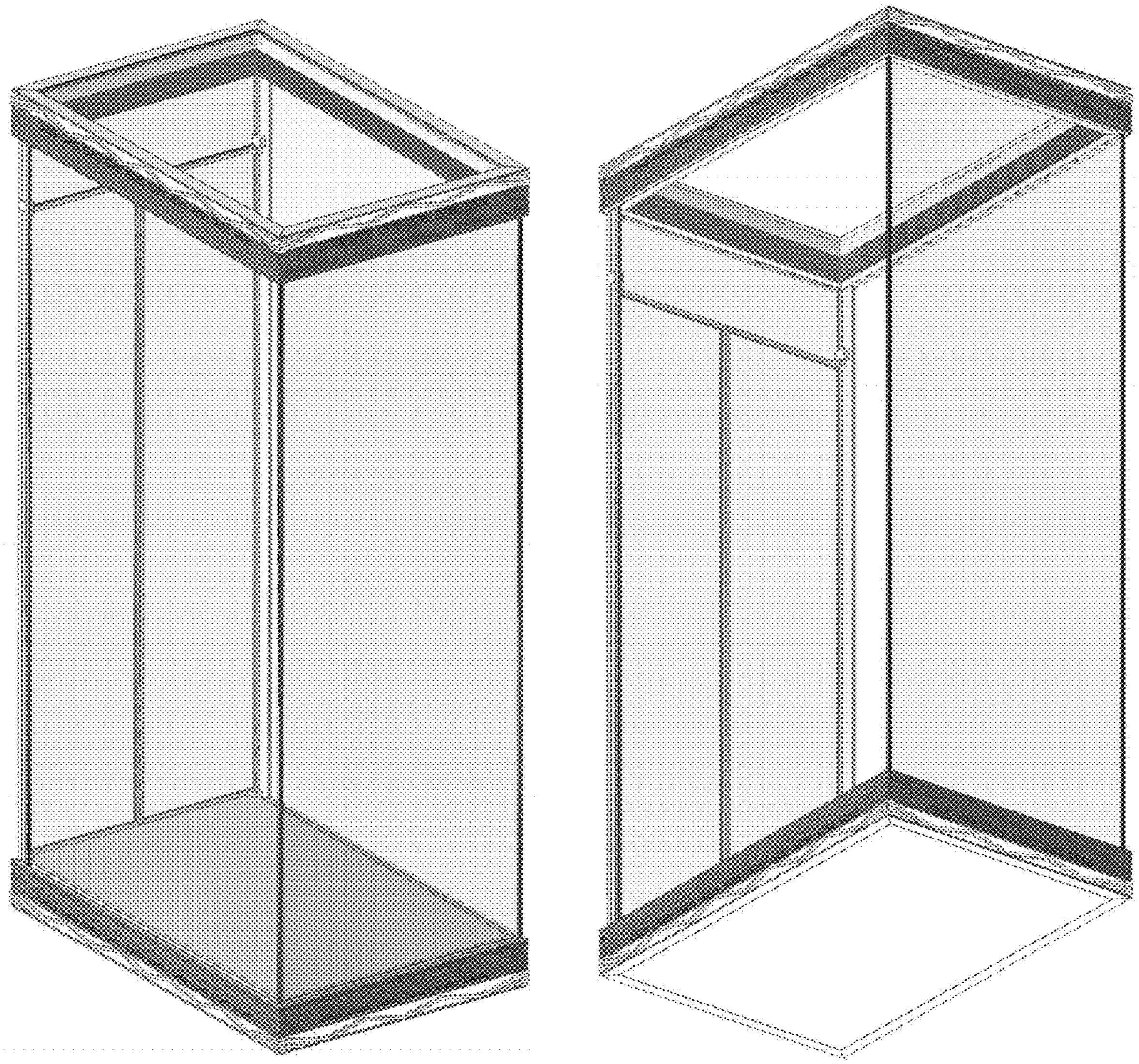
FIG. 8. Perspective upper back and lower back views of the Cabin
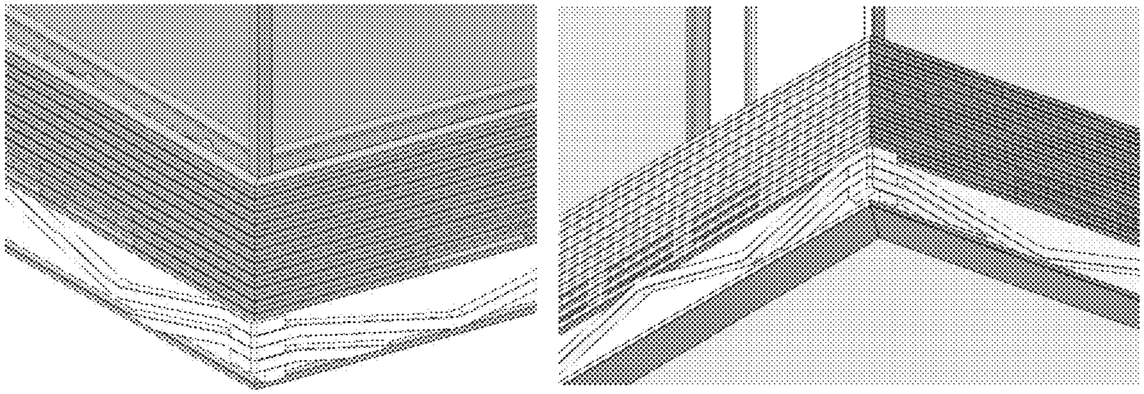
FIG. 9. Perspective upper and lower zoomed views of the Cabin back bottom corner

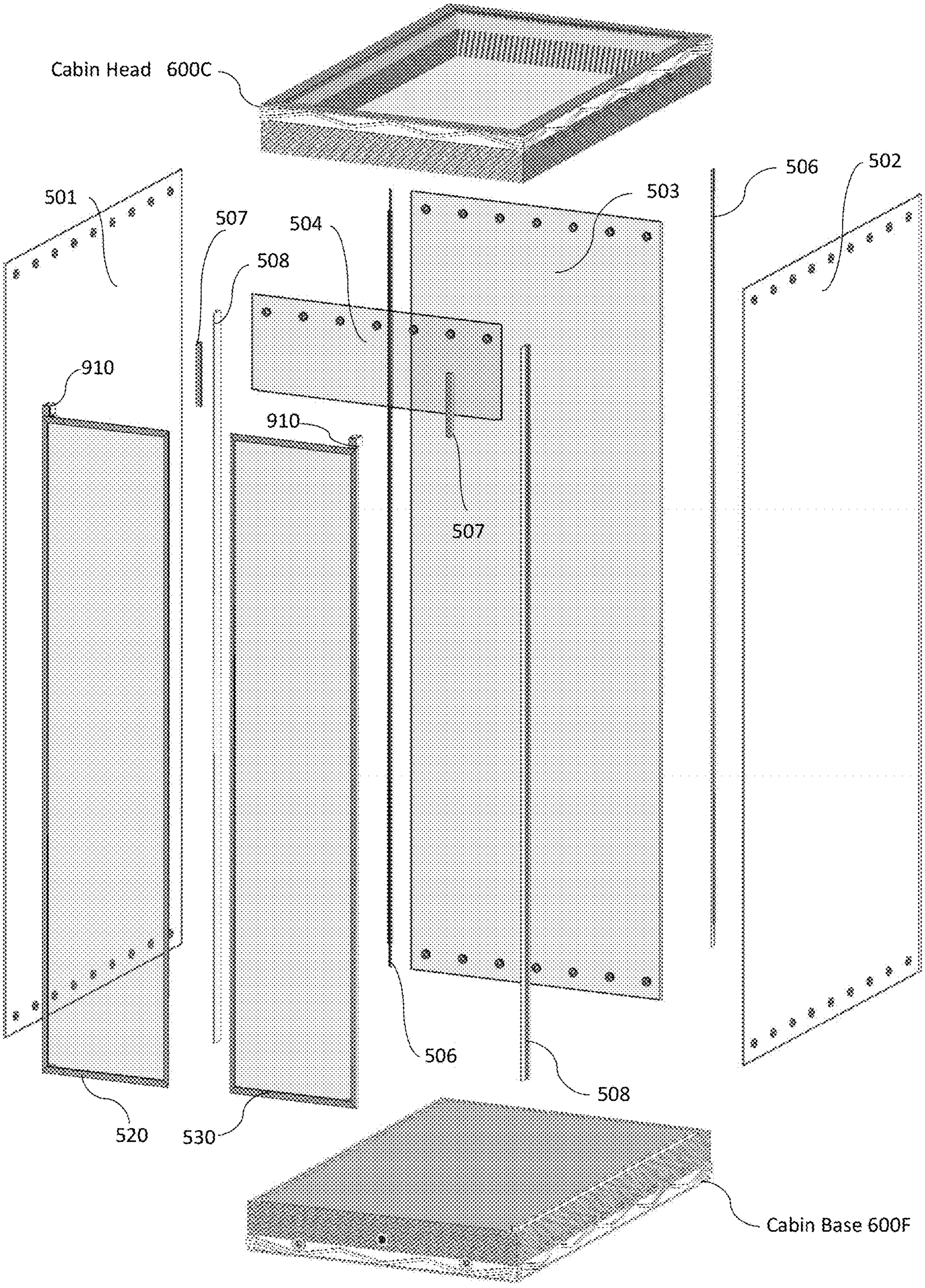
FIG. 10. Perspective exploded view of the Cabin

Cabin Body 500
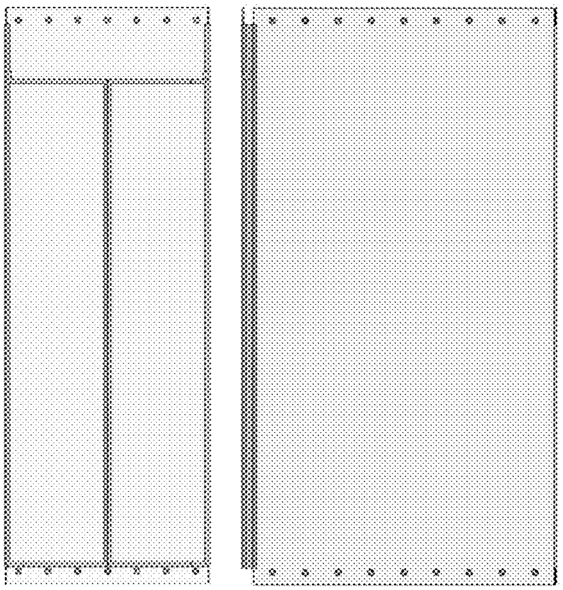
FIG. 11. Front and side views of the Cabin Body
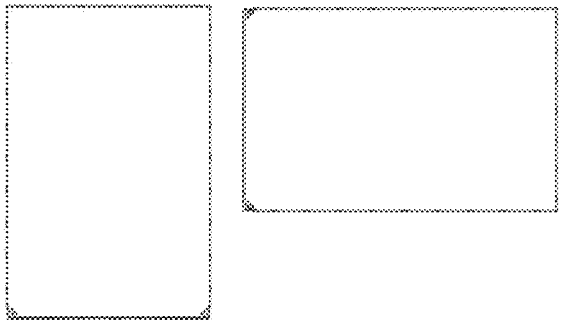
FIG. 12. Top and bottom views of the Cabin Body
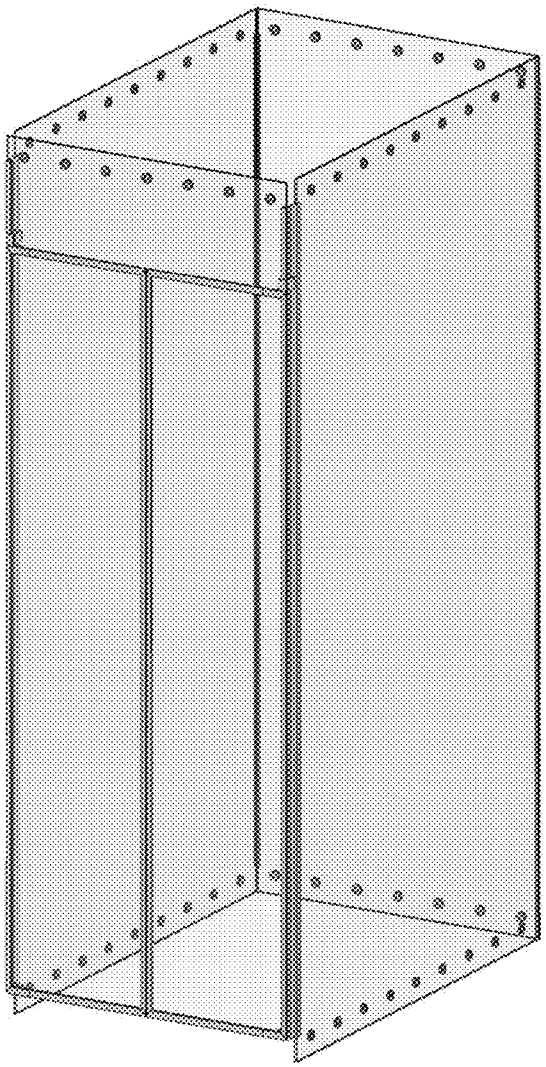
FIG. 13. Perspective view of the Cabin Body

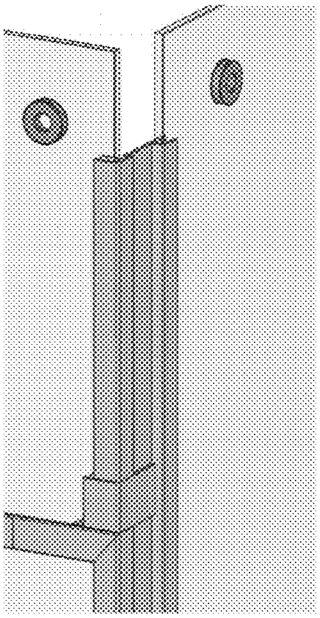

FIG. 14. Perspective view of the Cabin upper hinge front angle

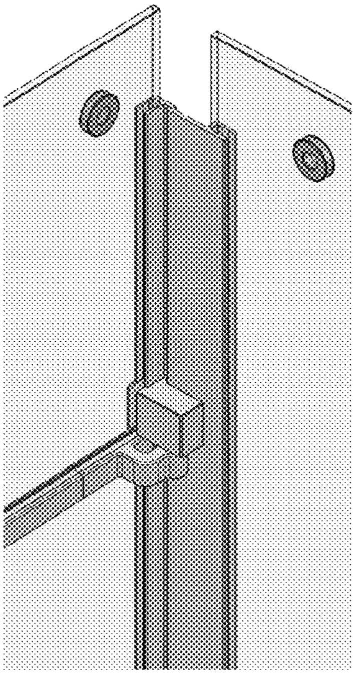

FIG. 15. Perspective view of the Cabin upper hinge back angle

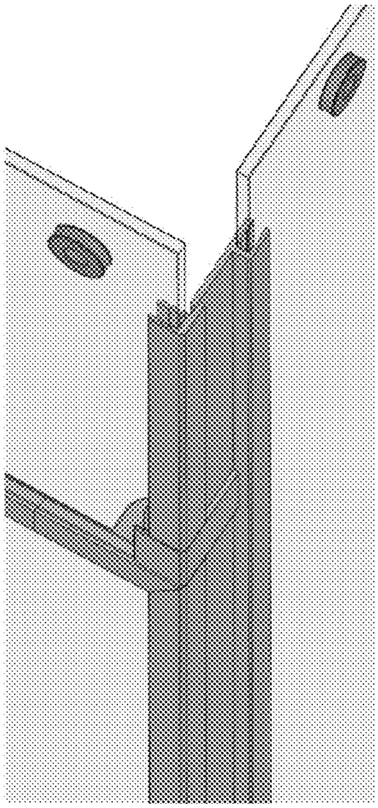

FIG. 16. Perspective view of the Cabin upper hinge top angle

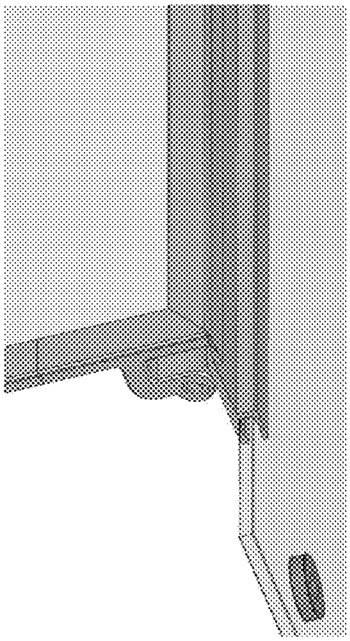

FIG. 19. Front angle perspective view of the Cabin lower hinge

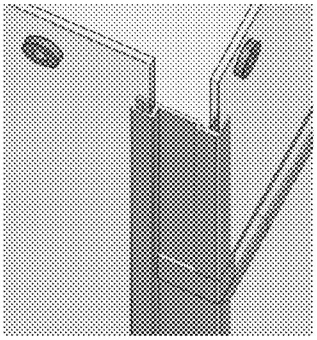

FIG. 17. Perspective view of the Cabin upper hinge side angle

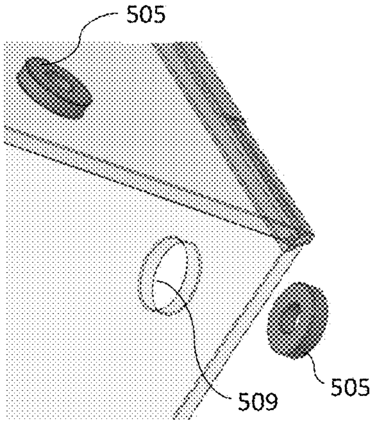

FIG. 18. Bottom perspective back corner view of Cabin Body with exploded glass link

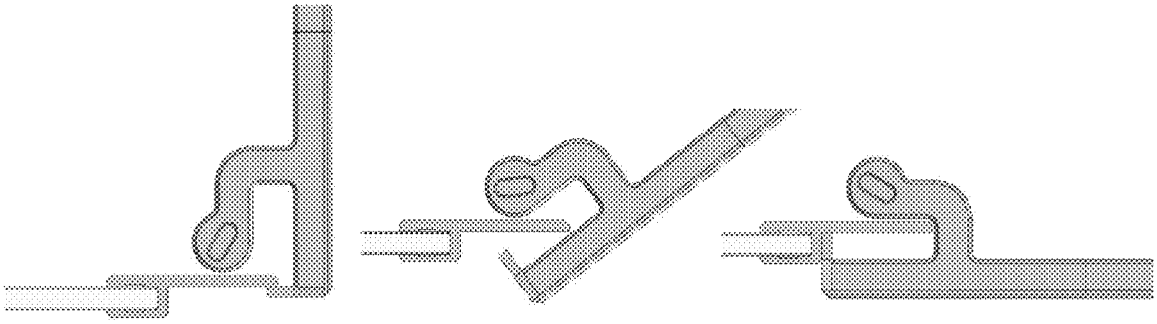
FIG. 20. Cabin door hinge position in closed, half-open and open states
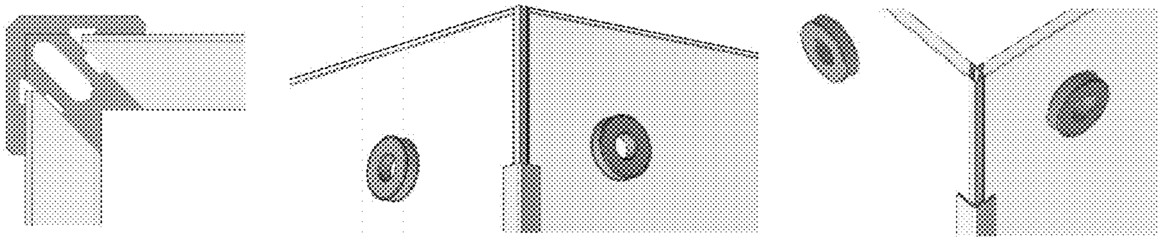
FIG. 21. Top and perspective views of the Cabin Body back corner
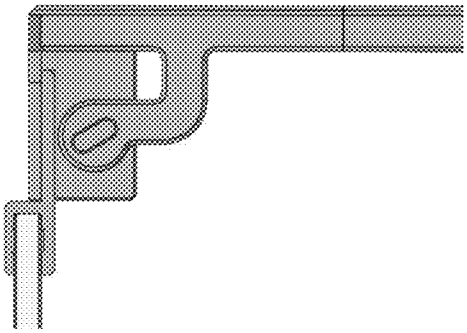
FIG. 22. Top view of the front and back corners of the Cabin Body
FIG. 23. Bottom view of the Cabin lower hinge (up)
FIG. 24. Front perspective zoomed view of the Cabin doors middle connection (right)
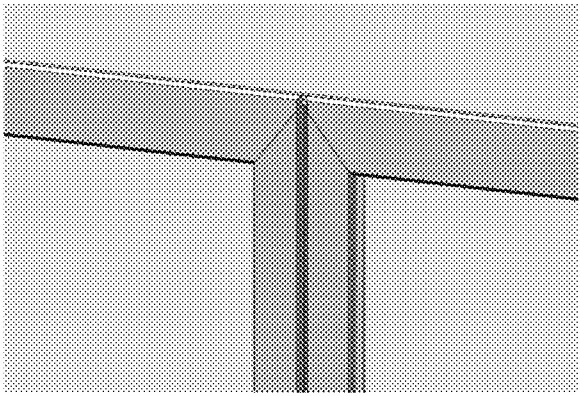

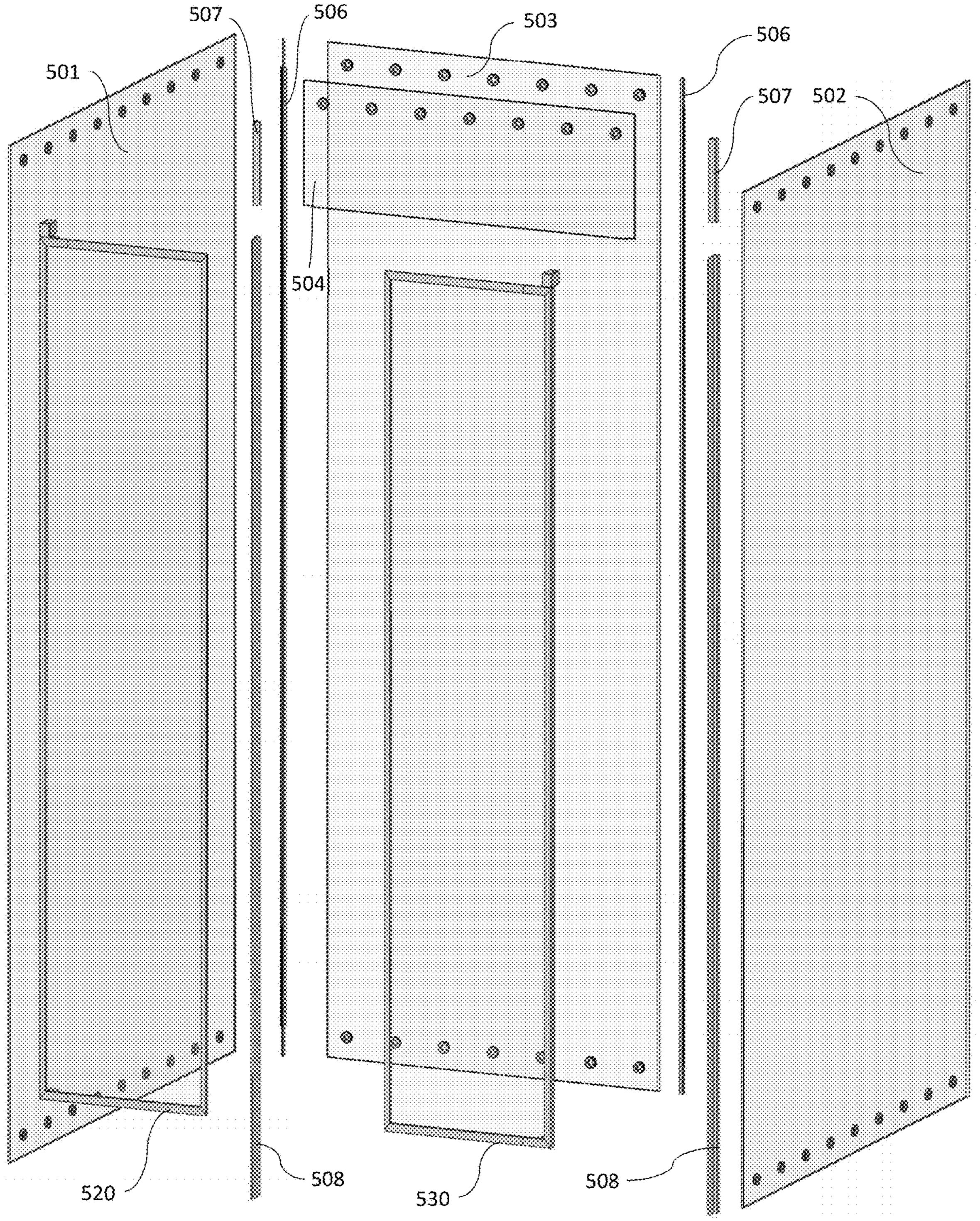
FIG. 25. Front perspective exploded view of the Cabin Body

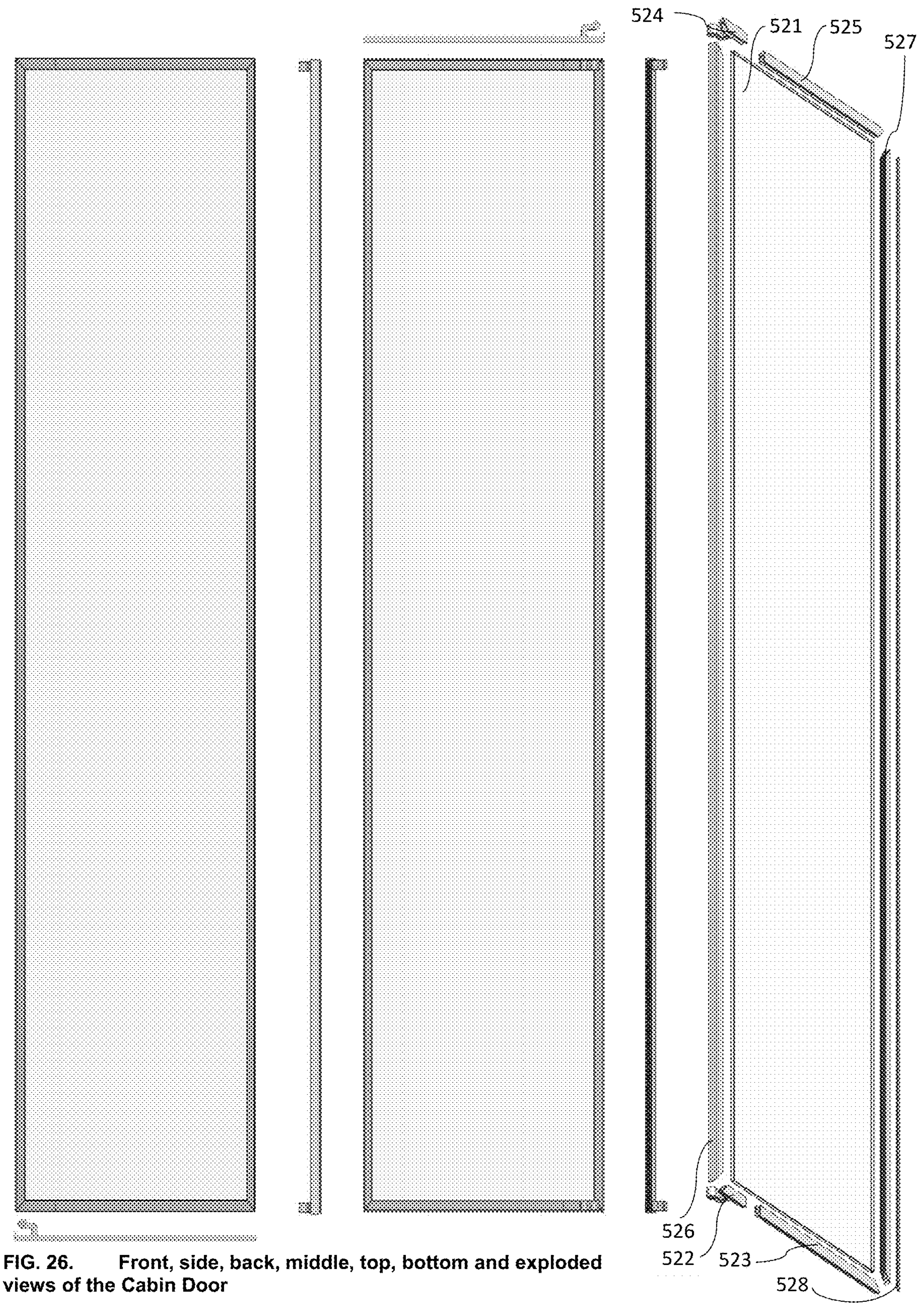
FIG. 26. Front, side, back, middle, top, bottom and exploded views of the Cabin Door

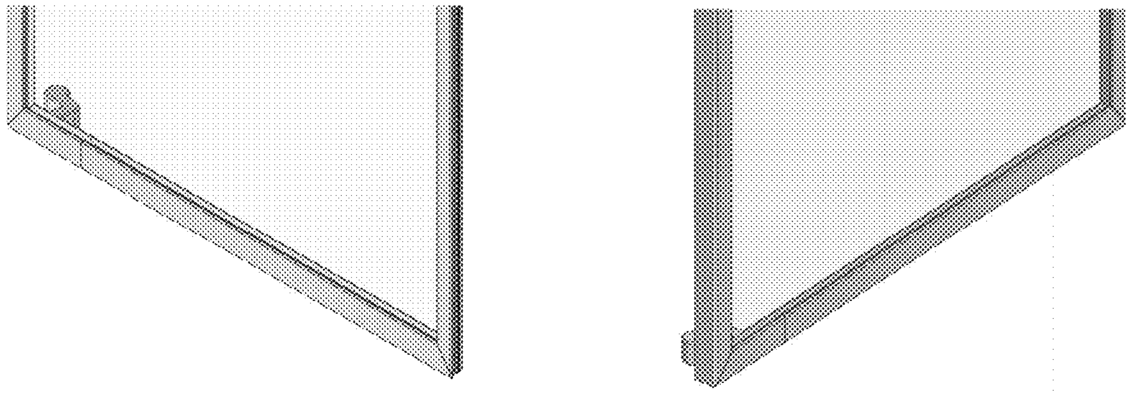
FIG. 27. Top front perspective views of the Cabin Door lower edge
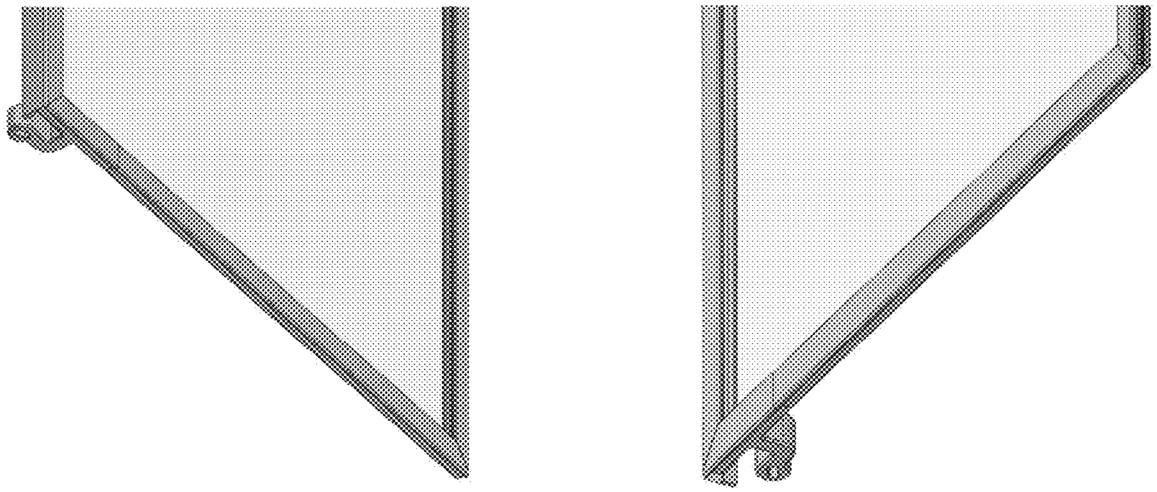
FIG. 28. Bottom front perspective views of the Cabin Door lower edge
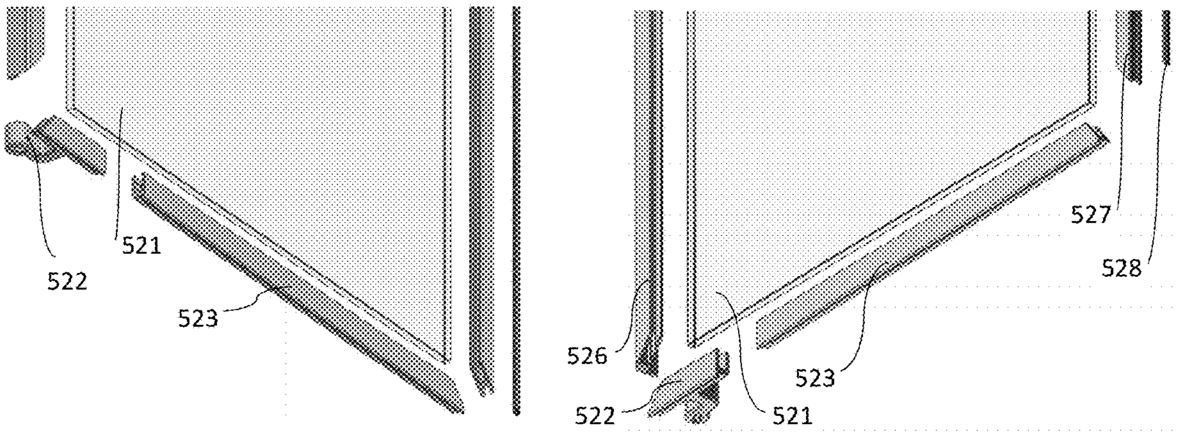
FIG. 29. Bottom front exploded views of the Cabin Door lower edge

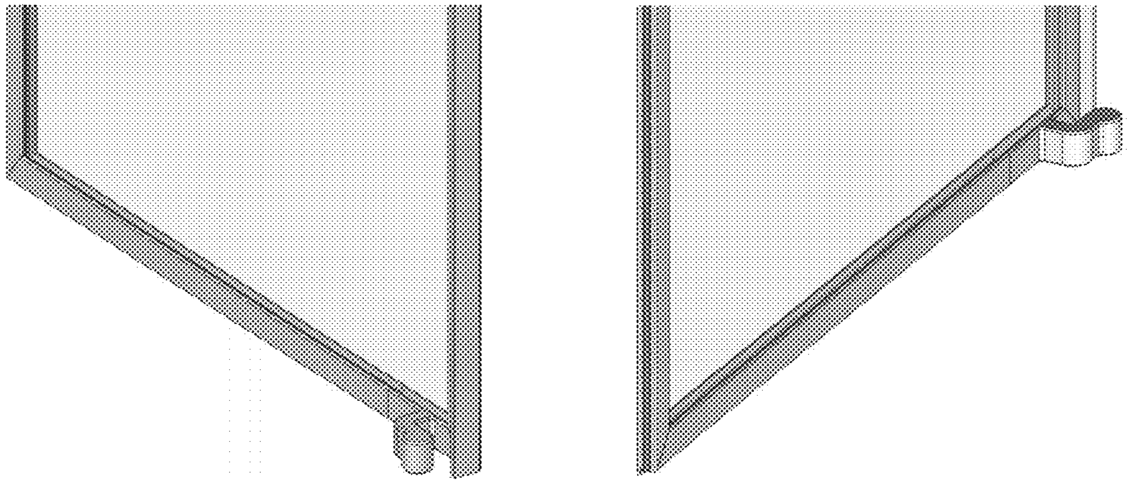
FIG. 30. Top back perspective views of the Cabin Door lower edge
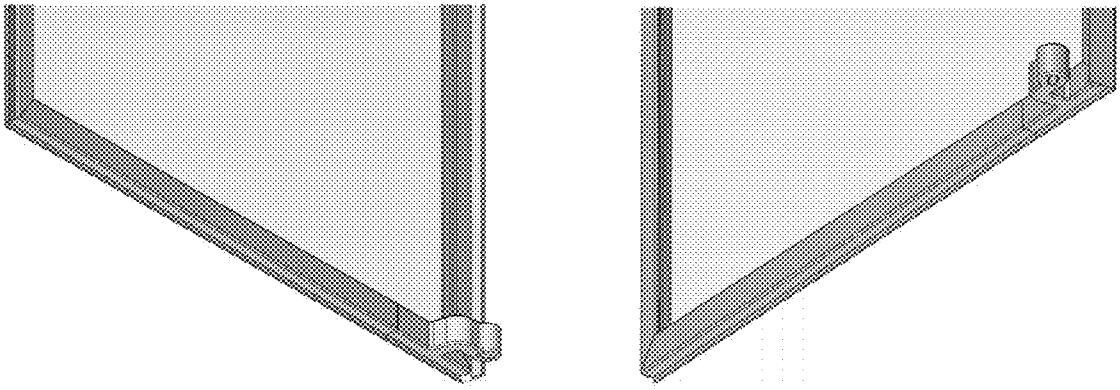
FIG. 31. Bottom back perspective views of the Cabin Door lower edge
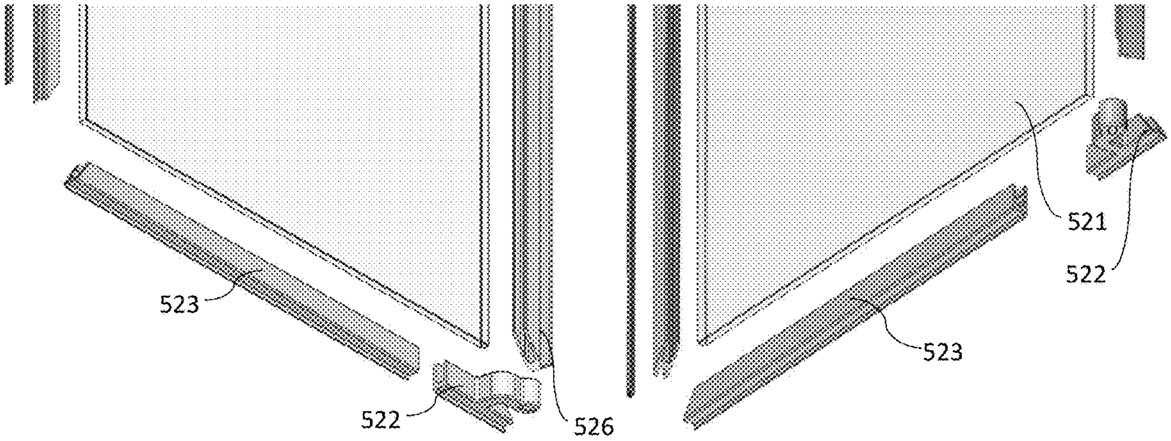
FIG. 32. Bottom back exploded views of the Cabin Door lower edge

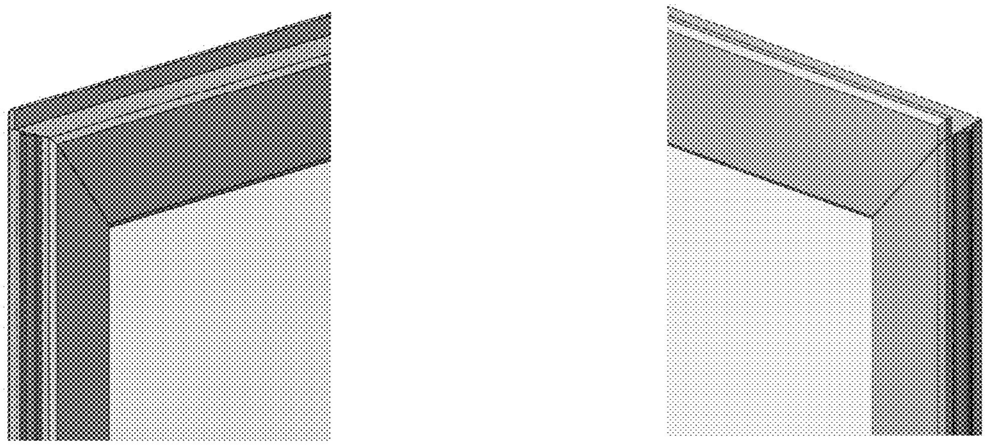
FIG. 33. Top perspective views of the Cabin Door middle side upper corner
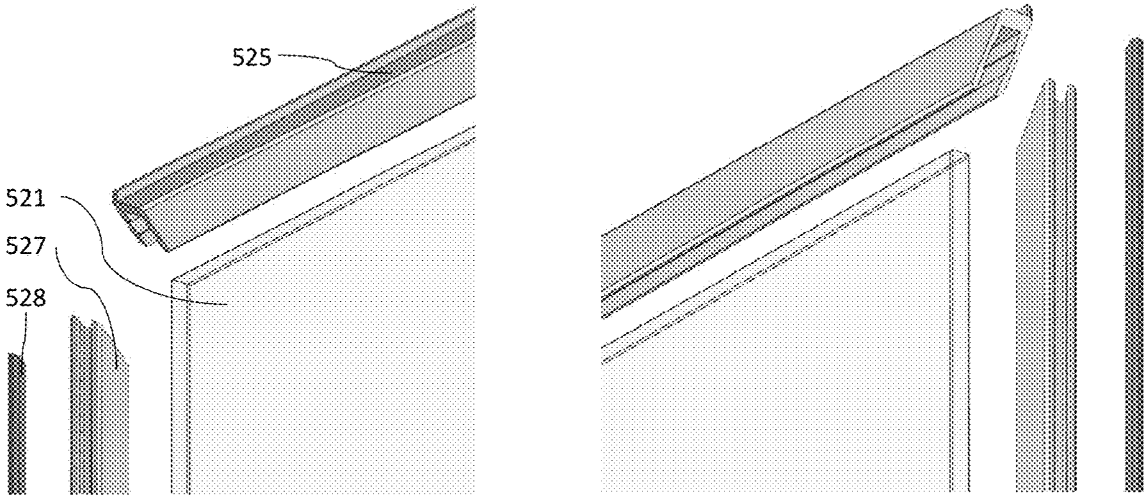
FIG. 34. Front and back exploded views of the Cabin Door middle edge upper corner
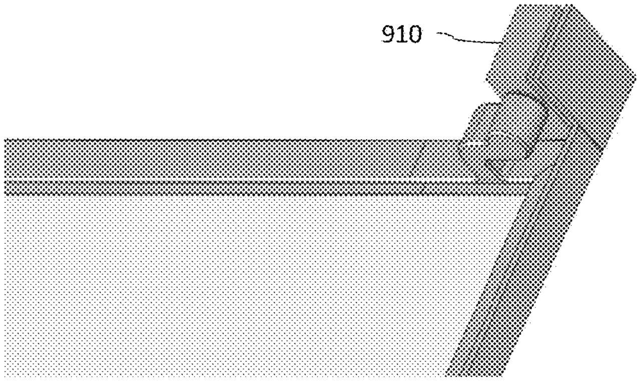
FIG. 35. Back perspective view of the Cabin Door upper hinge
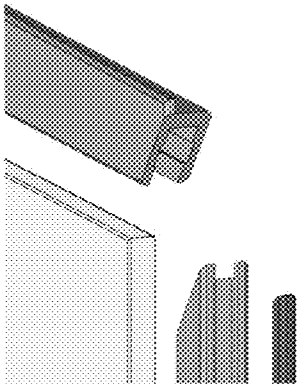
FIG. 36. Top front exploded view of the Cabin Door middle edge upper corner

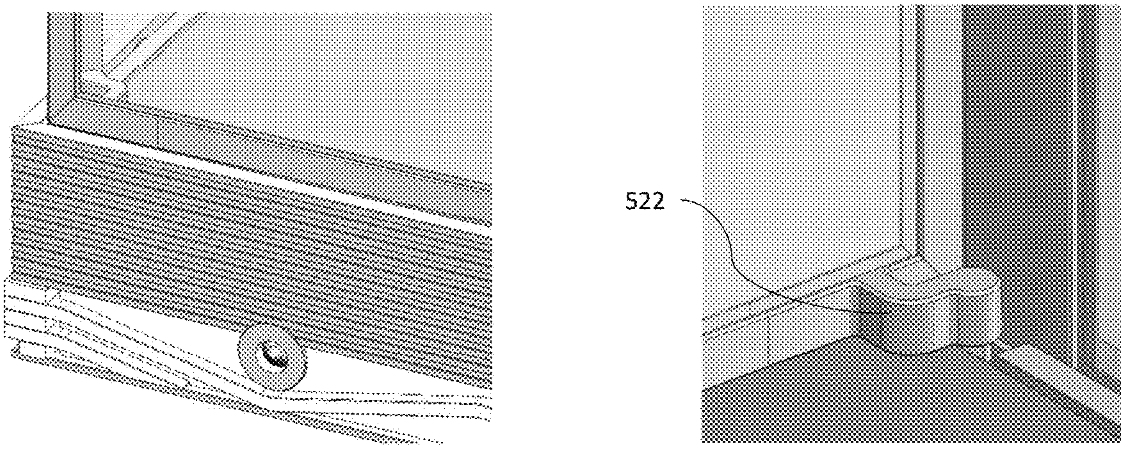
FIG. 37. Perspective zoomed views of the Cabin door lower hinge
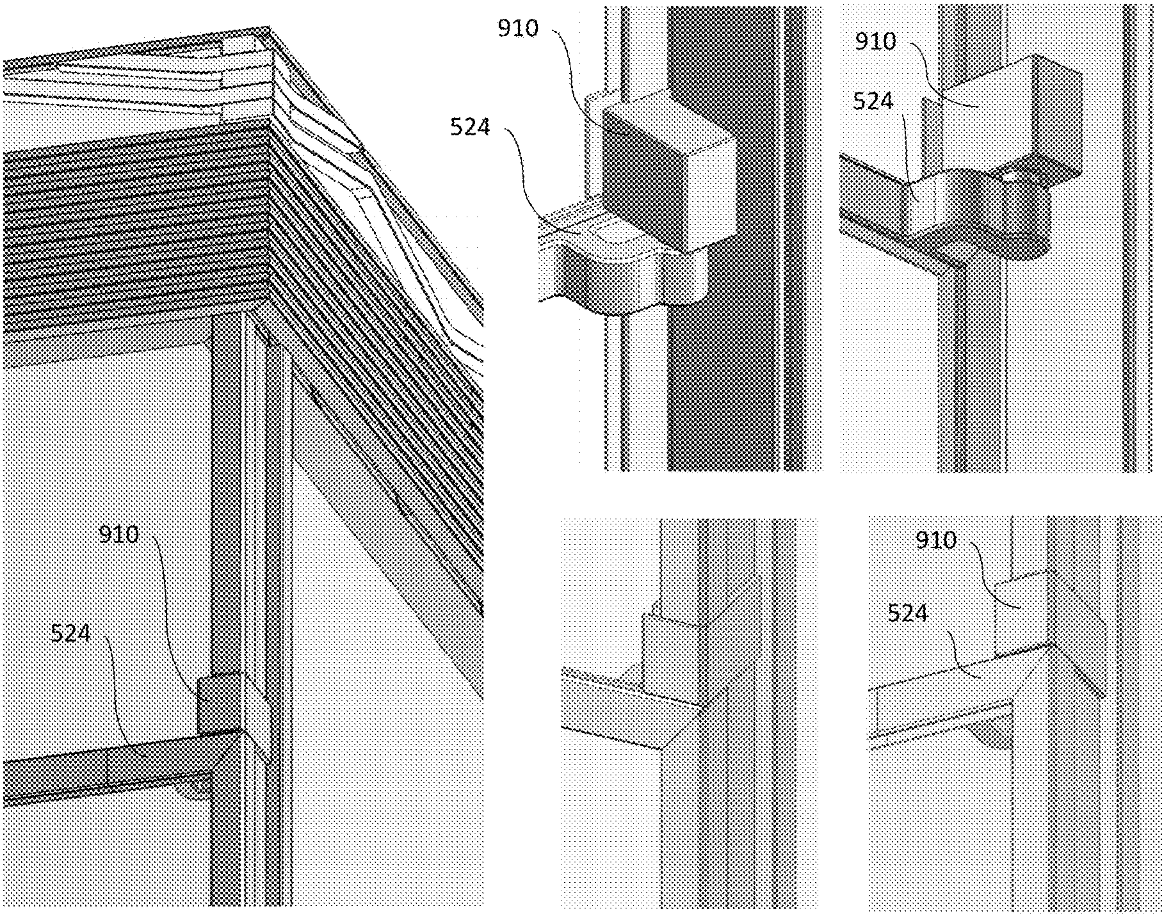
FIG. 38. Perspective zoomed views of the Cabin door upper hinge

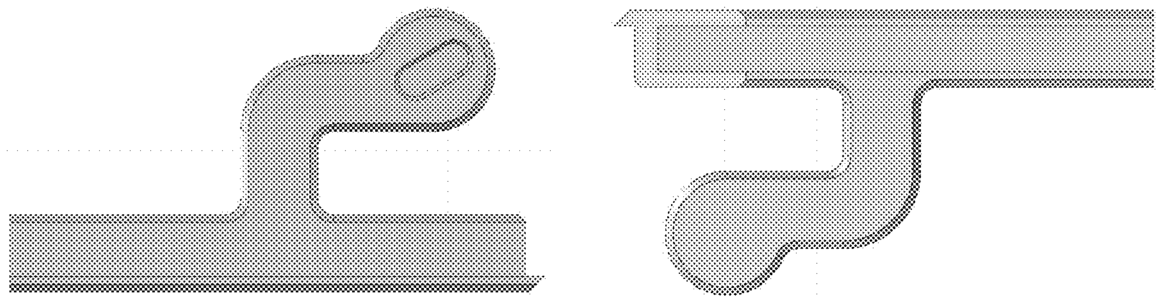
FIG. 39. Top and bottom views of the Cabin Door hinge
FIG. 40. Front and back views of the Cabin Door hinge
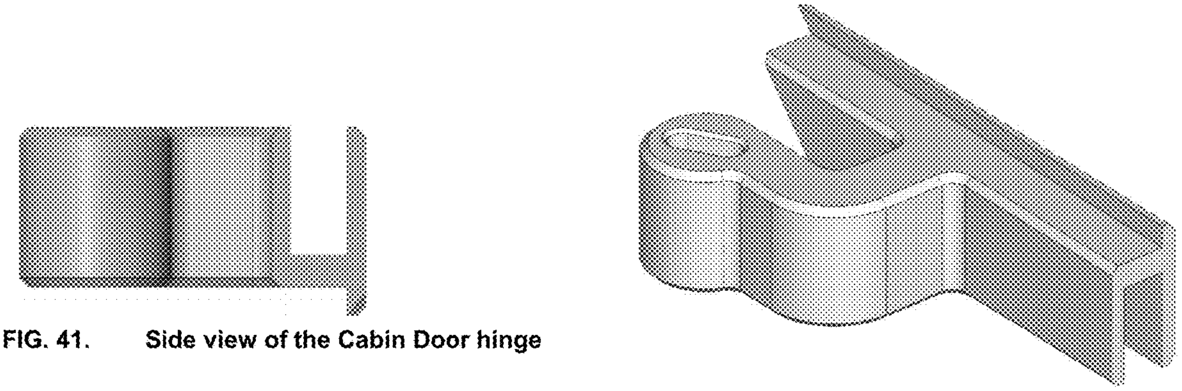
FIG. 41. Side view of the Cabin Door hinge
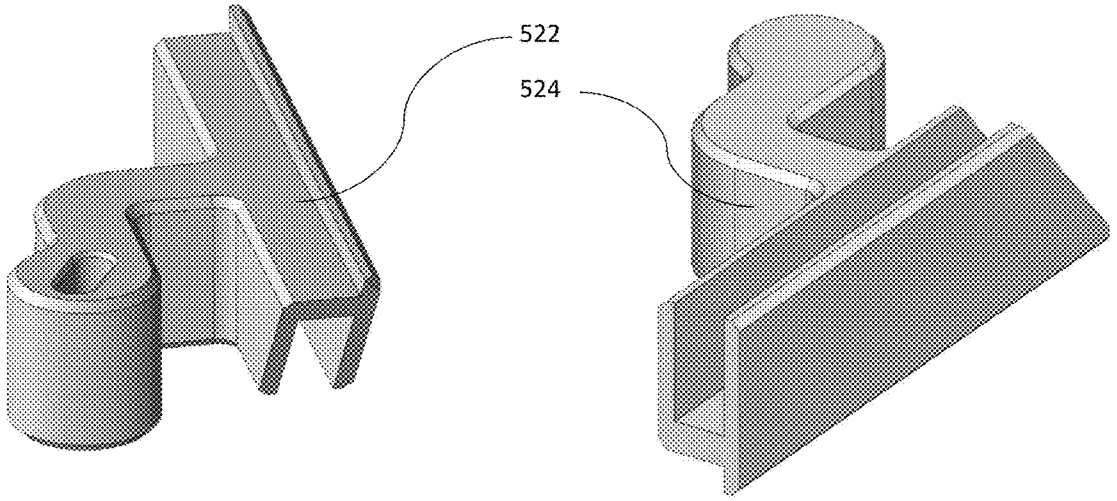
FIG. 42. Various perspective views of the Cabin Door hinge

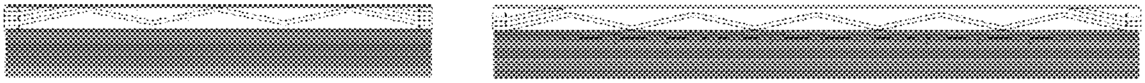
FIG. 43. Front and side views of the Cabin Head Frame
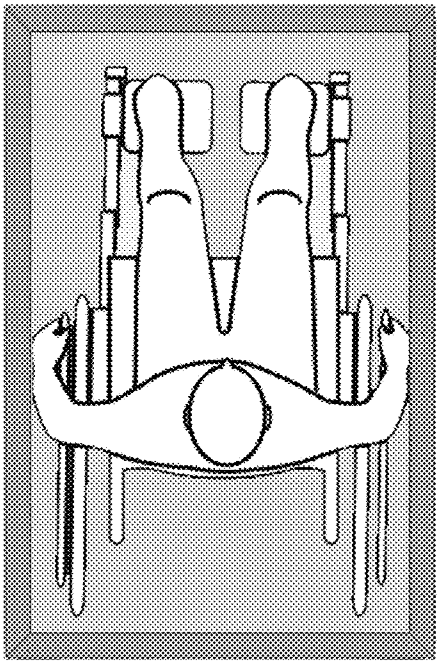
FIG. 46. Top view of the Cabin Head Frame (with a full-size wheelchair in the Cabin)
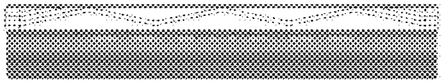
FIG. 44. Back view of the Cabin Head Frame
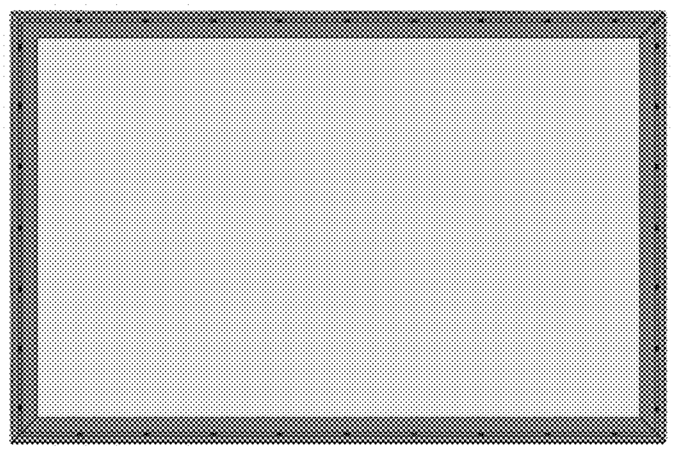
FIG. 45. Bottom view of the Cabin Head Frame
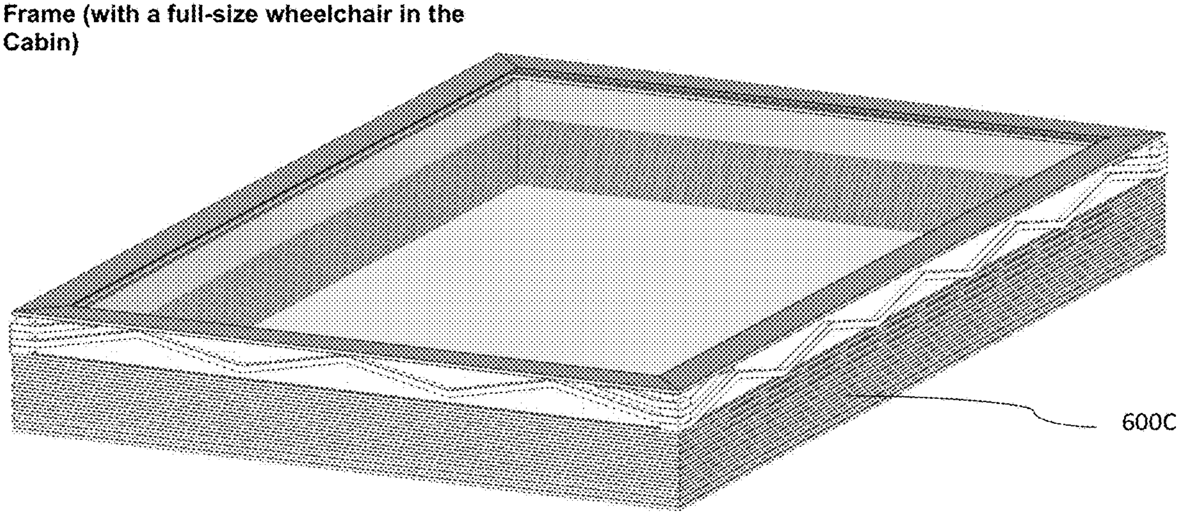
FIG. 47. Front perspective top view of the Cabin Head Frame

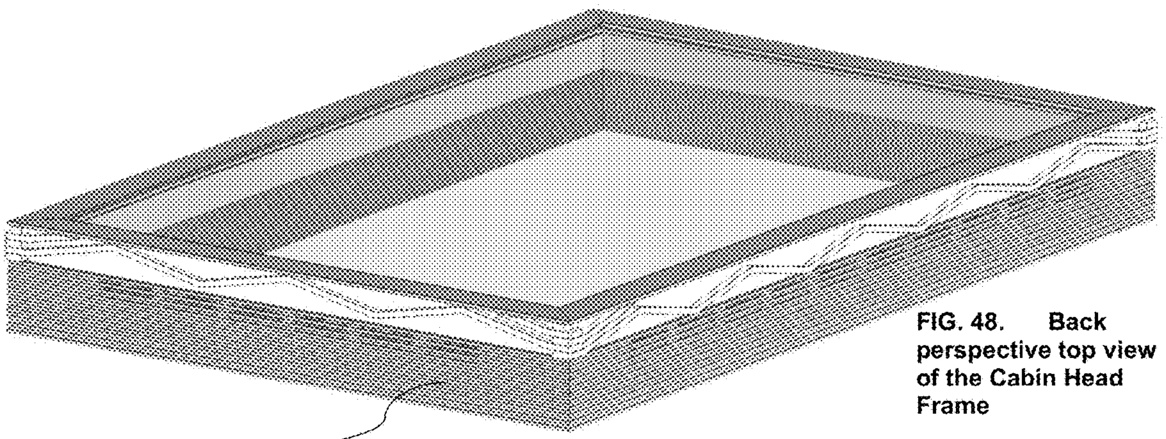
FIG. 48. Back perspective top view of the Cabin Head Frame
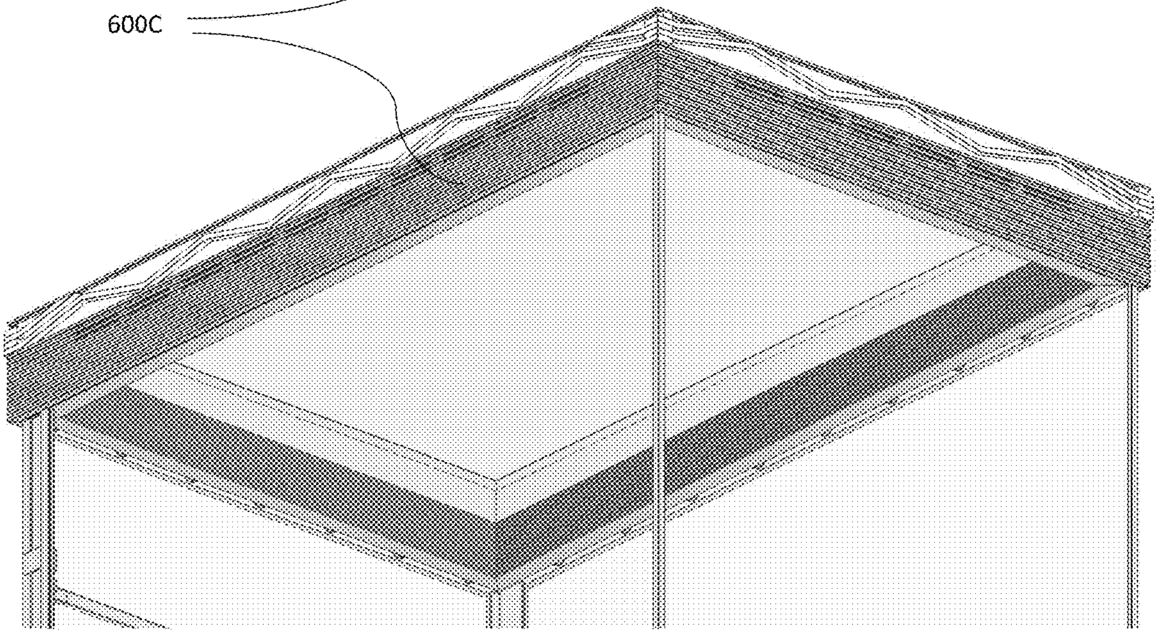
FIG. 49. Back perspective zoomed view of the Cabin top
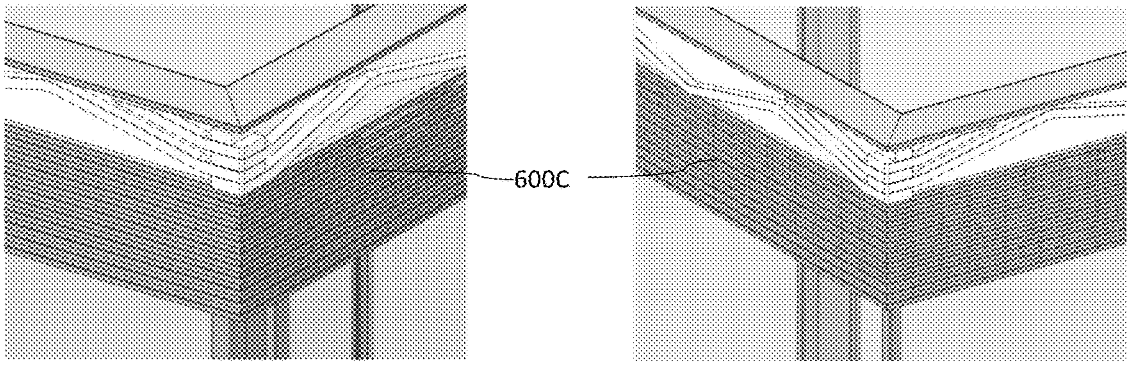
FIG. 50. Perspective zoomed views of the Cabin front and back top corners

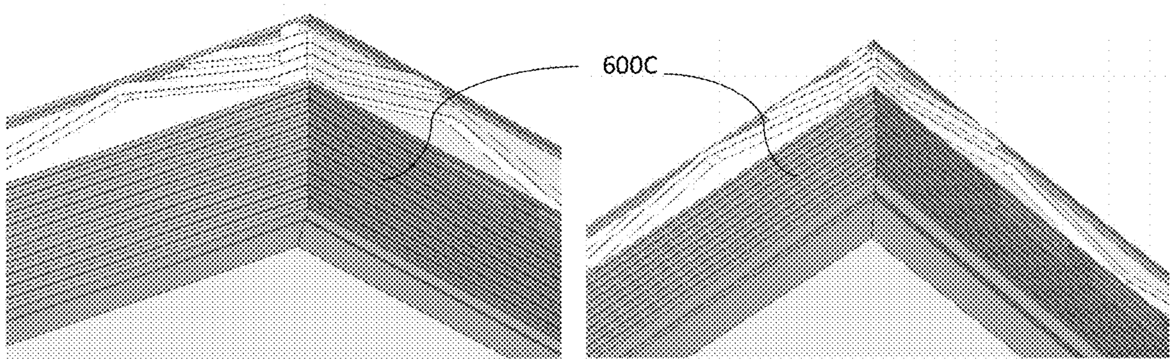
FIG. 51. Bottom angle perspective views of the Cabin Head Frame
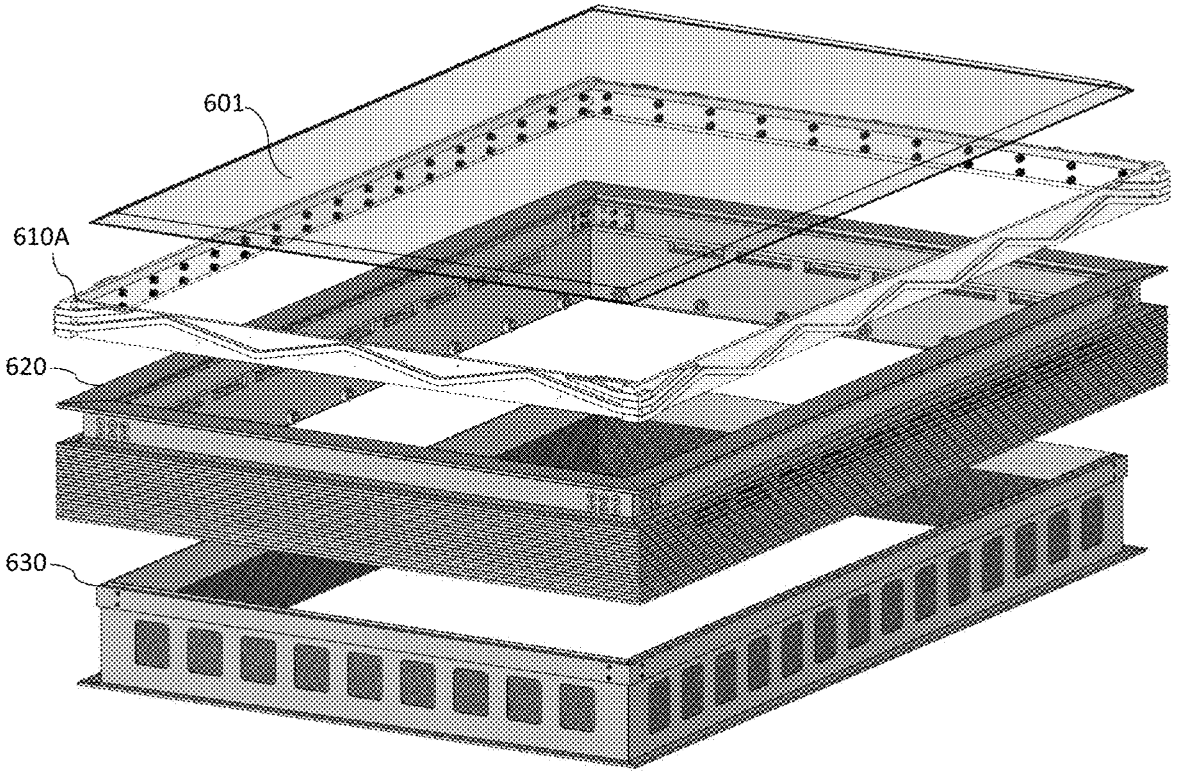
FIG. 52. Top exploded view of the Cabin Head Frame

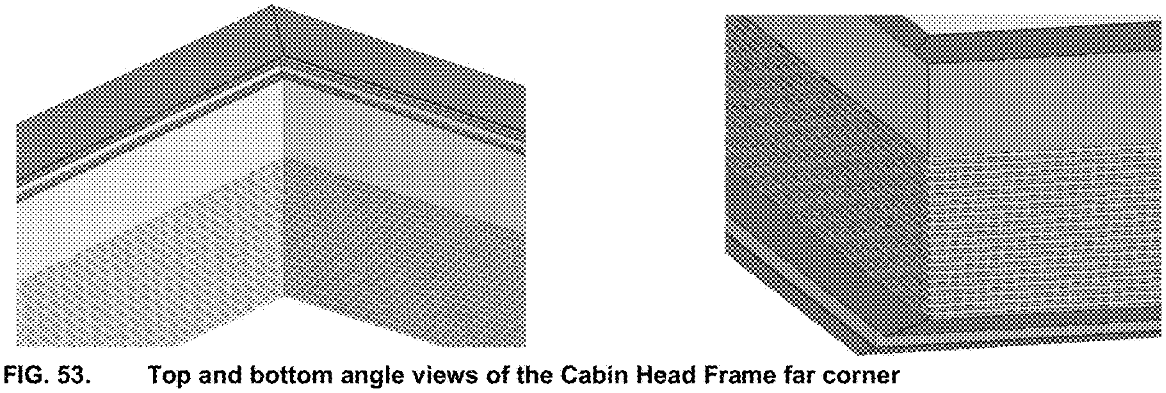
FIG. 53. Top and bottom angle views of the Cabin Head Frame far corner
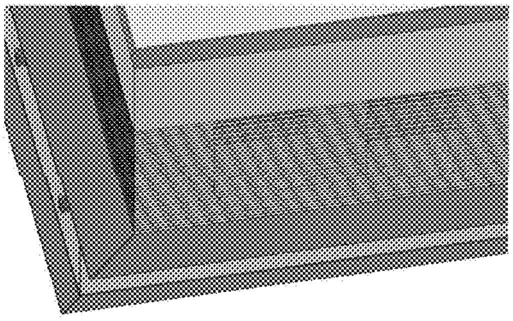
FIG. 54. Bottom angle view of the Cabin Head Frame far corner with glass link bolts
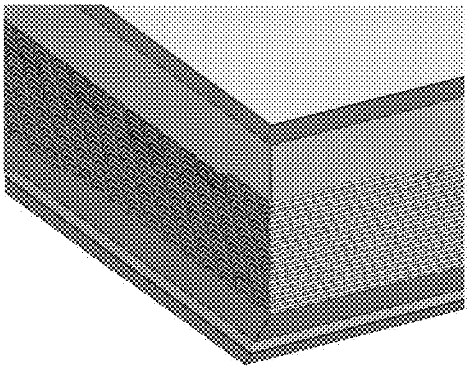
FIG. 55. Bottom angle view of the Cabin Head Frame far corner with ventilation grill
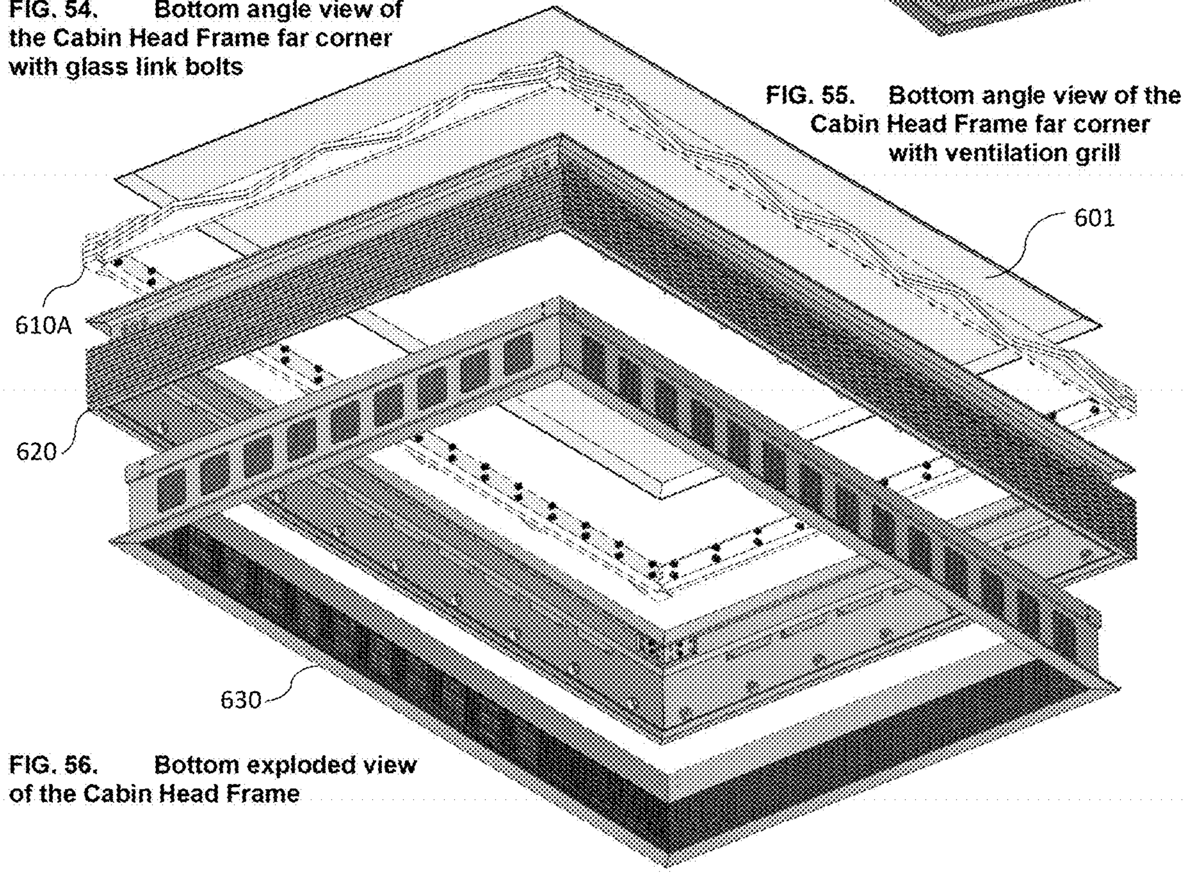
FIG. 56. Bottom exploded view of the Cabin Head Frame

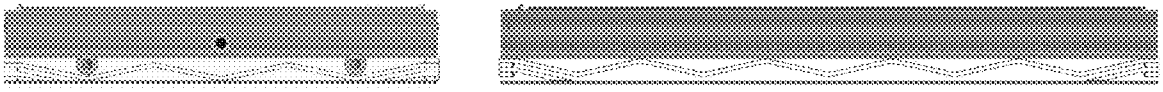
FIG. 57. Front and side views of the Cabin Base
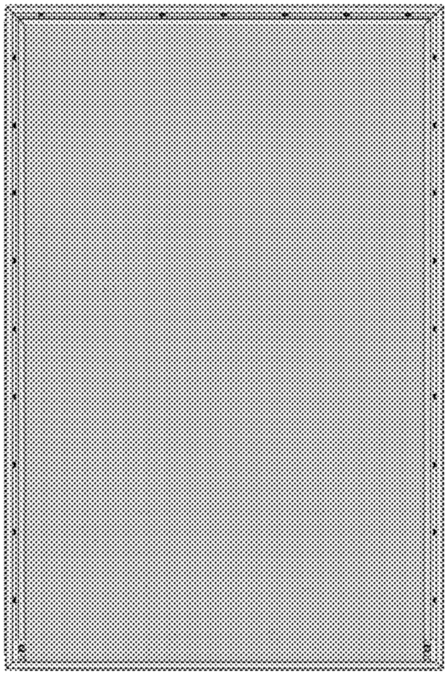
FIG. 60. Top view of the Cabin Base
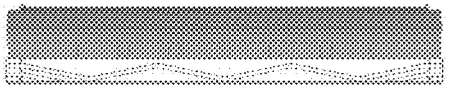
FIG. 58. Back view of the Cabin Base
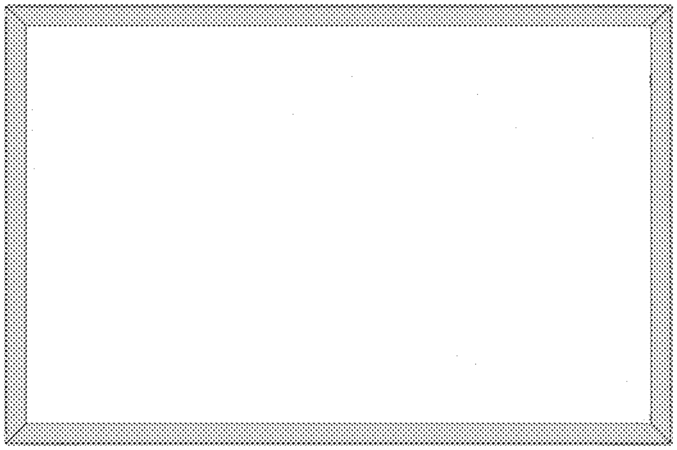
FIG. 59. Bottom view of the Cabin Base
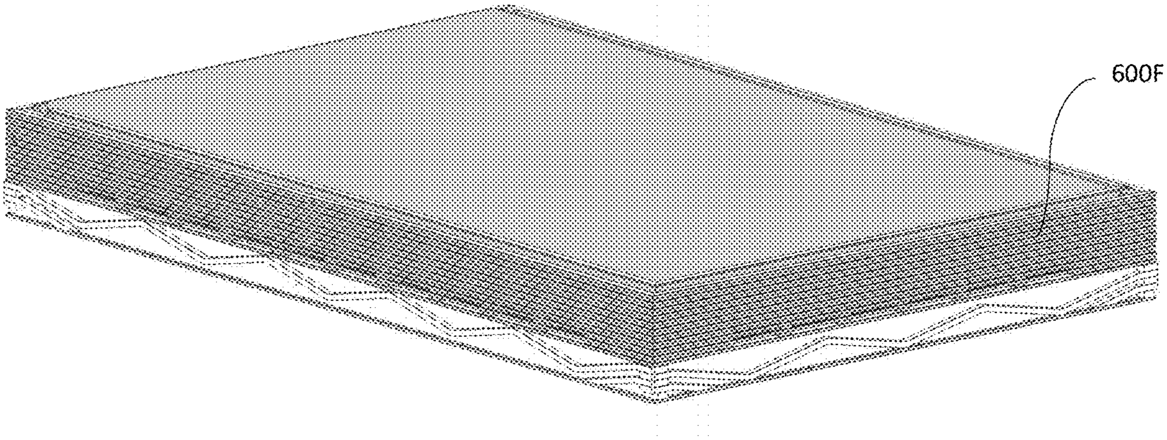
FIG. 61. Back perspective top view of the Cabin Base

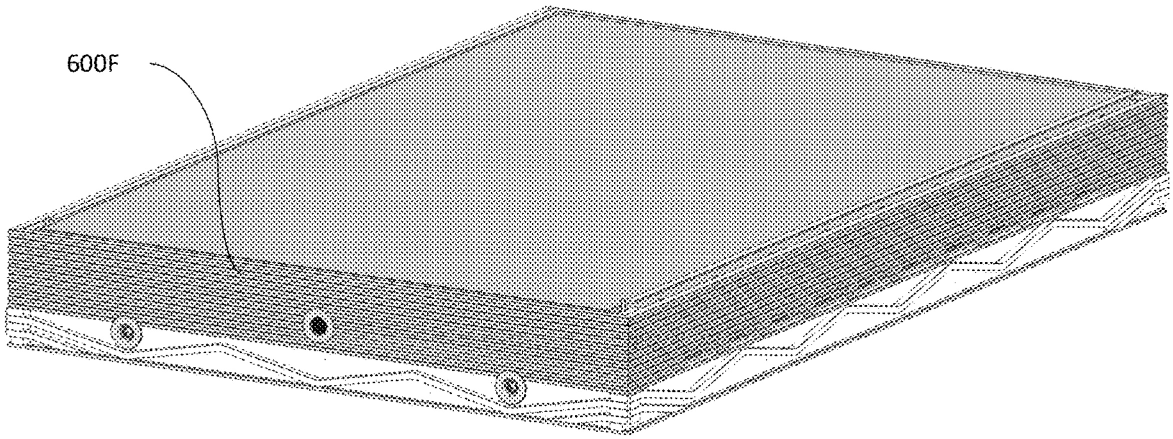
FIG. 62. Front perspective view top of the Cabin Base
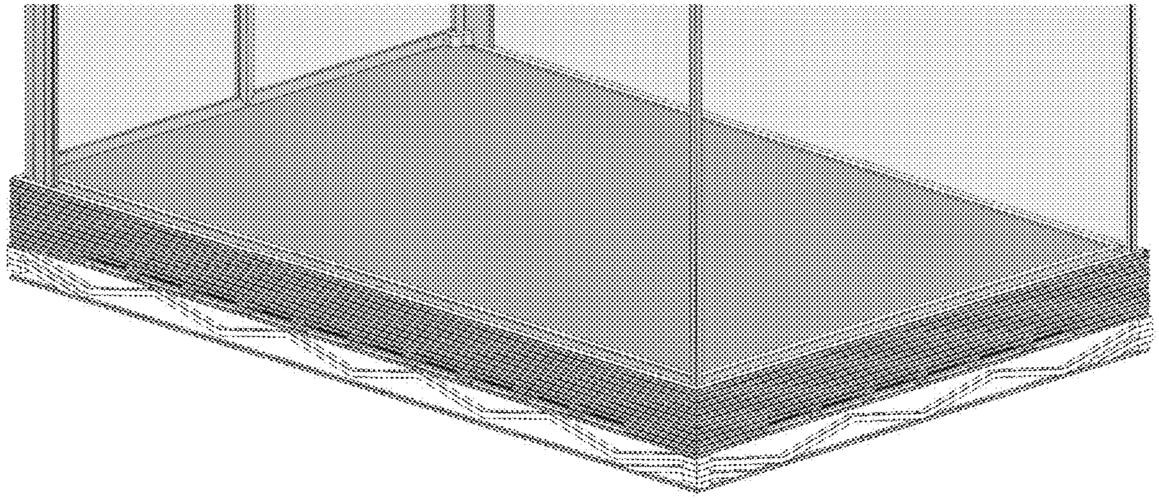
FIG. 63. Back perspective zoomed view of the Cabin Foundation

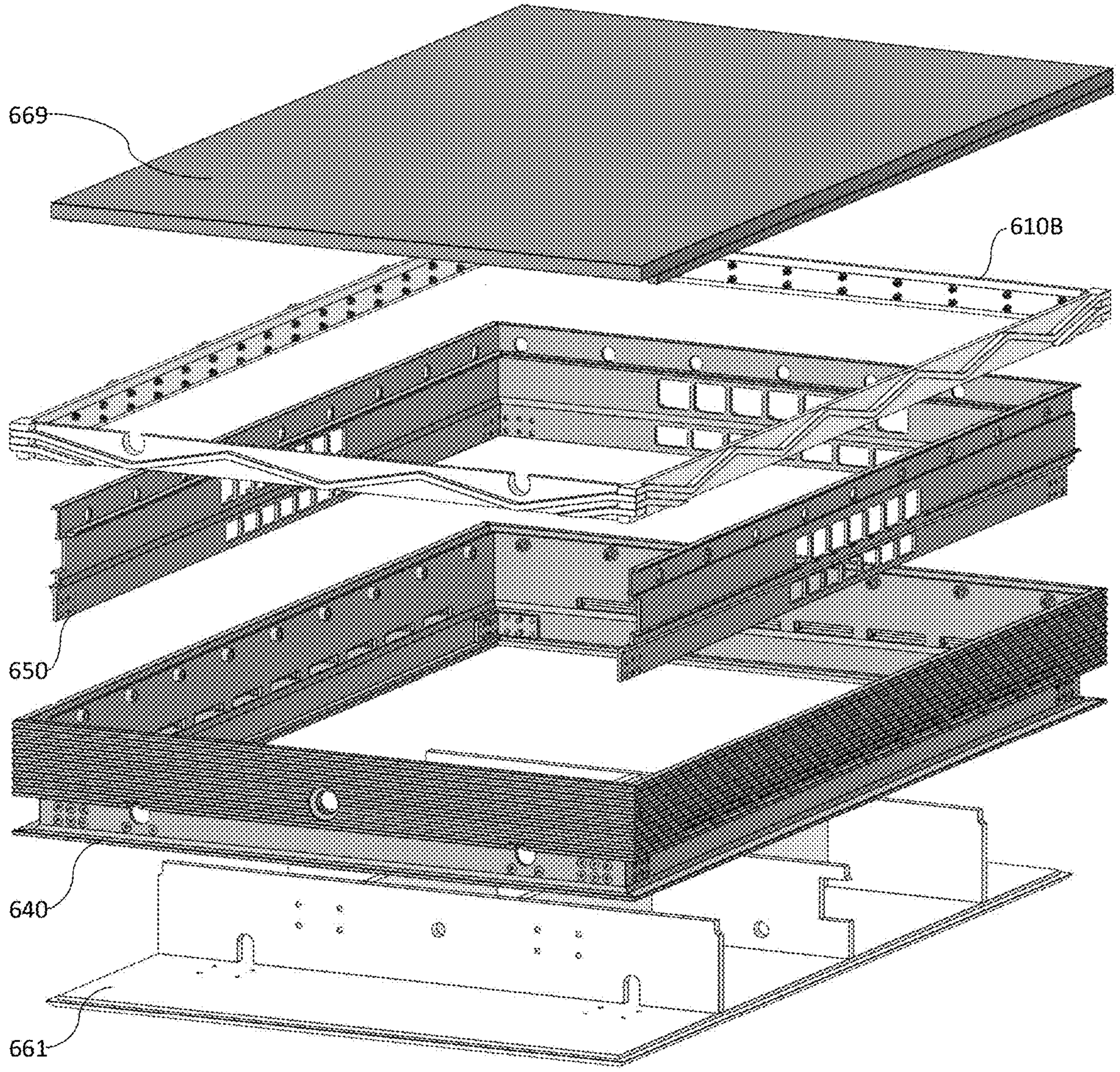
FIG. 64. Top exploded view of the Cabin Base

FIG. 65. Front and side views of the Cabin Ceiling glass panel
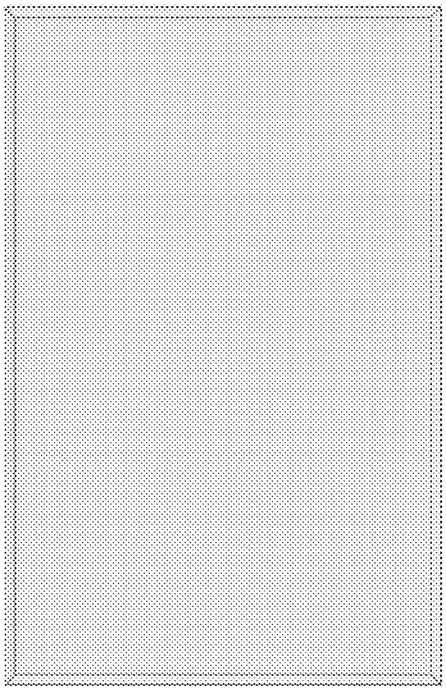
FIG. 67. Top view of the Cabin Ceiling glass panel
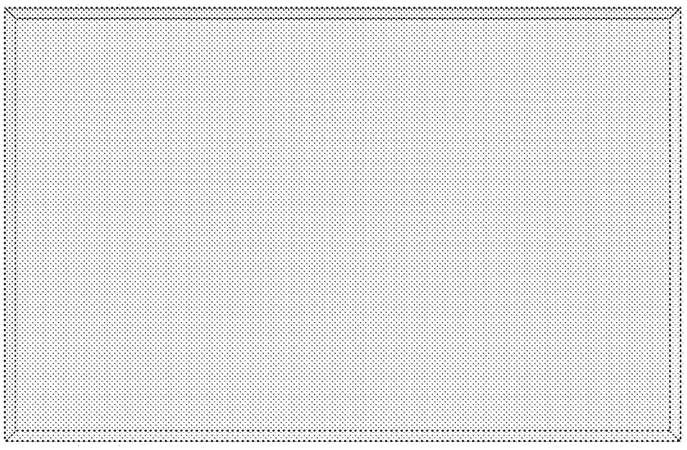
FIG. 66. Bottom view of the Cabin Ceiling glass panel
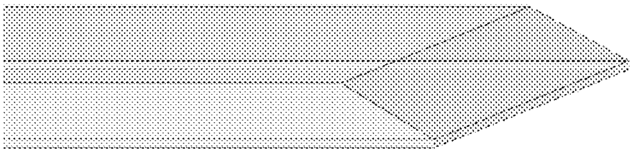
FIG. 68. Right edge angle view of the Cabin Ceiling glass panel
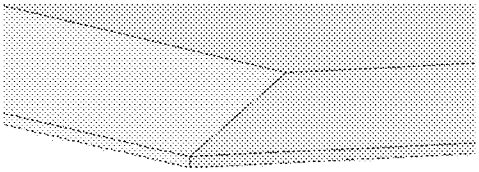
FIG. 69. Left edge view of the Cabin Ceiling glass panel
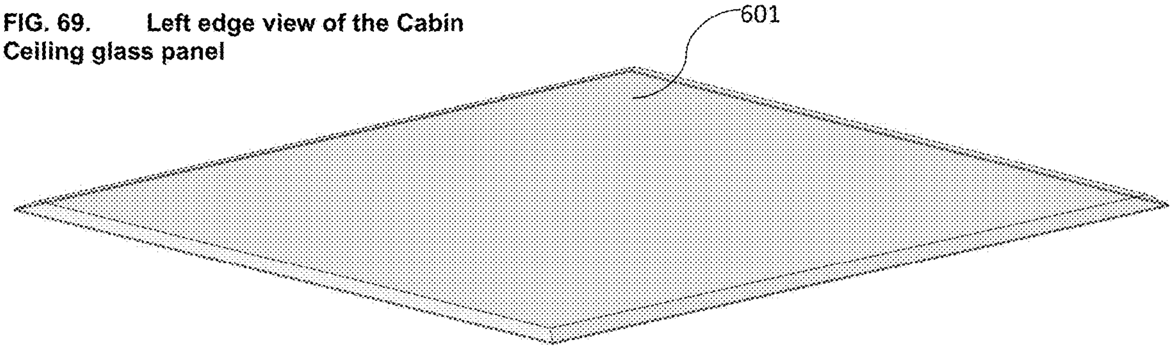
FIG. 70. Top perspective view of the Cabin Ceiling glass panel

FIG. 71. Front and side views of the Cabin Vacuum Seal
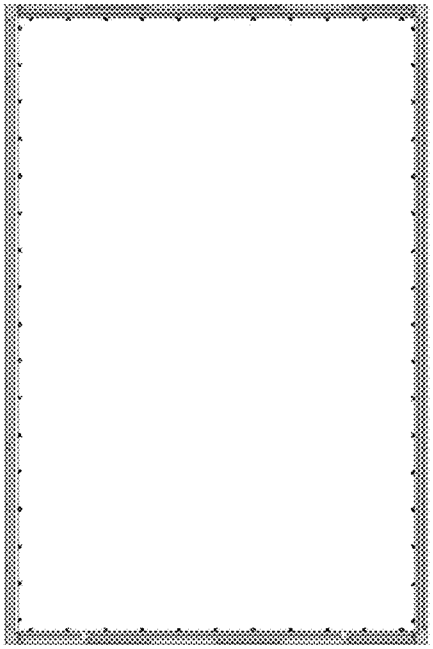
FIG. 74. Top view of the Cabin Vacuum Seal
FIG. 72. Back view of the Cabin Vacuum Seal
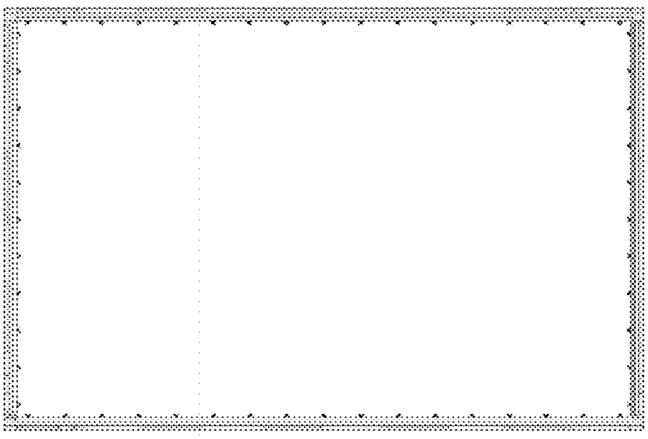
FIG. 73. Bottom view of the Cabin Vacuum Seal
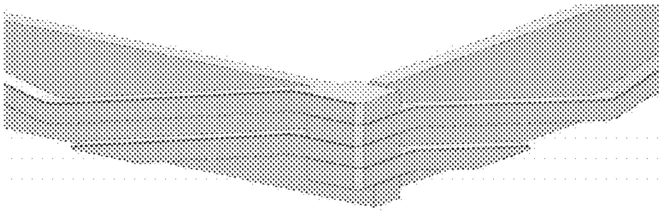
FIG. 75. Top outside angle view of the Cabin Vacuum Seal corner
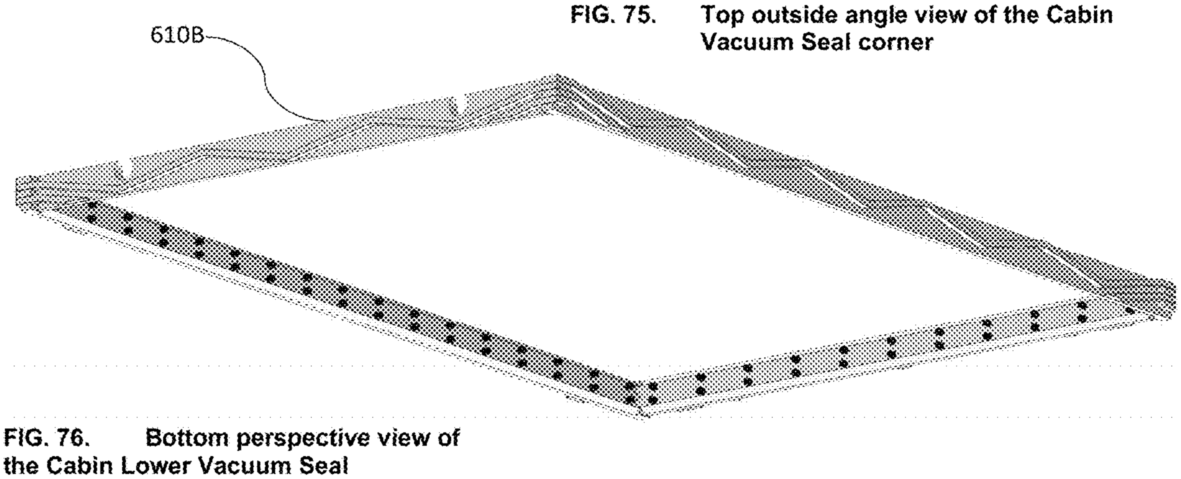
FIG. 76. Bottom perspective view of the Cabin Lower Vacuum Seal FIG. 77. Top perspective view of the Cabin Upper Vacuum Seal (right)

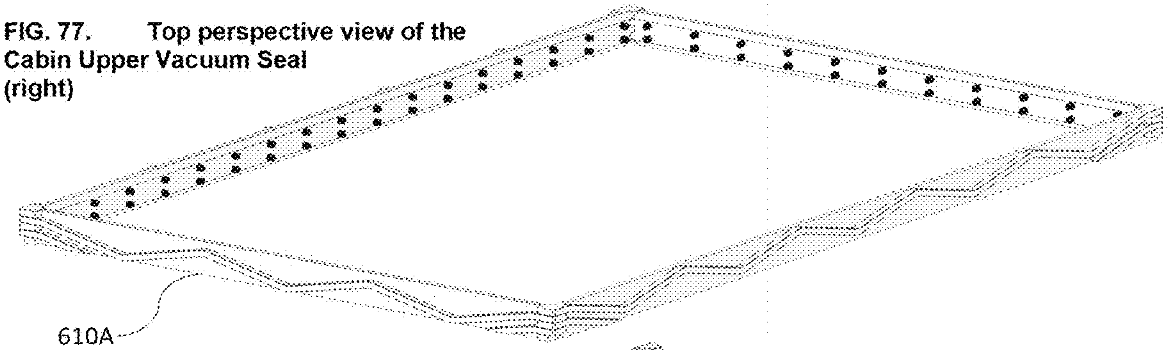

FIG. 78. Top exploded view of the Cabin Vacuum Seal (right)

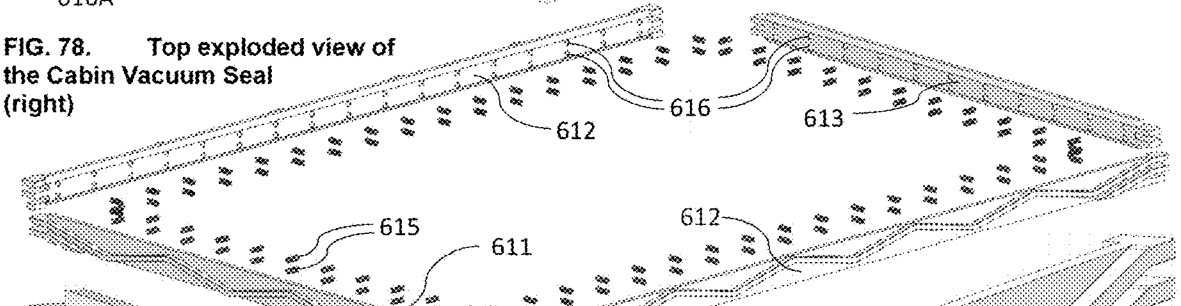

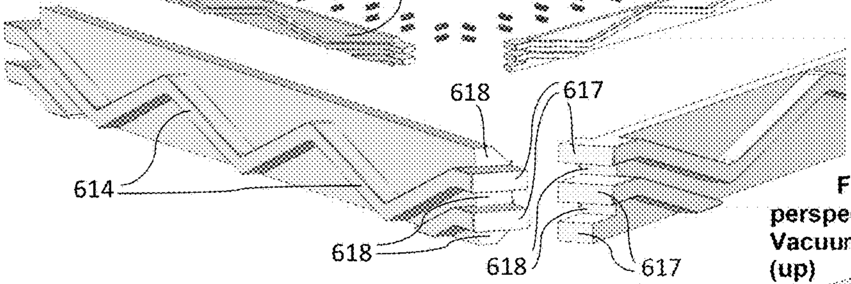

FIG. 80. Outside top perspective view of the Cabin Vacuum Seal front edge (up)

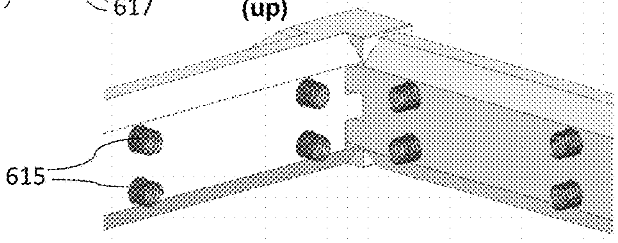

FIG. 79. Outside top perspective view of the Cabin Vacuum Seal side edge (up)

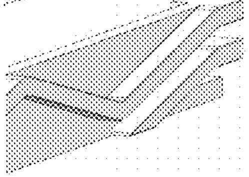

FIG. 81. Front top angle view of the Cabin Vacuum Seal inside corner (up)

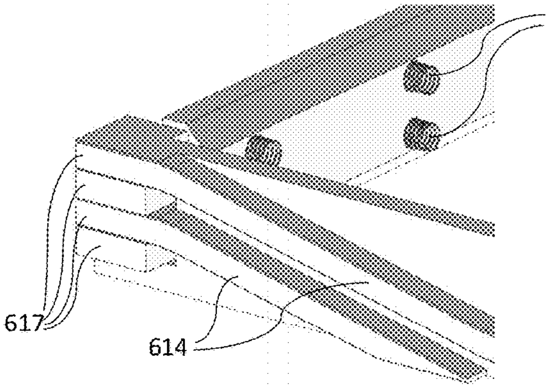

FIG. 83. Front top angle view of the Cabin Vacuum Seal outside corner (up)

FIG. 82. Cross-section view of the Cabin Vacuum Seal (right)

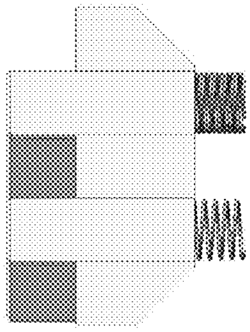

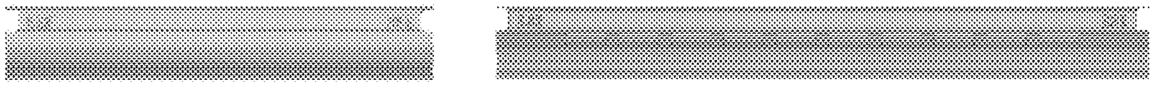
FIG. 84. Front and side views of the Cabin Head Outer Frame
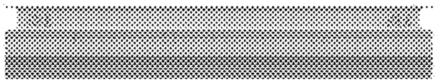
FIG. 85. Back view of the Cabin Head Outer Frame
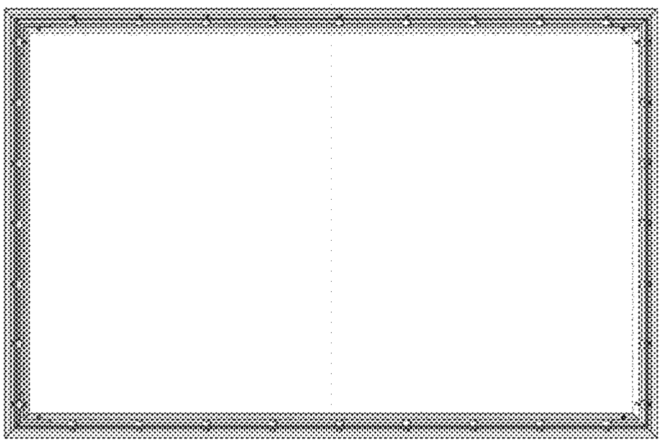
FIG. 86. Bottom view of the Cabin Head Outer Frame
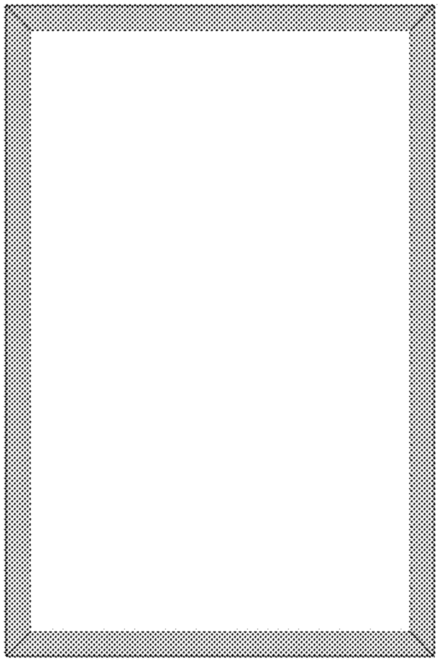
FIG. 87. Top view of the Cabin Head Outer Frame
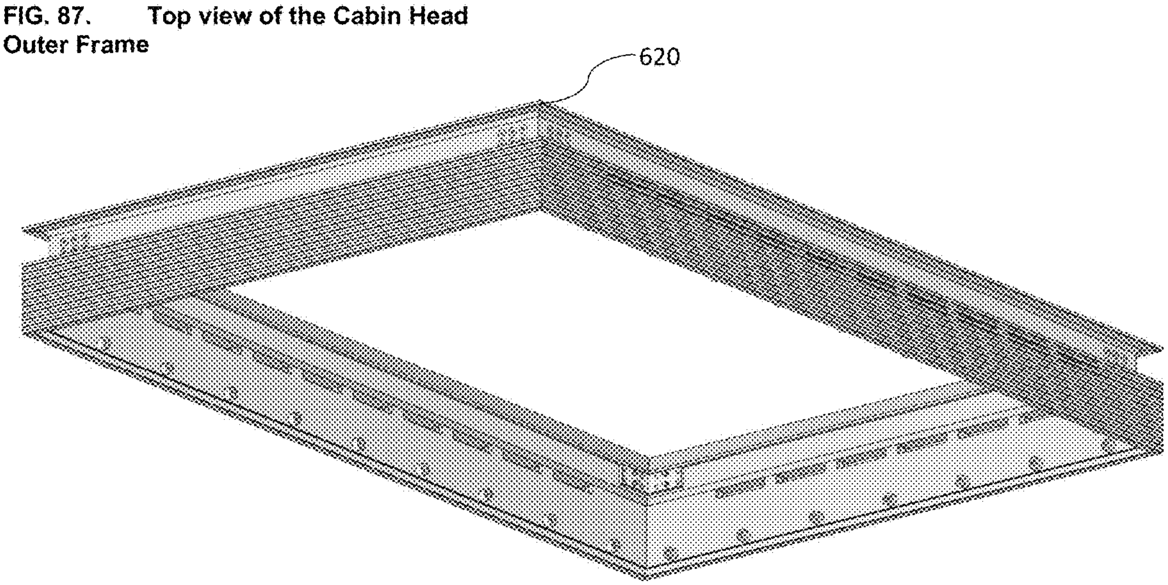
FIG. 88. Bottom perspective view of the Cabin Head Outer Frame

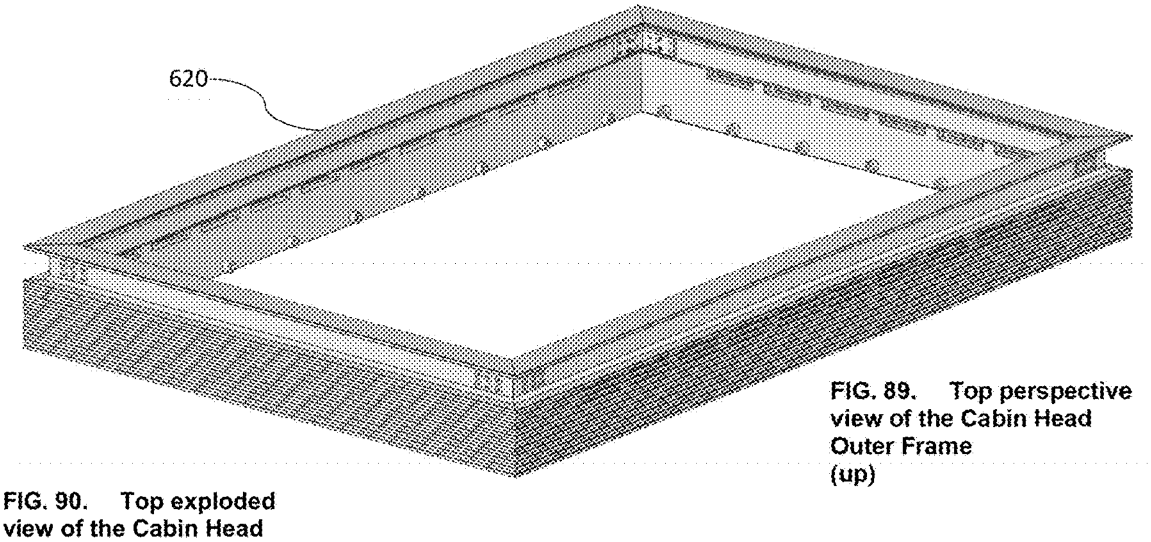
FIG. 89. Top perspective view of the Cabin Head Outer Frame (up)
FIG. 90. Top exploded view of the Cabin Head Outer Frame (right)
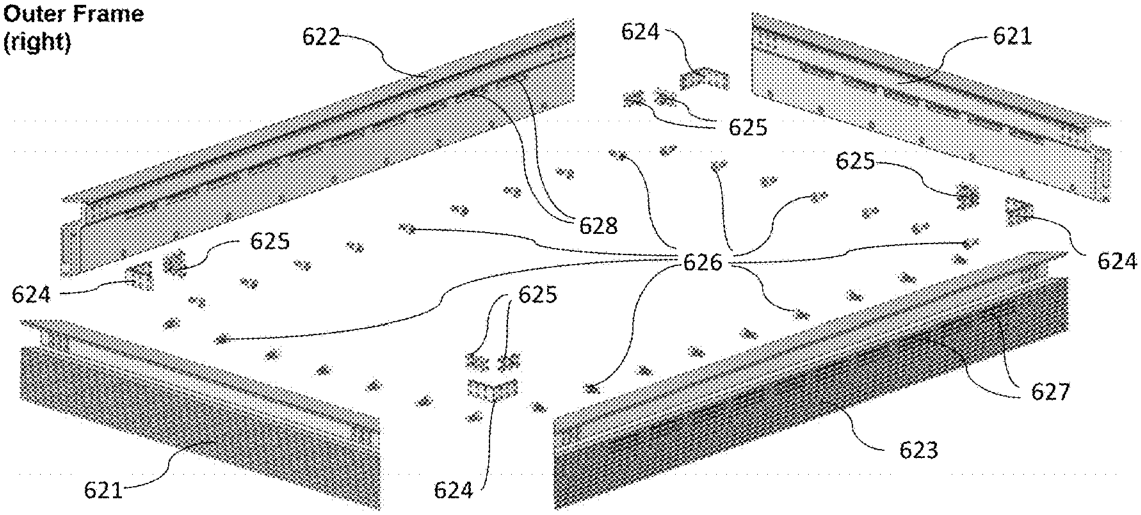
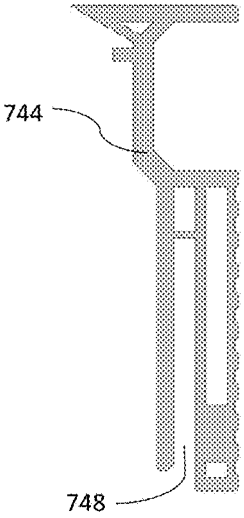
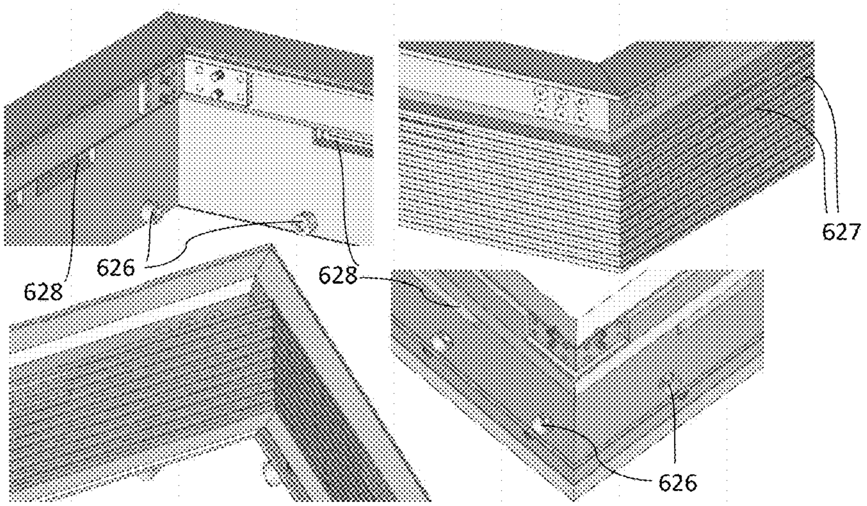
FIG. 91. Cross-section view of the Cabin Head Outer Frame profile
FIG. 92. Various angle views of the Cabin Head Outer Frame

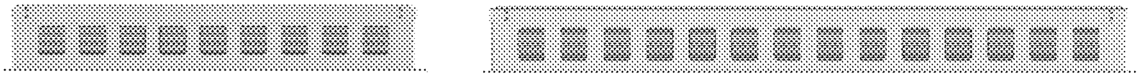
FIG. 93. Front and side views of the Cabin Head Inner Frame
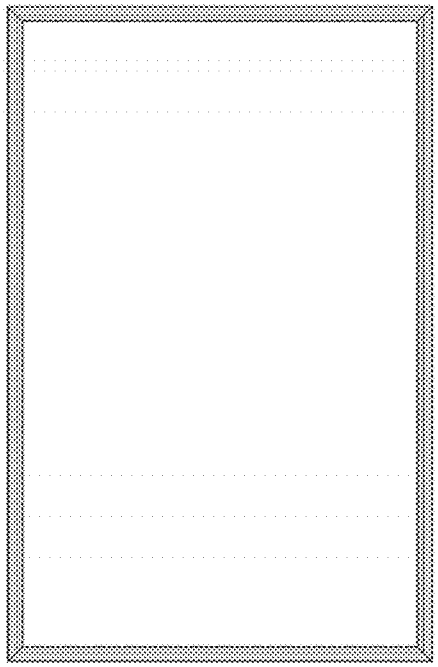
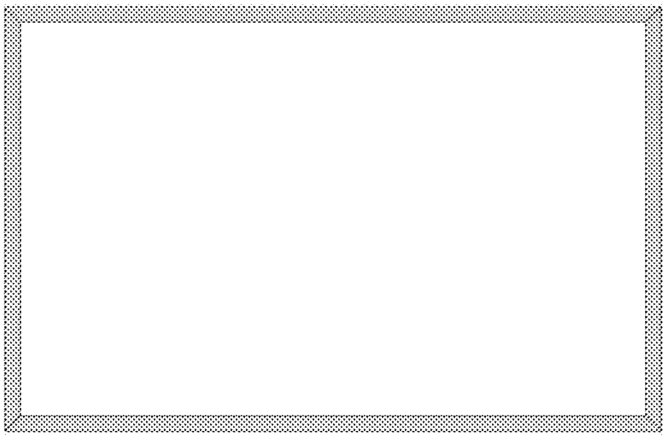
FIG. 94. Bottom view of the Cabin Head Inner Frame (up)
FIG. 95. Top perspective and exploded views of the Cabin Head Inner Frame (down)
FIG. 96. Top view of the Cabin Head Inner Frame (up)
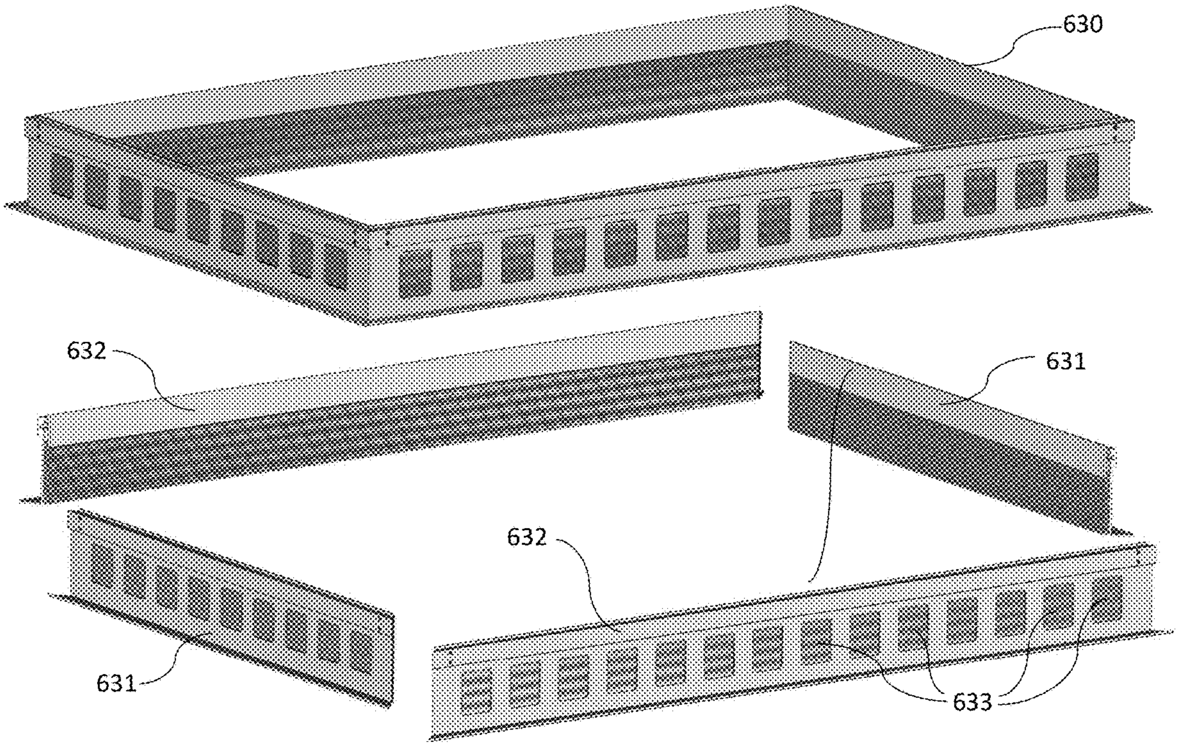

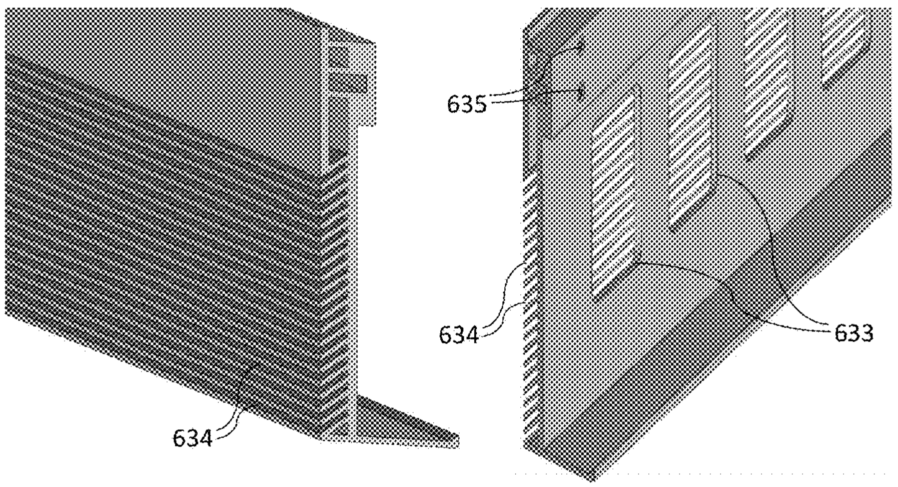
FIG. 97. Inside and outside edge views of the Cabin Head Inner Frame
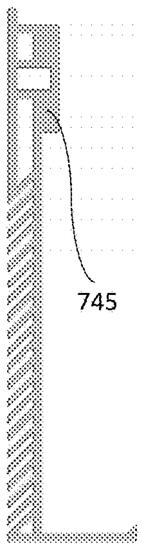
FIG. 98. Cross-section view of the Cabin Head Inner Frame profile
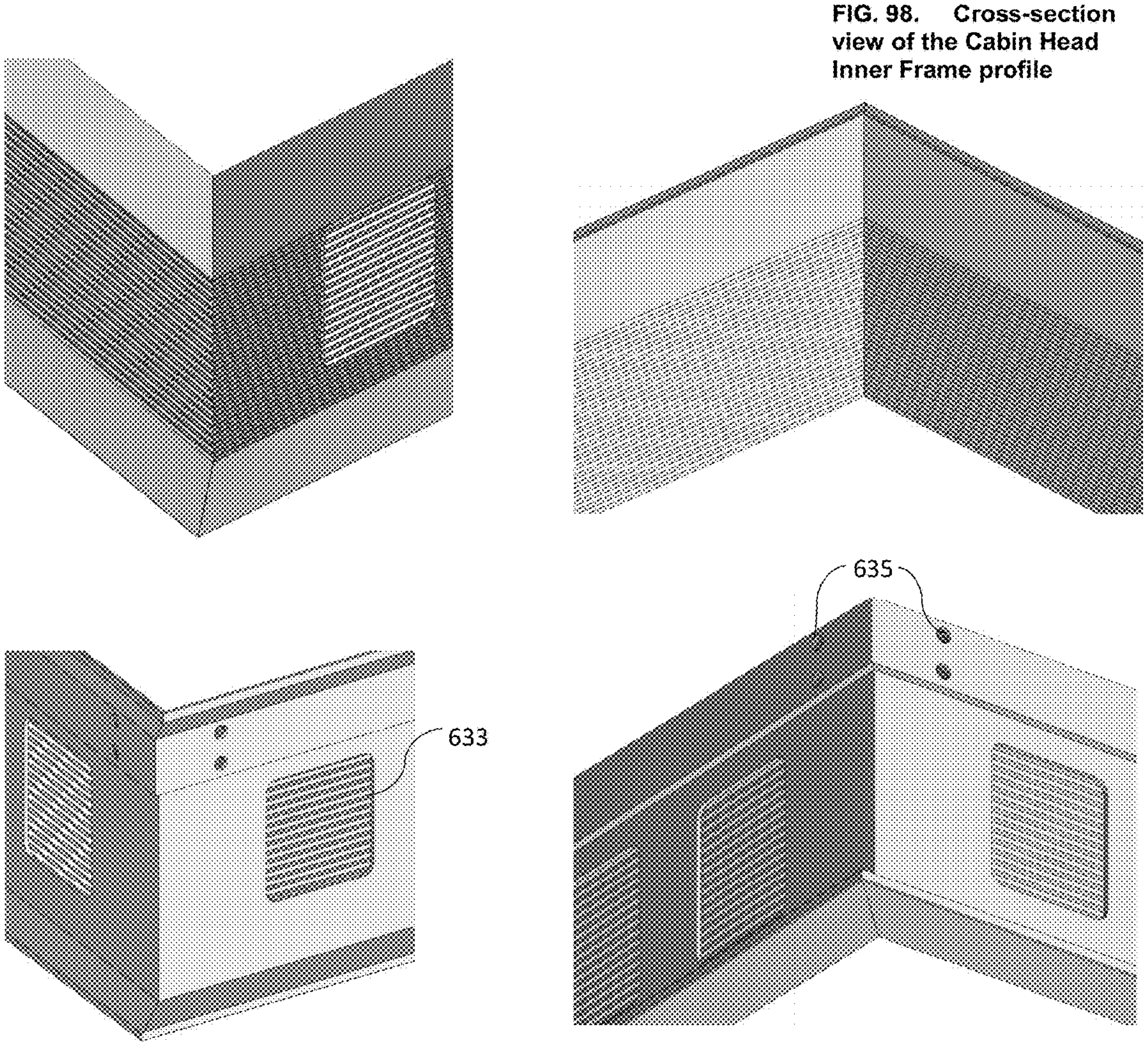
FIG. 99. Various corner angle views of the Cabin Head Inner Frame

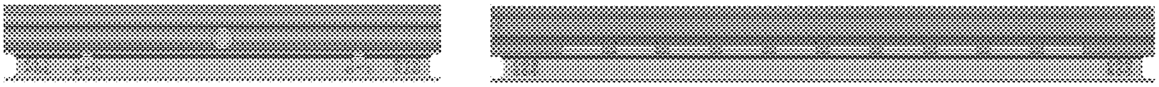
FIG. 100. Front and side views of the Cabin Base Outer Frame
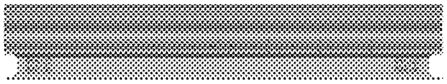
FIG. 101. Back view of the Cabin Base Outer Frame
FIG. 102. Bottom view of the Cabin Base Outer Frame
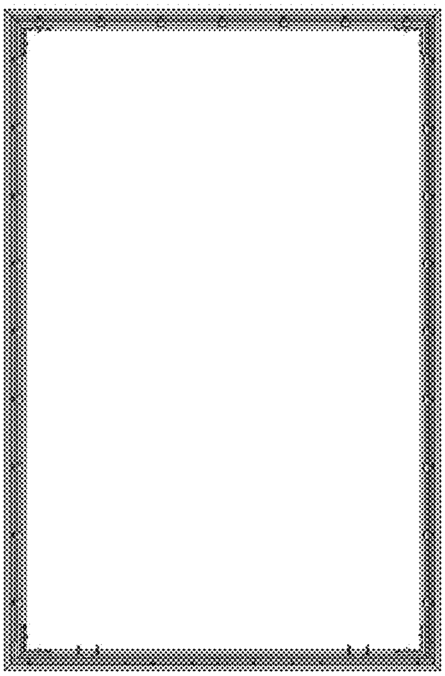
FIG. 103. Top view of the Cabin Base Outer Frame
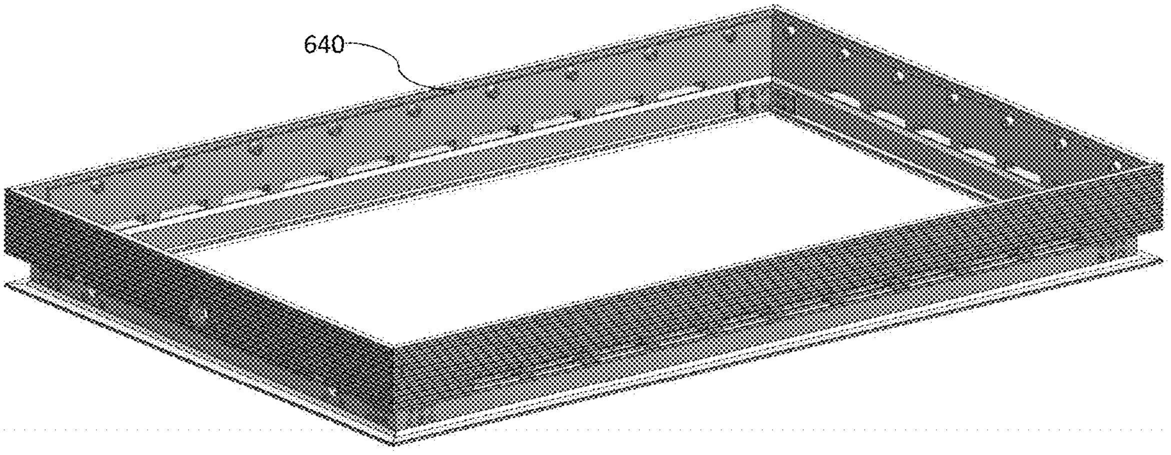
FIG. 104. Top perspective view of the Cabin Base Outer Frame

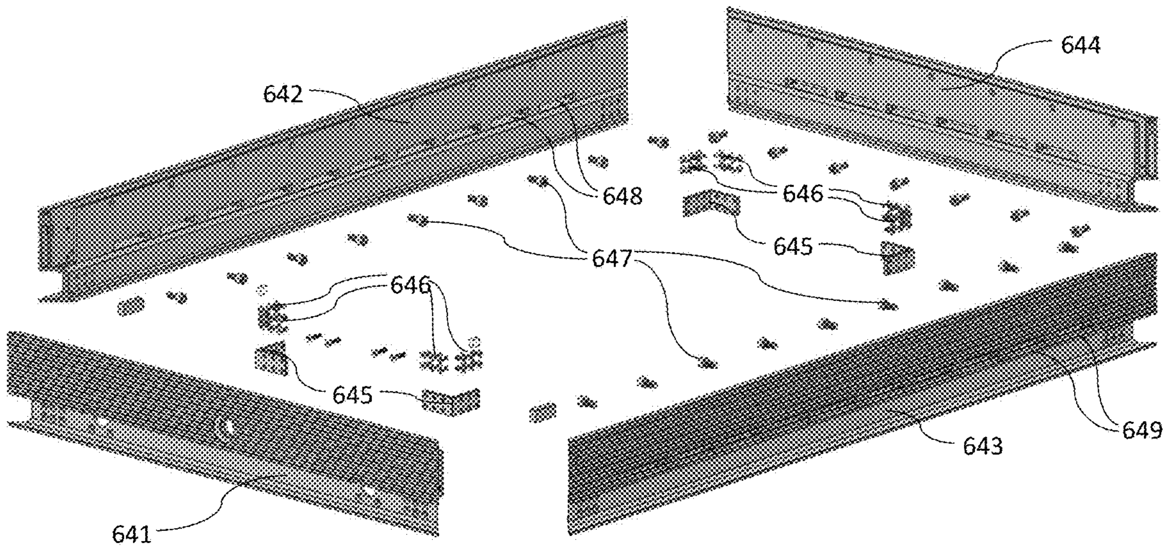
FIG. 105. Top exploded view of the Cabin Base Outer Frame (up)
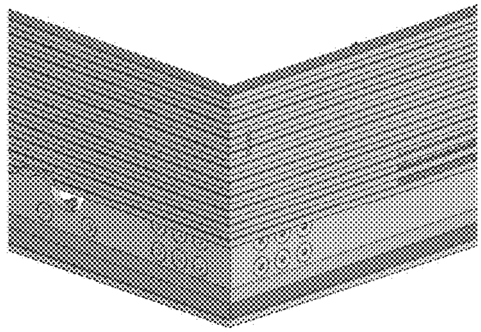
FIG. 106. Top outside angle view of the Cabin Base Outer Frame front corner (up)
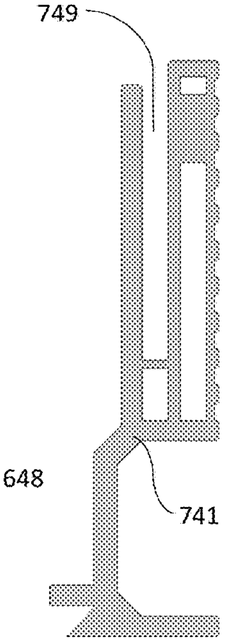
FIG. 107. Cross-section view of the Cabin Base Outer Frame profile (up)
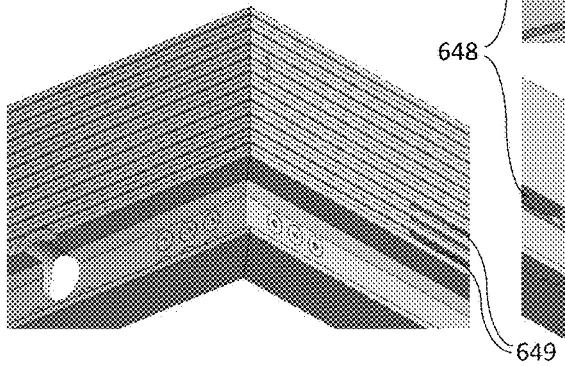
FIG. 108. Bottom outside angle view of the Cabin Base Outer Frame front corner (up)
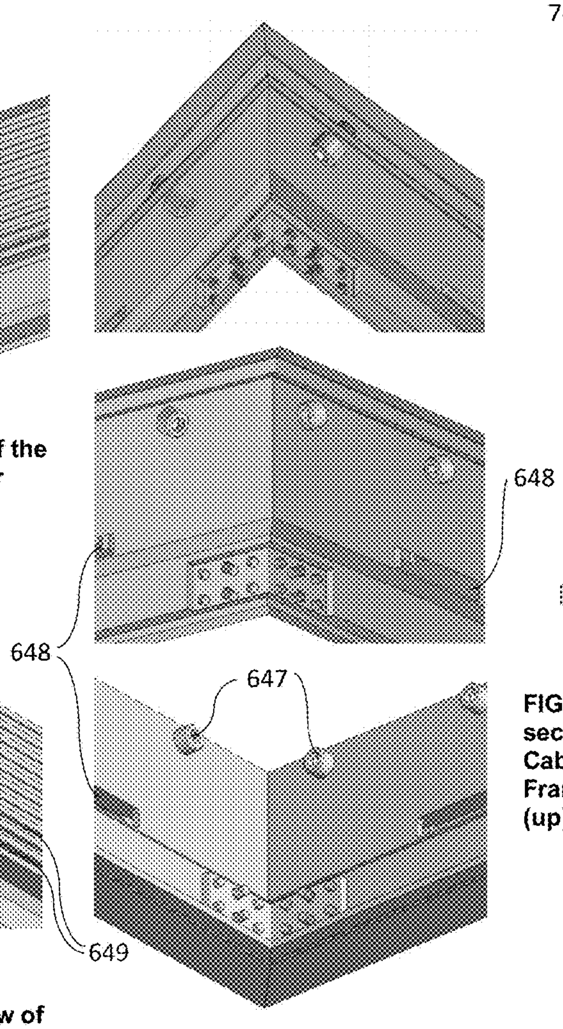
FIG. 109. Various views of the Cabin Base Outer Frame inside corner

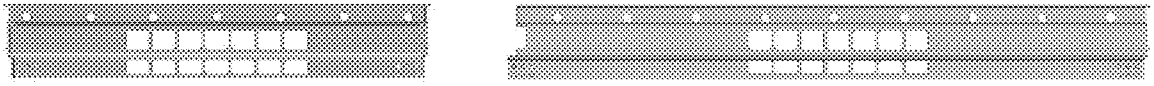
FIG. 110. Front and side views of the Cabin Base Inner Frame
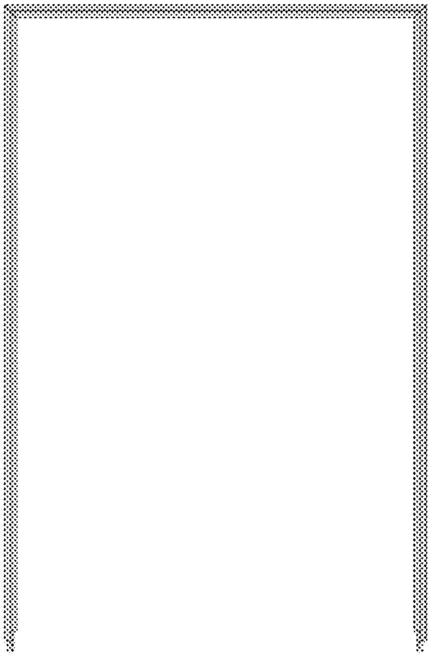
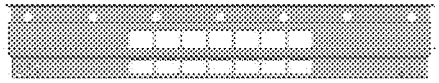
FIG. 111. Back view of the Cabin Base Inner Frame
FIG. 112. Bottom view of the Cabin Base Inner Frame
FIG. 113. Top view of the Cabin Base Inner Frame (up)
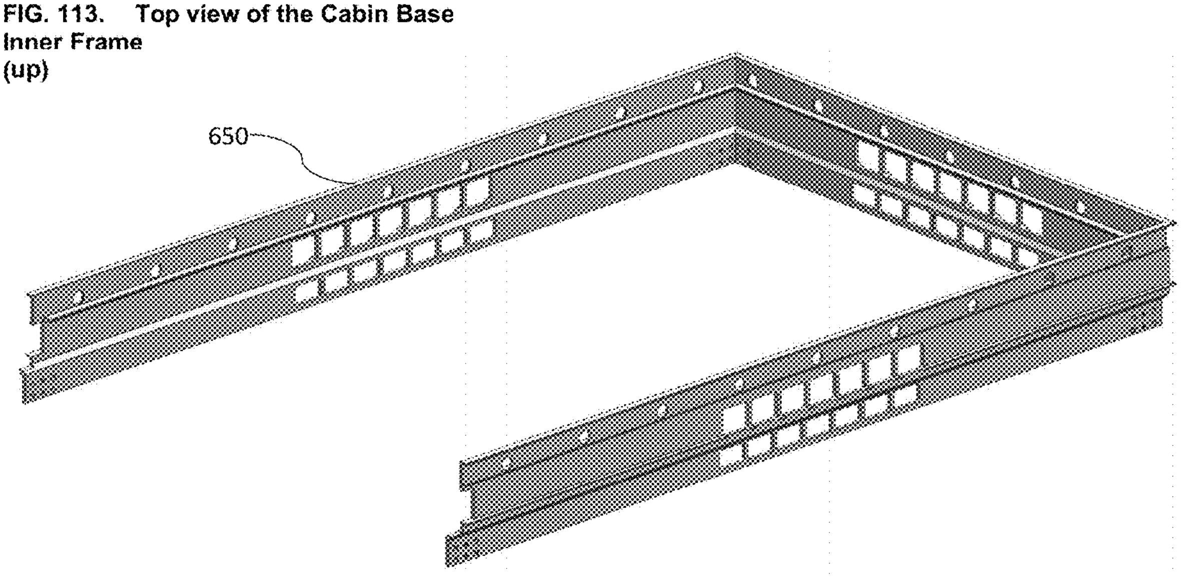
FIG. 114. Top perspective view of the Cabin Base Inner Frame FIG. 115. Top exploded view of the Cabin Base Inner Frame (right)
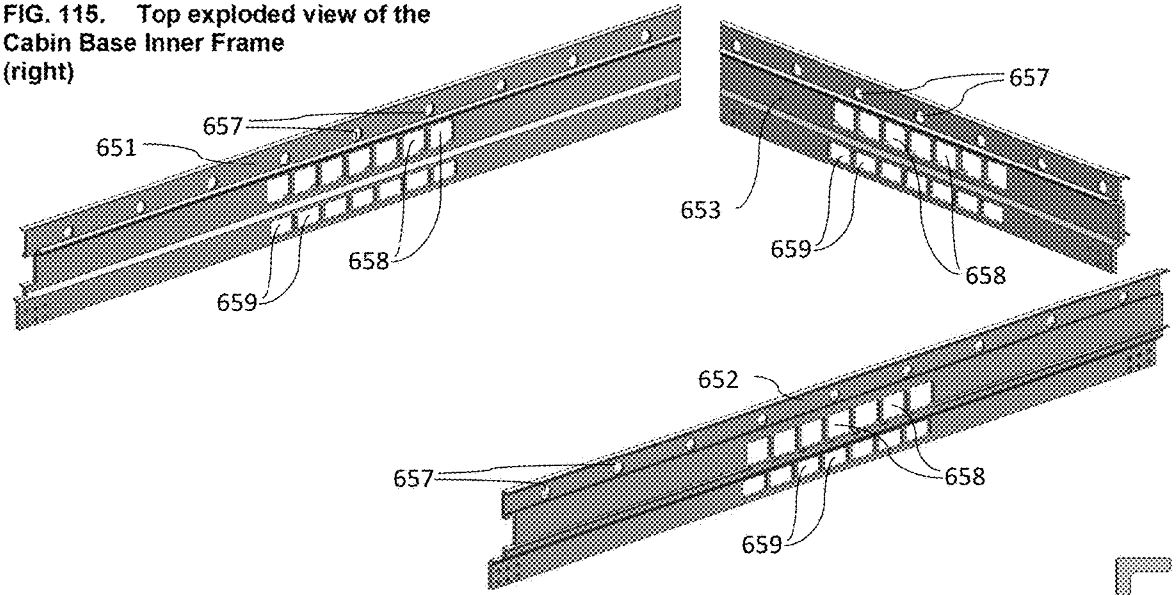
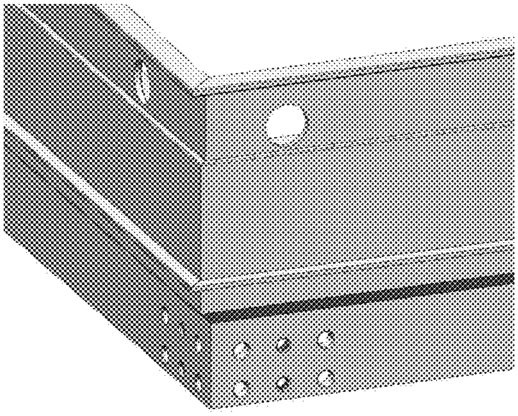
FIG. 116. Top outside angle view of the Cabin Base Inner Frame back corner (up)
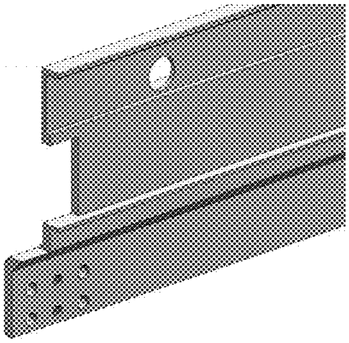
FIG. 117. Top outside angle view of the Cabin Base Inner Frame front corner (up)
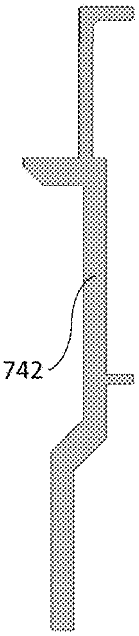
FIG. 118. Cross-section view of the Cabin Base Inner Frame profile (up)
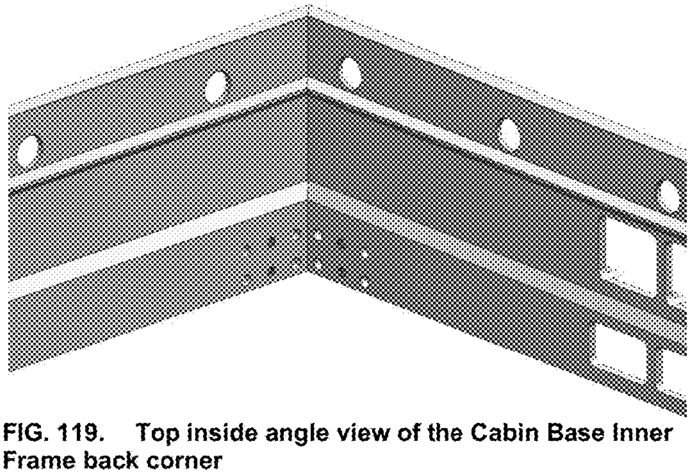
FIG. 119. Top inside angle view of the Cabin Base Inner Frame back corner

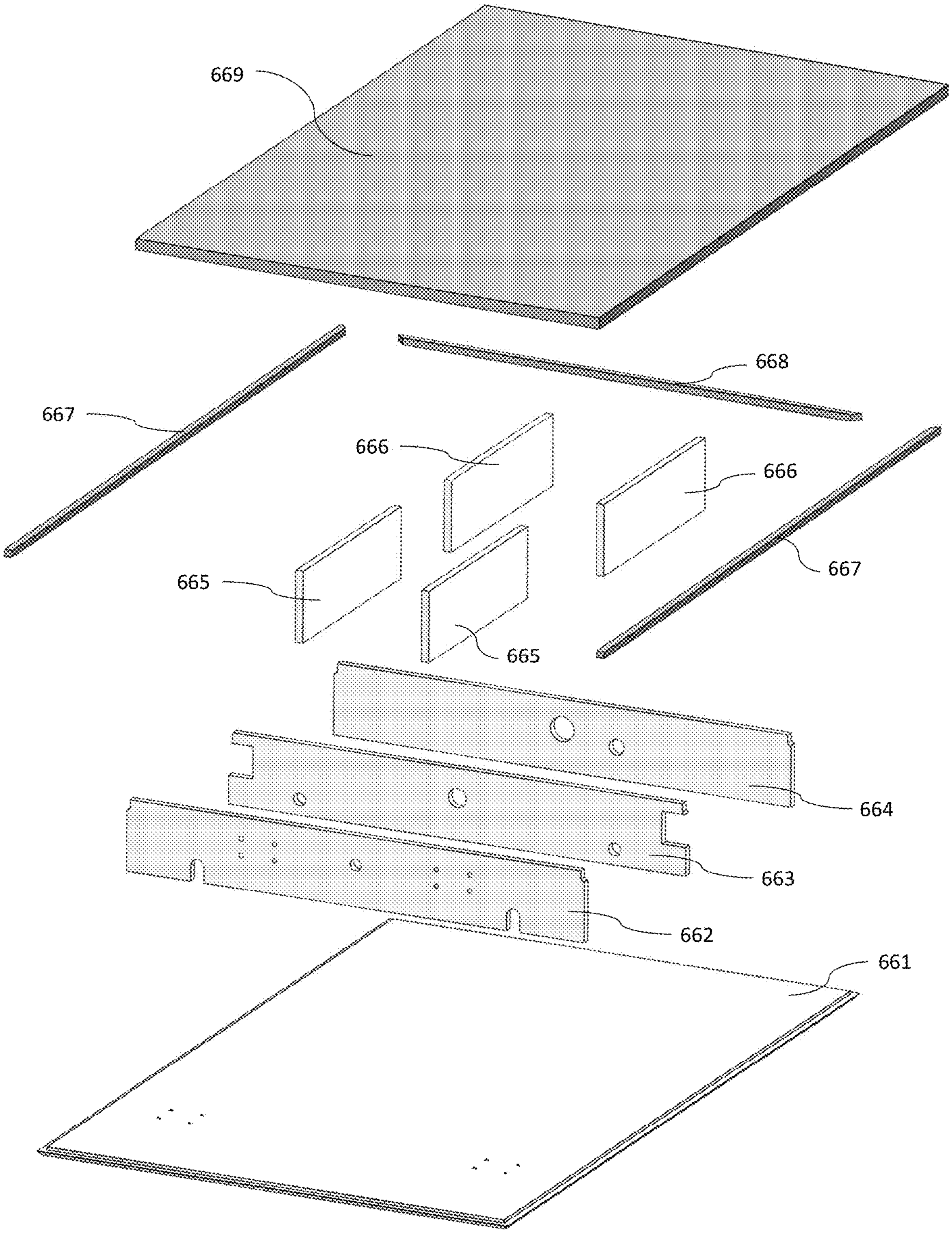
FIG. 120. Perspective exploded view of the Cabin Base Lower and Upper Decks

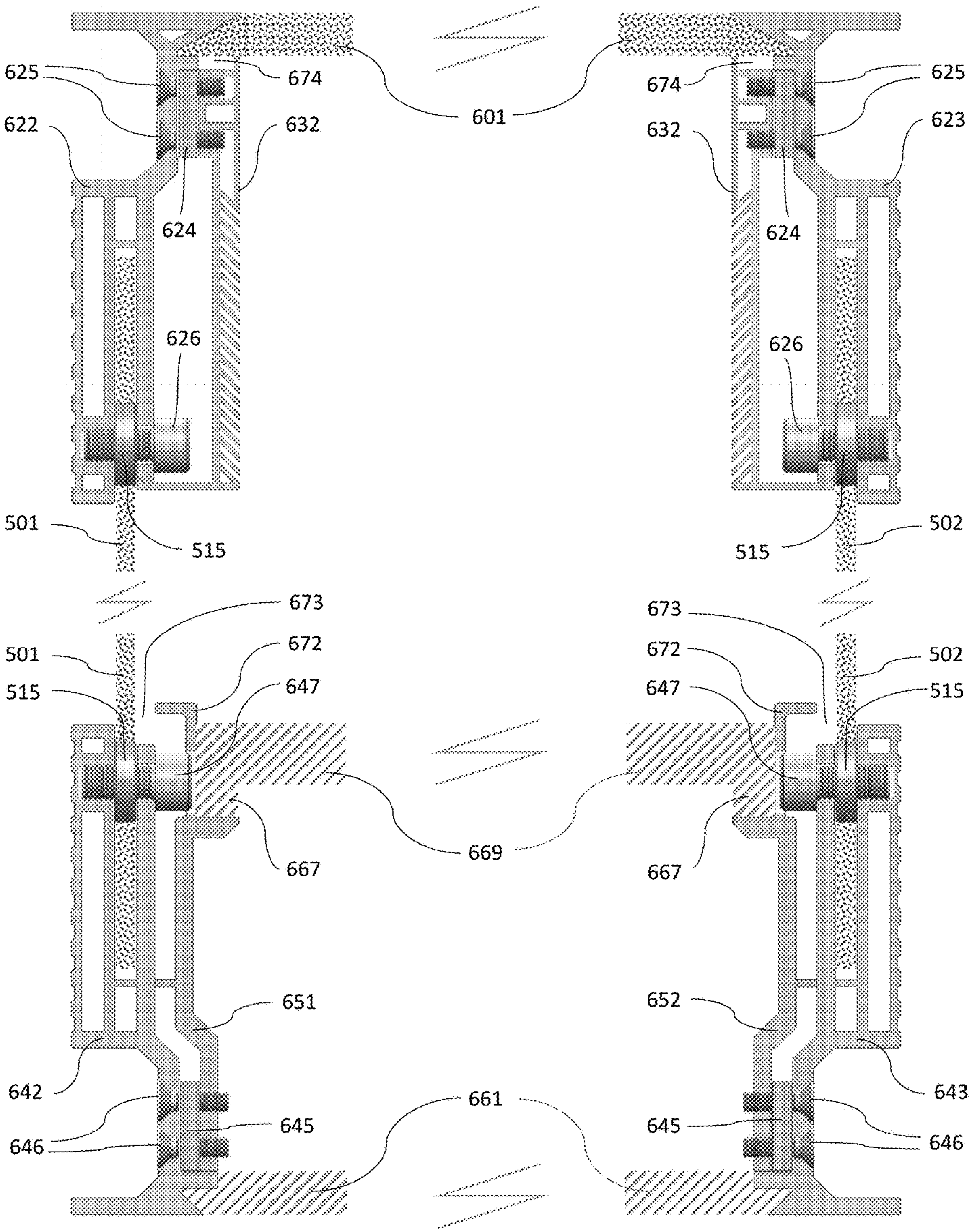
FIG. 121. Frontal cross-section view of the Cabin Head, Body and Base connections

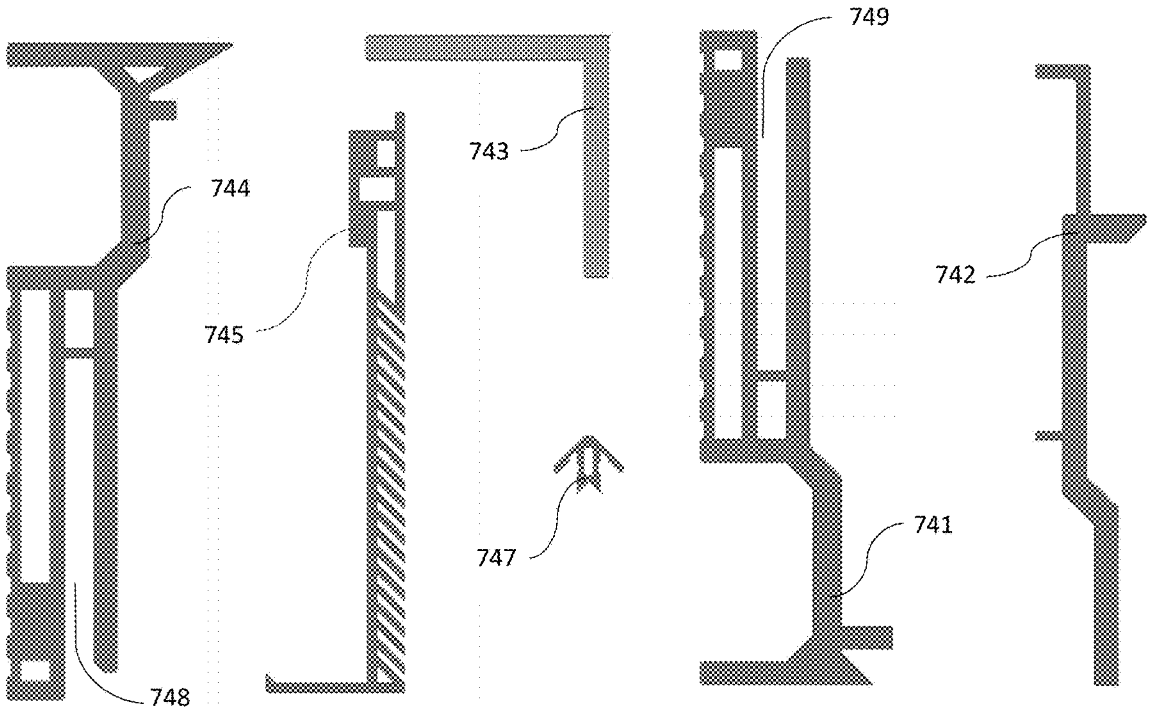
FIG. 122. Profiles used in the Cabin construction
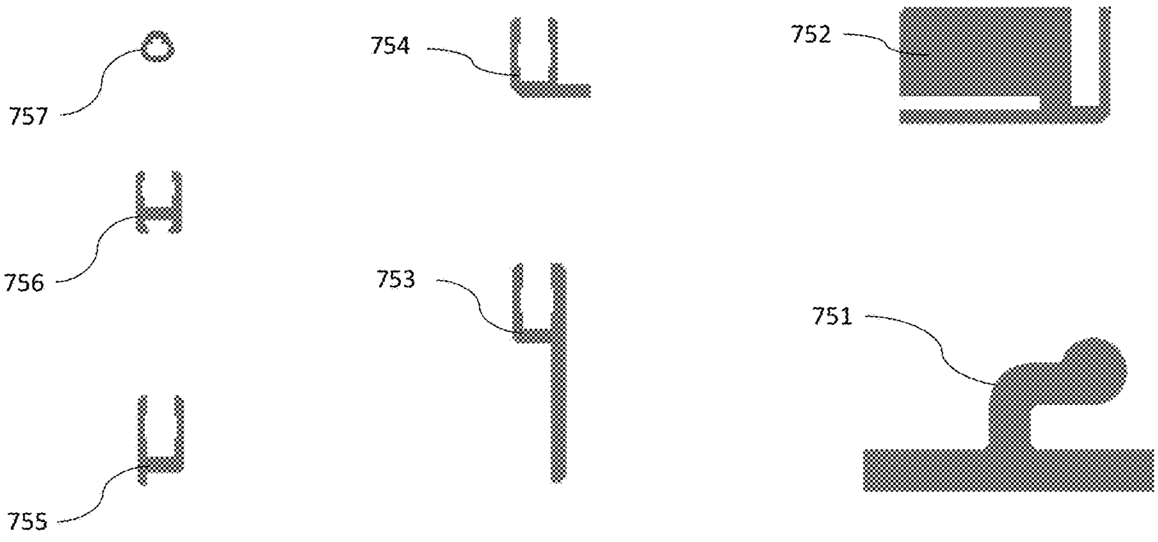
FIG. 123. Profiles used in the Cabin Doors construction

CABIN MECHANICS OF PANORAMIC VACUUM ELEVATOR

BENEFIT CLAIM

This application claims the benefit under 35 U.S.C. § 119(e) of provisional application 63/331,517, filed Apr. 15, 2022, the entire contents of which are hereby incorporated by reference for all purposes as if fully set forth herein.

This application also claims the benefit under 35 U.S.C. § 120 as a continuation-in-part of U.S. patent application Ser. No. 17/371,019, filed on Jul. 8, 2021, referred to herein as "Hoistway Application," which claims the benefit under 35 U.S.C. § 119(e) of provisional application 63/049,642, filed on Jul. 9, 2020, the entire contents each of which are hereby incorporated by reference for all purposes as if fully set forth herein.

FIELD OF INVENTION

The present approaches are in the field of elevators, for transporting people, animals and things in an elevator cabin in a vertically situated or vertically inclined elevator shaft. More specifically, the present approaches are in the field of vacuum elevators, where the elevator cabin is brought into motion in a vertically situated or vertically inclined and hermetically sealed elevator shaft by means of air pressure differential above and below the elevator cabin.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Existing elevator designs differ by means of operation; they have significant limitations.

Traction Elevators are the most common type of elevator, where the cabin is raised and lowered by traction steel ropes or belts on a pulley system.

Due to concrete shaft, rails, guides, and counterweights, traction elevators are not space-efficient—traction elevators occupy a large footprint and usually require a separate machine room on top of the elevator shaft. In addition, Traction elevators are expensive to install and maintain and are not suited for low-rise buildings or for use in a private setting inside a dwelling unit or small office due to occupying large footprint, having high cost of installation and high cost of maintenance, and bearing health risks due to voluminous lubricating oils carrying cancer agents.

Traction elevator designs use a counterweight to offset the weight of the cabin and its occupants. With such design, the motor does not have to move as much weight. Traction elevators may be geared or gearless. In geared elevators, there is a gearbox attached to the motor that drives the wheel and moves the ropes. Geared machines can reach speeds of up to 500 ft./min. These models may have a middle-of-the-road cost in terms of initial investment, maintenance costs and energy consumption. In gearless traction elevators, the sheave is attached directly to the end of the motor.

These models can reach speeds of up to 2,000 ft./min. These models have a high initial cost investment and average maintenance costs. Gearless traction elevators are, however, more energy-efficient than geared traction elevators.

Traction elevators are best suited in high rise buildings in a ventilated shaft located outside the living space, where the large footprint overhead and high installation and maintenance cost are tolerable.

Hydraulic Elevators don't use overhead hoisting machinery. Instead, these elevators lift the cabin by using a hydraulic fluid-driven piston that is mounted inside of a cylinder. The hydraulic fluid has traditionally been synthetic oil-based, creating an environmental impact where installed.

The limitations of hydraulic elevators are low-rise, low speed, high cost of installation and maintenance, high energy cost and high environmental impact, which makes these type elevators unsuitable for installations in private houses. Hydraulic elevators are often found in buildings of up to five stories high, due to low speeds of operation—typically 150 ft./min. or less.

Another reason for the height limitations of hydraulic elevators is the construction of the hydraulic cylinder and the piston that cannot spread to longer heights due to technological limitations. In addition, the power consumption of hydraulic elevators is higher compared to other elevator types. There are three different types of hydraulic elevators: Holed, Hole-less and Roped. The Holed type of hydraulic elevator has the hydraulic cylinder(s) placed inside of a drilled hole and allows up to 60' of travel. The Hole-less hydraulic elevators do not require a drilled hole, making this type of elevator ideal for existing buildings or in areas where drilling would be too difficult or expensive. Hole-less elevators should not be installed anywhere that requires more than 40 feet of travel. Roped Hydraulic Elevators use a combination of ropes and a piston to move the elevator, and their maximum travel distance is about 60 feet.

Machine-Room-Less (MRL) Elevators are traction elevators that do not have a dedicated machine room above the elevator shaft. The machine sits in the override space and is accessed from the top of the elevator cab when maintenance or repairs are required.

MRL elevators are not suited well for usage in private houses or single dwelling units due to environmental impact, relatively high noise level, large footprint, and the mid-to-high prohibitive cost of installation and maintenance.

The control boxes are located in a control room that is adjacent to the elevator shaft. MRL elevators have a maximum travel distance of up to 250 feet and can travel at speeds up to 500 feet-per-minute. MRL elevators are comparable to geared traction elevators in terms of initial and maintenance costs, but MRL elevators have relatively low energy consumption compared to geared elevators. Machine-room-less elevators are becoming the most popular choice for mid-rise buildings where the travel distance is up to 250 feet. MRL elevators are energy efficient, require less space, and their operation and reliability are on par with gear-less traction elevators. The main reason that MRL elevators have been adopted so slowly in the United States is that the building codes had provisions that did not allow the motor to be situated within the hoistway.

Shaftless Elevators are small residential elevators designed to fit into 2-story living with minimal disruption during installation. They are a good alternative to a stairlift or shafted elevator. The limitations of shaftless elevators are many, including safety concerns, which mandate this elevator to travel one floor only, as it represents a fall hazard due to the "open" shaft construction, due to high risk of injury from potential limb cuts. Hence, the shaftless elevators are equipped with multitude of sensors to stop the cabin from motion, should it encounter an obstacle on its way up/down.

For safety reasons, this construction is equipped with constant pressure controls, meaning a person to press and hold an elevator call or destination floor buttons to bring and keep the cabin in motion. In addition, this elevator type is noisy, has a negative environmental impact, and has high maintenance costs.

As the name suggests, this type of elevator does not have a shaft and represents an "open" construction, where the rails/guides of the elevator are open and exposed, and the cabin travels up and down the open elevator rails. The motor is installed on top of the elevator cabin and uses ropes/cables to pull the cabin up/down.

Pneumatic Elevators use a partial vacuum in the "shaft" on top of the cabin to move the cabin up and down in a hermetically sealed hoistway shaft.

Due to technical limitations, pneumatic elevators have slow speed and small load capacity, they usually can lift a small load (up to 500 lbs for the largest model) and have significant installation limitations. Another disadvantage of pneumatic elevators is the use of acrylic material for the shaft—it wears out, scratches, and dims over time due to the friction with the cabin's vacuum seal. Among other disadvantages—are round tube shape making the shaft bulky in a private setting when accommodating a wheelchair and making it practically impossible for retrofit. Finally, high noise levels make this unique type of elevators far from being a preferred choice for private installations.

In pneumatic elevator designs, in order to keep the cabin at the same elevated level, a valve that is situated on top of the "shaft" is shut in conjunction with a diaphragm or a piston used as a "brake". The "brake" is also used if there's a sudden increase in pressure above the cabin. To go down, pneumatic elevator designs employ a valve so that the air can pressurize the "shaft", allowing the cabin to descent by its own weight. In case of power outage, the cabin automatically and slowly descends to the ground floor. The ride is not smooth, but rather "bumpy"—e.g., in order for the cabin to go down, first it needs to go a little up, so that brake pistons can retract, only then the cabin can go down by either reducing the vacuum forces or letting the outside air to enter the "shaft" and allowing the cabin to descend by its own weight. The same "bumpiness" is also evident during the ascend—when the cabin needs to stop at a certain floor, first it needs to go a little higher than the floor level, allowing brake pistons to retract, then descend to the floor level and rest on the retracted pistons. The "shaft" is made of acrylic material and has a round shape due to technological limitations of pneumatic elevator designs.

1. Shortcomings of the Prior Art

The shortcomings of existing solutions, that the present approaches aim to overcome, may be summarized as follows:

Poor design. Elevators are usually associated with clunky-chunky structures carrying loads of concrete and heavy metal in their construction. While these elements seem necessary at first, the core architecture of elevators has not changed for over 100 years and cries for a big change both in the technology and in the aesthetic design. In fact, the technological approaches, that are traditionally used in elevators over many years, impose certain restrictions on the size, shape, materials used and the aesthetics of the elevator design, representing a considerable challenge for the aesthetics. For that reason, the elevators in private homes are usually concealed to cover-up the ugly construction elements like rails, guides, chains, ropes, counterweights, pulleys and gears. As such, existing elevator systems have become an expensive item in buyer's budget, where the elevator is considered as a "need-to-have" solution in multi-story living for handicapped, disabled and impaired Unsafe. Ropes and cables can break, introducing risk of a free fall, and the system is dependent on emergency brakes that may fire up when cables are broken. The emergency brakes mechanism always requires rails to be present in the construction, as the brakes are being latched on rails. Loss of vacuum in pneumatic elevators creates free fall risk as well. The problem with safety is that any existing elevator design has its safety features dependent often on a single vital mechanism, like brakes latching to rails, which, with any failure, introduces a major safety hazard. Double and triple safety protection for a single feature is often considered a costly overhead. As a consequence, frequent maintenance becomes necessary with regular mandatory replacement of safety parts (e.g. cables, ropes, brakes) to ensure the operability of safety features at all times, which increases the cost of maintenance. In pneumatic elevators failure in electronics or valve control mechanism may create a free-fall risk as well. Shaftless elevators also possess serious risks of child injury and limb injury due to its open construction Health Hazard. Most of the elevators heavily use chemical oils to lubricate moving metal parts like gearboxes, rails, guides. In addition, hydraulic elevators use special synthetic hydraulic oils. All these oils have unwanted fumes carrying cancer agents and bringing unwanted oily smell into people's living. If placed in a common area with well-ventilated shaft (as modern mainstream installations are implemented), this is not a big problem. But when installed in a private house or a confined space—exposes occupants to hazardous fumes and becomes a health hazard Bulky—existing elevators occupy a large footprint. Traction, hydraulic and MRL elevators pretty much require a concrete shaft, a space for rails and guides, a space for sliding doors mechanism within the shaft and a space for counterweights, which extends the shaft footprint way beyond that of the cabin. As a matter of fact, traction, hydraulic and MRL elevators occupy a 3-5 times larger footprint than that of the cabin, making it "very bulky". Pneumatic elevators are shaped as round tubes and come in pre-assembled bodies, creating an installation challenge. These types of elevators also occupy substantially larger footprint than that of the cabin. For example, the pneumatic elevator model accommodating a wheelchair measures 5+ feet in diameter, which is unlikely to fit into any house door, becoming a retrofit showstopper. Shaftless elevators, on the contrary, occupy the smallest footprint, but are limited to one floor travel and represent a serious safety hazard. Bulky solutions have a major drawback when installing an elevator in existing houses and may be prohibitive when considering a retrofit elevator solution Noisy. The noise from a running motor, pulleys, guides, chains and, in case of the pneumatic elevator, a high noise air compressor—represent an additional challenge when considering an elevator installation into private houses and apartments Slow speed. All home elevators are extremely slow, traveling at speeds of 5-8 inches per second. Faster solutions are usually associated with bulkier and costlier alternatives High energy costs. Due to friction in gearboxes, pulleys, rails and guides of any existing system on the market, an elevator uses a substantial amount of power for overcoming friction, making the overall system energy non-efficient Expensive. Due to heavy metal structures like rails and guides, gearboxes, concrete shaft and lengthy installation, modern elevators bear high product and installation costs. In addition, due to frequent maintenance and replacement of wearable parts, the maintenance cost becomes high, making the high cost of installing and maintaining the elevator—a prohibitive factor.

The techniques presented in the current approaches down below in this document overcome the shortcomings outlined above.

BRIEF DESCRIPTION OF THE DRAWINGS

The approaches described herein may be better understood, and its numerous features and advantages made apparent to those skilled in the art by referencing the accompanying drawings. For ease of understanding and simplicity, common numbering of elements within the illustrations is employed where an element with the same number is the same in different drawings.

The drawings enumerated below are to be regarded in an illustrative rather than a restrictive sense. Each of the drawings depicts one or more embodiments of the invention and does not in any way limit the scope of the invention. The sole and exclusive indicator of the scope of the invention, and what is intended by the applicants to be the scope of the invention, is the literal and equivalent scope of the set of claims that issue from this application, in the specific form in which such claims issue, including any subsequent correction.

FIG. 1 depicts front, side, and back views of a 2-story Elevator system, in an embodiment.

FIG. 2 depicts Perspective views of a 2-story Elevator system with Cabin in motion, in an embodiment.

FIG. 3 depicts Front and side views of the Cabin, in an embodiment.

FIG. 4 depicts Bottom view of the Cabin, in an embodiment.

FIG. 5 depicts Top view of the Cabin, in an embodiment.

FIG. 6 depicts Perspective upper front and lower front views of the Cabin, in an embodiment.

FIG. 7 depicts Perspective upper and lower zoomed views of the Cabin front bottom corner, in an embodiment.

FIG. 8 depicts Perspective upper back and lower back views of the Cabin, in an embodiment.

FIG. 9 depicts Perspective upper and lower zoomed views of the Cabin back bottom corner, in an embodiment.

FIG. 10 depicts Perspective exploded view of the Cabin, in an embodiment.

FIG. 11 depicts Front and side views of the Cabin Body, in an embodiment.

FIG. 12 depicts Top and bottom views of the Cabin Body, in an embodiment.

FIG. 13 depicts Perspective view of the Cabin Body, in an embodiment.

FIG. 14 depicts Perspective view of the Cabin upper hinge front angle, in an embodiment.

FIG. 15 depicts Perspective view of the Cabin upper hinge back angle, in an embodiment.

FIG. 16 depicts Perspective view of the Cabin upper hinge top angle, in an embodiment.

FIG. 17 depicts Perspective view of the Cabin upper hinge side angle, in an embodiment.

FIG. 18 depicts Bottom perspective back corner view of Cabin Body with exploded glass link, in an embodiment.

FIG. 19 depicts Front angle perspective view of the Cabin lower hinge, in an embodiment.

FIG. 20 depicts Cabin door hinge position in closed, half-open and open states, in an embodiment.

FIG. 21 depicts Top and perspective views of the Cabin Body back corner, in an embodiment.

FIG. 22 depicts Top view of the front and back corners of the Cabin Body, in an embodiment.

FIG. 23 depicts Bottom view of the Cabin lower hinge, in an embodiment.

FIG. 24 depicts Front perspective zoomed view of the Cabin doors middle connection, in an embodiment.

FIG. 25 depicts Front perspective exploded view of the Cabin Body, in an embodiment.

FIG. 26 depicts Front, side, back, middle, top, bottom and exploded views of the Cabin Door, in an embodiment.

FIG. 27 depicts Top front perspective views of the Cabin Door lower edge, in an embodiment.

FIG. 28 depicts Bottom front perspective views of the Cabin Door lower edge, in an embodiment.

FIG. 29 depicts Bottom front exploded views of the Cabin Door lower edge, in an embodiment.

FIG. 30 depicts Top back perspective views of the Cabin Door lower edge, in an embodiment.

FIG. 31 depicts Bottom back perspective views of the Cabin Door lower edge, in an embodiment.

FIG. 32 depicts Bottom back exploded views of the Cabin Door lower edge, in an embodiment.

FIG. 33 depicts Top perspective views of the Cabin Door middle side upper corner, in an embodiment.

FIG. 34 depicts Front and back exploded views of the Cabin Door middle edge upper corner, in an embodiment.

FIG. 35 depicts Back perspective view of the Cabin Door upper hinge, in an embodiment.

FIG. 36 depicts Top front exploded view of the Cabin Door middle edge upper corner, in an embodiment.

FIG. 37 depicts Perspective zoomed views of the Cabin door lower hinge, in an embodiment.

FIG. 38 depicts Perspective zoomed views of the Cabin door upper hinge, in an embodiment.

FIG. 39 depicts Top and bottom views of the Cabin Door hinge, in an embodiment.

FIG. 40 depicts Front and back views of the Cabin Door hinge, in an embodiment.

FIG. 41 depicts Side view of the Cabin Door hinge, in an embodiment.

FIG. 42 depicts Various perspective views of the Cabin Door hinge, in an embodiment.

FIG. 43 depicts Front and side views of the Cabin Head Frame, in an embodiment.

FIG. 44 depicts Back view of the Cabin Head Frame, in an embodiment.

FIG. 45 depicts Bottom view of the Cabin Head Frame, in an embodiment.

FIG. 46 depicts Top view of the Cabin Head Frame (with a full-size wheelchair in the Cabin), in an embodiment.

FIG. 47 depicts Front perspective top view of the Cabin Head Frame, in an embodiment.

FIG. 48 depicts Back perspective top view of the Cabin Head Frame, in an embodiment.

FIG. 49 depicts Back perspective zoomed view of the Cabin top, in an embodiment.

FIG. 50 depicts Perspective zoomed views of the Cabin front and back top corners, in an embodiment.

FIG. 51 depicts Bottom angle perspective views of the Cabin Head Frame, in an embodiment.

FIG. 52 depicts Top exploded view of the Cabin Head Frame, in an embodiment.

FIG. 53 depicts Top and bottom angle views of the Cabin Head Frame far corner, in an embodiment.

FIG. 54 depicts Bottom angle view of the Cabin Head Frame far corner with glass link bolts, in an embodiment.

FIG. 55 depicts Bottom angle view of the Cabin Head Frame far corner with ventilation grill, in an embodiment.

FIG. 56 depicts Bottom exploded view of the Cabin Head Frame, in an embodiment.

FIG. 57 depicts Front and side views of the Cabin Base, in an embodiment.

FIG. 58 depicts Back view of the Cabin Base, in an embodiment.

FIG. 59 depicts Bottom view of the Cabin Base, in an embodiment.

FIG. 60 depicts Top view of the Cabin Base, in an embodiment.

FIG. 61 depicts Back perspective top view of the Cabin Base, in an embodiment.

FIG. 62 depicts Front perspective view top of the Cabin Base, in an embodiment.

FIG. 63 depicts Back perspective zoomed view of the Cabin Foundation, in an embodiment.

FIG. 64 depicts Top exploded view of the Cabin Base, in an embodiment.

FIG. 65 depicts Front and side views of the Cabin Ceiling glass panel, in an embodiment.

FIG. 66 depicts Bottom view of the Cabin Ceiling glass panel, in an embodiment.

FIG. 67 depicts Top view of the Cabin Ceiling glass panel, in an embodiment.

FIG. 68 depicts Right edge angle view of the Cabin Ceiling glass panel, in an embodiment.

FIG. 69 depicts Left edge view of the Cabin Ceiling glass panel, in an embodiment.

FIG. 70 depicts Top perspective view of the Cabin Ceiling glass panel, in an embodiment.

FIG. 71 depicts Front and side views of the Cabin Vacuum Seal, in an embodiment.

FIG. 72 depicts Back view of the Cabin Vacuum Seal, in an embodiment.

FIG. 73 depicts Bottom view of the Cabin Vacuum Seal, in an embodiment.

FIG. 74 depicts Top view of the Cabin Vacuum Seal, in an embodiment.

FIG. 75 depicts Top outside angle view of the Cabin Vacuum Seal corner, in an embodiment.

FIG. 76 depicts Bottom perspective view of the Cabin Lower Vacuum Seal, in an embodiment.

FIG. 77 depicts Top perspective view of the Cabin Upper Vacuum Seal, in an embodiment.

FIG. 78 depicts Top exploded view of the Cabin Vacuum Seal, in an embodiment.

FIG. 79 depicts Outside top perspective view of the Cabin Vacuum Seal side edge, in an embodiment.

FIG. 80 depicts Outside top perspective view of the Cabin Vacuum Seal front edge, in an embodiment.

FIG. 81 depicts Front top angle view of the Cabin Vacuum Seal inside corner, in an embodiment.

FIG. 82 depicts Cross-section view of the Cabin Vacuum Seal, in an embodiment.

FIG. 83 depicts Front top angle view of the Cabin Vacuum Seal outside corner, in an embodiment.

FIG. 84 depicts Front and side views of the Cabin Head Outer Frame, in an embodiment.

FIG. 85 depicts Back view of the Cabin Head Outer Frame, in an embodiment.

FIG. 86 depicts Bottom view of the Cabin Head Outer Frame, in an embodiment.

FIG. 87 depicts Top view of the Cabin Head Outer Frame, in an embodiment.

FIG. 88 depicts Bottom perspective view of the Cabin Head Outer Frame, in an embodiment.

FIG. 89 depicts Top perspective view of the Cabin Head Outer Frame, in an embodiment.

FIG. 90 depicts Top exploded view of the Cabin Head Outer Frame, in an embodiment.

FIG. 91 depicts Cross-section view of the Cabin Head Outer Frame profile, in an embodiment.

FIG. 92 depicts Various angle views of the Cabin Head Outer Frame, in an embodiment.

FIG. 93 depicts Front and side views of the Cabin Head Inner Frame, in an embodiment.

FIG. 94 depicts Bottom view of the Cabin Head Inner Frame, in an embodiment.

FIG. 95 depicts Top perspective and exploded views of the Cabin Head Inner Frame, in an embodiment.

FIG. 96 depicts Top view of the Cabin Head Inner Frame, in an embodiment.

FIG. 97 depicts Inside and outside edge views of the Cabin Head Inner Frame, in an embodiment.

FIG. 98 depicts Cross-section view of the Cabin Head Inner Frame profile, in an embodiment.

FIG. 99 depicts Various corner angle views of the Cabin Head Inner Frame, in an embodiment.

FIG. 100 depicts Front and side views of the Cabin Base Outer Frame, in an embodiment.

FIG. 101 depicts Back view of the Cabin Base Outer Frame, in an embodiment.

FIG. 102 depicts Bottom view of the Cabin Base Outer Frame, in an embodiment.

FIG. 103 depicts Top view of the Cabin Base Outer Frame, in an embodiment.

FIG. 104 depicts Top perspective view of the Cabin Base Outer Frame, in an embodiment.

FIG. 105 depicts Top exploded view of the Cabin Base Outer Frame, in an embodiment.

FIG. 106 depicts Top outside angle view of the Cabin Base Outer Frame front corner, in an embodiment.

FIG. 107 depicts Cross-section view of the Cabin Base Outer Frame profile, in an embodiment.

FIG. 108 depicts Bottom outside angle view of the Cabin Base Outer Frame front corner, in an embodiment.

FIG. 109 depicts Various views of the Cabin Base Outer Frame inside corner, in an embodiment.

FIG. 110 depicts Front and side views of the Cabin Base Inner Frame, in an embodiment.

FIG. 111 depicts Back view of the Cabin Base Inner Frame, in an embodiment.

FIG. 112 depicts Bottom view of the Cabin Base Inner Frame, in an embodiment.

FIG. 113 depicts Top view of the Cabin Base Inner Frame, in an embodiment.

FIG. 114 depicts Top perspective view of the Cabin Base Inner Frame, in an embodiment.

FIG. 115 depicts Top exploded view of the Cabin Base Inner Frame, in an embodiment.

FIG. 116 depicts Top outside angle view of the Cabin Base Inner Frame back corner, in an embodiment.

FIG. 117 depicts Top outside angle view of the Cabin Base Inner Frame front corner, in an embodiment.

FIG. 118 depicts Cross-section view of the Cabin Base Inner Frame profile, in an embodiment.

FIG. 119 depicts Top inside angle view of the Cabin Base Inner Frame back corner, in an embodiment.

FIG. 120 depicts Perspective exploded view of the Cabin Base Lower and Upper Decks, in an embodiment.

FIG. 121 depicts Frontal cross-section view of the Cabin Head, Body and Base connections, in an embodiment.

FIG. 122 depicts Profiles used in the Cabin construction, in an embodiment.

FIG. 123 depicts Profiles used in the Cabin Doors construction, in an embodiment.

DETAILED DESCRIPTION OF THE INVENTION

The present approaches may be better understood and reproduced by those skilled in the art by referencing the accompanied drawings with detailed description of machinery, operating modes, and principles.

While the foregoing written description of the approaches enables one of ordinary skill to make and use what is considered presently to be the best mode thereof, those of ordinary skill may understand and appreciate the existence of variations, combinations, and equivalents of the specific embodiment, method, and examples herein. The invention should therefore not be limited by the below described embodiment, method, and examples, but by all embodiments and methods within the scope and spirit of the invention.

GENERAL OVERVIEW

Techniques are described herein for an elevator apparatus (also referred to as "Panoramic Vacuum Elevator") that includes a cabin apparatus (also referred to herein as "Cabin") and a hoistway apparatus (also referred to herein as "Hoistway"). The present approaches include a Panoramic Vacuum Elevator system for transporting people, animals and things in a vertically situated or vertically inclined elevator shaft, in which strengthened glass is used. For example, large tempered glass panels are used as main construction elements of the elevator hoistway (Hoistway) and the elevator cabin (Cabin), in an embodiment.

Contrary to the popular use of glass panels, where glass is traditionally used as a filler in a constructive metallic frame skeleton, the glass panels in the present techniques, are the main construction elements of the Panoramic Vacuum Elevator system and are the "exoskeleton" of the system, carrying the weight of the entire construction, in an embodiment.

The glass panels, when used in the Hoistway construction, are stacked atop a "Hoistway Belt" assembly, made of aluminum alloy, in an embodiment, and which is holding the glass panels tight and together, resisting from imploding forces of atmospheric pressure in case of low-pressure inside the shaft and resisting exploding forces of high-pressure, if any, inside the shaft, thus forming a sturdy constructive assembly, in an embodiment.

The combination of a Hoistway Belt and one-story glass panels assembly forms a one-story elevator shaft assembly with smooth surface inside the elevator shaft assembly, in an embodiment. This example one-story elevator shaft assembly has a doorway entry on one side, "sitting" atop the "Hoistway Belt" and allowing people, animals and things to enter in and exit out of the elevator Cabin, in an embodiment.

Multiple one-story elevator shaft assemblies may be stacked on top of each other, forming an elevator Hoistway with a plurality of stories (floors) assemblies with a doorway entry at each floor level and having a uniformly flat surface inside the Hoistway for smooth Cabin ride and proper vacuum operation, in an embodiment.

Hoistway Belts at each floor level may be leveled-up with the floor and affixed to the floor, making the whole construction steady. In an embodiment, the Hoistway Belts lie within the thickness of the floor, thus making the glass panels appear to run from floor to ceiling.

The entire construction is resting on a plurality of pins, which are freely resting on the foundation frame, in an embodiment. Thus, the whole construction is detached from the foundation, allowing the system to resist earthquake shakes and shocks, in such an embodiment.

Techniques described herein include the Cabin having multiple glass panels and placed within the Hoistway. In an embodiment, the glass panels of Cabin include a top glass panel and side glass panel(s). The top glass panel is horizontally aligned (and parallel to the horizontal cross-section of the hoistway apparatus) and is perpendicular to the side glass panels, to which the top glass panel is coupled. In an embodiment, the walls of the elevator Cabin are also made from strengthened glass, such as tempered glass or borosilicate glass, and are affixed to the Cabin floor and the Cabin top (ceiling), in an embodiment, and carry the weight of the Cabin together with its load. In particular, the top glass panel may support the weight of the Cabin and any load inside the cabin.

The glass-made Cabin is sliding (e.g., vertically moving) in a glass-made Hoistway shaft (Hoistway Shaft), supported by vacuum forces via the creation of difference in air pressure above the Cabin and below the Cabin, in an embodiment. When the air pressure above the cabin is decreased, the higher atmospheric pressure below the Cabin may push the Cabin up, overcoming the gravitational forces imposed by the Cabin and its load if any. Conversely, decreasing such a difference in the air pressure may cause the Cabin to descend the Hoistway under the gravitational forces of the Cabin and its load if any.

In an embodiment, the lower air pressure above the Cabin is created via a high airflow compressor equipment that "sucks" the air from the elevator Hoistway above the Cabin and creates enough air pressure difference in the Hoistway above and below the Cabin—to push the Cabin up, ascending through the Hoistway. The airtight connection between the Cabin and the Hoistway is maintained by seal(s) attached to Cabin and/or the Hoistway, in an embodiment. The term "airtight connection" refers to herein to a connection which may have air leakage through the connection; however, at such a rate that the difference in the air pressure is maintained above and below the Cabin (e.g. the Cabin Head) to move up or keep steady the Cabin within the Hoistway. Accordingly, such leakage may be relative to the power of compressor(s) that pump air out of the Hoistway (e.g., from the portion of the Hoistway above the Cabin).

The advantages of a glass vacuum elevator system include the following benefits compared to other existing solutions:

- is not required for the elevator system to incorporate any rails, guides, hydraulics, ropes, belts, pulleys, gears, chains, or counterweights, and, therefore, is simpler to install and maintain has significant aesthetic advantages, since transparent or translucent large glass panels are a better fit into practically any interior, even if installed in the middle of the room the construction is very compact, occupying several times smaller footprint compared to any other existing solution is safer to use compared to traditional elevator models, in particular, it is child-safe, fall-proof, fireproof, shockproof, shatterproof, power outage friendly has a lower cost of manufacturing due to lower cost of used materials has inherent transportation and assembly advantages due to less bulky parts has lower maintenance costs due to a small number of wearable parts and absence of lubrication is eco-friendly, does not require lubricants and is fully recyclable after demolition.

In one embodiment the glass Hoistway—is a triangular shaped Hoistway, comprising of 3 large glass panels running from floor to ceiling and a doorway entry at each one-story assembly. In this embodiment a triangular shaped Cabin is installed in the Hoistway.

In an alternate embodiment the glass Hoistway—is a rectangular shaped Hoistway, comprising of 4 large glass panels running from floor to ceiling and a doorway entry at each one-story assembly. In this embodiment a rectangular shaped Cabin is installed in the Hoistway.

In an alternate embodiment the glass Hoistway—is a pentagonal shaped Hoistway, comprising of 5 large glass panels running from floor to ceiling and a doorway entry at each one-story assembly. In this embodiment a pentagonal shaped Cabin is installed in the Hoistway.

In an alternate embodiment the glass Hoistway may be of a hexagonal form, comprising of 6 large glass panels, running from floor to ceiling on each floor. Doorway entry may be installed within 2 adjacent Hoistway glass panels.

In another embodiment the glass Hoistway is of an octagonal shape comprising of 8 large glass panels, running from floor to ceiling on each floor. This embodiment may be visualized as a rectangular shaped Hoistway, where the angular edges of the Hoistway are "flattened" to form additional panels. These "angular flat edges" allow reducing the width of other "non-angular flat" edges of the Hoistway. Such embodiment becomes handy for large size elevator models where the width of the Hoistway may be substantially wider than the opening of the Hoistway door.

In another embodiment the glass Hoistway is of a cylindrical shape with a straight vertical axis. In such an embodiment, a cylindrical shaped Cabin is placed in a cylindrical Hoistway. This embodiment is more suitable for larger models carrying more people and heavier loads.

In a different embodiment the glass Hoistway has an ellipsoid shape with straight vertical axises. In such an embodiment, an ellipse-shaped Cabin is placed inside an ellipsoid-shaped Hoistway and is more suitable for larger models carrying large groups of people and heavy loads.

In a different embodiment the glass Hoistway has a horseshoe shape with straight vertical axis. In such an embodiment, an ellipse-shaped Cabin with a flattened side is placed inside an ellipsoid-shaped Hoistway with a flattened side and is more suitable for larger models carrying large groups of people and heavy loads.

As discussed in the above embodiments, the approaches described herein include a multitude of different shapes for the Hoistway and a multitude of different shapes for the Cabin.

An alternate embodiment, the Hoistway and/or the Cabin includes multi-layer tempered glass panels, where a multitude of tempered glass panels are glued together by means of a special adhesive, forming a "safety glass" panel.

In another embodiment, one or more panels of the Hoistway are made of matte tempered glass, to obscure the contents of the Hoistway and/or Cabin—for the specific taste of elevator users. In an alternate embodiment, one or more panels of the Hoistway are painted or covered with a semi-translucent or non-translucent film, to hide the contents of the Hoistway and or Cabin, for the specific taste of elevator users.

In an alternate embodiment, the Cabin's one or more panels, or their parts, are made of matte glass, to obscure the contents of the Cabin—for the taste and comfort of elevator users. In an alternate embodiment, one or more panels of the Cabin or their parts are painted or covered with a semi-translucent or non-translucent film, to hide the contents of the Cabin completely or partially, for the taste and comfort of elevator users.

In one embodiment the vacuum compressor is situated atop the elevator Hoistway, thus forming a machine room (MR) atop the Hoistway.

In an alternate embodiment the vacuum compressor may be detached and remotely located in an attic, roof, or other location and connecting the Hoistway to a remote vacuum compressor via pipes for remote air intake and exhaust.

An alternate embodiment of the glass vacuum elevator system includes a feedback pipe from the compressor airflow exhaust connected to the bottom of the Hoistway for circulating the air from the top of the Cabin to its bottom. Such a system maintains the required pressure difference above and below the Cabin for normal elevation operation, while reducing the pressure variations on each glass panel compared to atmospheric. For example, in such a system, Hoistway glass may have a reduced thickness, as Hoistway glass panels are exposed to a fraction of (e.g., ½) of the air pressure swings in relation to atmospheric. This embodiment may include complex construction of the Hoistway Doors, as such doors need to withstand both the inward and the outward pressures at different times.

In one embodiment the Cabin roof incorporates additional mechanisms, like lighting, ventilation system, voice communication.

In an alternate embodiment, the roof of the Cabin is made of transparent or translucent glass, having a thin frame at its edges. For example, this and other embodiments may leave little or no space for mechanisms like the ventilation system. For that purpose, the air ventilators may be installed under the Cabin floor with air intake at the floor level and pushing the air outside and around the Cabin to the Hoistway through air slits below the floor. This suction of the air from the Cabin and slight increase of air pressure outside and around the Cabin creates an air inflow into the Cabin from air slits at the roof frame, resulting in air inflow from the Cabin's roof, in an embodiment. This embodiment provides a constant airflow of the ventilation system in the Cabin where the air flows from the Cabin's roof while there may be no visible means of ventilators or pipes that can direct the air inflow. The upper and lower Cabin seals ensure a constant air pressure outside and around the Cabin for the ventilation system to work, in such an embodiment.

In one embodiment the Cabin has an embedded docking mechanism allowing the Cabin to dock to the destination floor by means of self-guided extendable and retractable pins that extend from the Cabin floor and dock to the Hoistway after the Cabin arrives at the destination floor.

After docking, the vacuum compressor shuts down, thus keeping the entire system in low-energy idle mode, awaiting passengers. In an embodiment, the Cabin includes a single docking mechanism, thus having one docking mechanism working for multiple floors. In this embodiment, the Hoistway has a significantly simpler and lower construction cost, while the Cabin cost may increase slightly.

In an alternate embodiment the docking mechanism is implemented at each floor level in the Hoistway and not in the Cabin, thus increasing the cost of the Hoistway, but simplifying the cost and operation of the Cabin.

In one embodiment the Cabin has a separate extendable and retractable pin or pins that mechanically open and close the Cabin and Hoistway Doors. The benefit of having the doors opening/closing mechanism implemented and operating from inside the Cabin is—one door opening mechanism working for multiple floors, without having a door opening mechanism duplicated for each floor. Also, this is a safer approach, as it eliminates the possibility of Hoistway Doors opening accidentally in case of an absent Cabin, due to failed electronics controls.

In an alternate embodiment the door opening/closing mechanism is implemented at each floor level in the Hoistway and not in the Cabin, thus increasing the cost of the Hoistway, and may be reducing the safety of the system.

At the Hoistway Belt level of each floor there is a closed enclosure—the Hoistway Base. The Hoistway Base is attached to the Hoistway Belt on one side and to the floor of the dwelling space on the other side, thus fixating the Hoistway to the house construction at each floor level.

The Hoistway Base is installed within the thickness of the floor and is covered with a special rigid and ribbed metal cover serving as a pathway/entrance to the Cabin. Once the cover is removed, it exposes the Hoistway Base contents for Hoistway Base service works.

The Hoistway Base includes one or more of the following mechanisms, in an embodiment:

- Sensors detecting the position of the Cabin in the Hoistway
- Receptacles for the docking pins along with electrical contacts for Cabin battery recharging
- Doors opening/closing spring-chain mechanisms along with sensors detecting obstacles in the path of the Hoistway doorway and failures of the spring-chain mechanism, if occurred
- Vertical adjustment mechanism tuning the Hoistway Doors for proper vacuum operation
- Locking mechanism that locks the Hoistway Doors in the absence of the elevator Cabin
- Electrical and electronic circuitry ensuring power supply for battery charging, sensors operation and communication with Hoistway PLC controller.

In one embodiment the Hoistway and Cabin doors are opening/closing in a slide operation sitting on and rolling over special rails. This embodiment is better suited for circular or ellipsoid shaped elevator Hoistway. Another benefit of this approach is that both the Hoistway and the Cabin doors are not extending from the Hoistway's footprint, adding more flexibility to the space limitations at the Cabin entrance.

In an alternate embodiment the Hoistway and Cabin doors are opening/closing in a parallel swing by means of levers that keep doors substantially parallel to their opening while swinging the doors to open/close. This embodiment is better suited for hexagonal, octagonal, circular and ellipsoid type Hoistway. It is less space-efficient than the sliding opening mechanism above.

In a different embodiment the Hoistway and Cabin doors are opening/closing in a swing operation sitting on hinges. This embodiment is better suited for rectangular, hexagonal and octagonal shaped Hoistway, although it may be suitable for circular and ellipsoid Hoistway too.

In one embodiment both the Hoistway and the Cabin have a single-leaf door. This embodiment simplifies the construction of both the Hoistway and the Cabin but may require extra clearance for the Hoistway Doors due to a large swing of a single-leaf door. This embodiment may be a preferred choice for low-cost, compact models in the line of elevator products.

In an alternate embodiment both the Cabin and the Hoistway have double-leaf doors. The double pair doors are opening in an outward swing (sliding, parallel or circular) and take less space compared to single-leaf embodiment. This type of construction may be a preferred choice for higher-priced models in an upper (more luxury) line of elevator products.

In one embodiment, the doorway entries at each floor level of the Hoistway and the Cabin—are facing the same direction. In such an embodiment, people need to enter and exit the Cabin from the same side at each floor level.

In an alternate embodiment the doorway entries at each floor level may be facing different directions depending on the architectural requirements and the layout ergonomics of the living space (different side entry).

For rectangular-, hexagonal-, octagonal- and ellipsoid-shaped Hoistway implementations, in the different side entry embodiments, the Cabin, in addition to the first set of doors, may need to be equipped with an additional set of doors and door mechanisms at the opposite side of the Cabin—opposite to the first set of doors. This approach allows people to enter from one side of the Cabin and exit at the opposite side, when required so. Such an embodiment complicates the construction of the Cabin and increases its cost, but best accommodates the architectural restrictions and the requirements of living space, when needed.

For circular shaped Hoistway different side entry embodiment may be accommodated by having the double and opposite door operating mechanisms in the Cabin. Alternatively, a circular Cabin may have just a single door operating mechanism but enabling the Cabin to rotate around Hoistway's vertical axis and to modify and adjust its position to match the position of Hoistway Doors at the destination floor, as needed. This Cabin's rotation may be performed during its vertical motion, resulting in an overall spiral motion of the Cabin during ascend or descend, while the Cabin orients itself, to position the Cabin doors with the Hoistway entrance. In such an embodiment the Cabin's rotation may be accomplished by rubber wheels attached to the Cabin and pressed to the circular Hoistway Shaft. Rotation of such rubber wheels in horizontal plane results in a horizontal rotation of the Cabin. Precise electronics can control the amount of rotation the Cabin needs to undergo, in order to position with the destination floor properly.

In an embodiment, the Hoistway is equipped with an upper valve situated at the top of the Hoistway that may shut-off the airflow and prevent the air from escaping or entering the Hoistway at the top. Such mechanism is needed for emergency brakes as part of the safety mechanism which allows halting the Cabin in mid-air if a fall risk situation is detected, e.g., an electricity outage while the Cabin was in motion or compressor failure due to its physical damage and impeller break—all resulting in a sudden loss of vacuum operation. Once the upper valve is activated, the Cabin soon stops its free fall, being supported by atmospheric pressure from the bottom and is "hanging" from the lower air pressure at the top, which is created by Cabin's own weight (syringe effect). The upper valve can also be activated automatically in other scenarios when a failure condition is detected in lower level door mechanisms, door locks and seals that can potentially compromise the vacuum operation and the safety of passengers, even if no imminent fall risk is detected. Once the upper valve has been shut-off, the Cabin quickly halts its motion and gradually and slowly descends to the ground floor due to natural air leaks of the system.

In an embodiment, the upper valve is activated by an electromagnetic lever powered by rechargeable batteries that operate with and without external power. As part of the safety mechanism, additionally or alternatively, the upper valve may be activated by means of automated mechanical deployment in case the electrical circuitry failed to intervene (failure one of the: electromagnetic lever, the accelerometer at the Cabin, the control block or the reserve battery supply). This mechanical deployment of the upper valve—may serve as a redundant safety mechanism that improves the overall safety of the system.

Additionally, or alternatively, the Hoistway may be equipped with a lower valve situated at the bottom of the shaft that may shut-off the airflow and prevent the air from escaping or entering the Hoistway at the Hoistway bottom. Such a mechanism is part of the safety mechanism, which is activated when one or more safety risk factors are detected. In addition to the fall-risk factors defined above, e.g., failure of the vacuum seal (Vacuum Seal) of the Cabin, an unlikely scenario of partial destruction of the upper portion of the shaft resulting in a sudden loss of vacuum operation, when the upper valve is not sufficient to prevent the air from escaping the shaft may trigger the described safety mechanism(s). Once the lower valve has been shut-off, the Cabin quickly halts its motion, supported by higher than atmospheric air pressure below the Cabin, and gradually and slowly descends to the ground floor due to natural air leaks of the system. In other words, the Cabin is "sitting" on an air cushion with higher pressure, while "hanging" from a thin air, thus, preventing the Cabin from falling.

The lower valve may be activated by an electromagnetic lever powered by rechargeable batteries that operate with and without external power and may have a redundant mechanical deployment mechanism in case the electromagnetic mechanism fails, similar to electro-mechanical redundant deployment implementation of the upper valve.

In an embodiment, both the upper and lower valves complement each other and ensure the safety of Cabin passengers during different risk factors of the system and provide a safety mechanism effectively eliminating any and all fall risks. If the system detects one of the failure risks described above, while the Cabin was docked to a floor, the system flags an error condition, and the Cabin stays docked to that floor until the error condition is resolved in the system, without a need to deploy the emergency brakes—the upper and/or lower valves, in an embodiment.

In addition to upper and lower valves that slow-down Cabin's descent in case of sudden loss of vacuum, the system, in an embodiment, may be equipped with suspension mechanism placed at the Hoistway Foundation that catches Cabin and slows it down to full stop, similar to suspension shocks and struts used in cars.

In an embodiment, the Hoistway has a set of electromechanical and electronic sensors connected electrically to a Hoistway controller device (e.g. Programmable Logic Controller, hereinafter referred to as the "Hoistway controller" or the "Hoistway PLC"), which detects signals from sensors and forms controlling signals to Hoistway actuators and motor invertor for controlling the work of the vacuum compressor. Additionally, the controller may process signals from elevator call buttons from different floors and can put the calls in a queue for processing and ensuring the optimal operation of the elevator.

The Cabin, in an embodiment, has a set of its own electromechanical and electronic sensors connected electrically to, in some embodiments, a separate controller device (e.g. Programmable Logic Controller, hereinafter referred to as the "Cabin controller" or the "Cabin PLC"), situated inside the Cabin and processing signals from Cabin sensors and sending signals to the Cabin control mechanisms, the docking mechanism, the doors opening/closing, controlling Cabin lights and ventilation, the emergency communication, also detecting Cabin call commands and putting call commands in a queue ensuring the optimal operation of the elevator.

In other embodiments, a single controller may perform the functions of the Cabin and the Hoistway controllers.

In one embodiment, an electrical cable is connected between the Cabin and the Hoistway, supplying electrical power to the Cabin and providing means of communication between the Cabin PLC and the Hoistway PLC.

In an alternate embodiment, the Cabin PLC communicates with the Hoistway PLC via a wireless channel (IR, Bluetooth or Wi-Fi), eliminating the need for an electric cable connecting the Cabin and the Hoistway. In this embodiment the Cabin incorporates a rechargeable battery, providing local power supply in the Cabin. The Cabin rechargeable battery may recharge itself when the Cabin is docked to a floor—via electric wiring through the docking pins, ensuring an automatic charging of Cabin batteries during the docked mode, thus, ensuring uninterrupted power supply to the Cabin at all times, whether docked or in motion, or during short power outage.

When the Cabin is in motion, the Cabin rechargeable batteries provide life support of the Cabin: the lights, the fan, communication between the Hoistway and Cabin PLCs and means of emergency communication with the worldwide technical support 24/7.

In an embodiment, the Hoistway too is equipped with rechargeable batteries, providing life support for the Hoistway controller and its sensors, the upper and lower emergency brake valves and the suspension mechanism, in case of power outage and until the Cabin comes to a full stop and docks to the ground floor, awaiting the restoration of power or liquidation of failure scenarios.

In an embodiment, during vacuum operation, the Hoistway Doors are pressed against the Hoistway by atmospheric pressure with significant force (around 1 ton), preventing from opening by manual means, without special tools designed for that purpose. Hoistway Doors may also lack any handles, making it practically impossible to tamper with the doors during vacuum operation.

In addition, Hoistway Doors may be equipped with automatic locks, preventing the doors from opening in the absence of the elevator Cabin. Hoistway Doors may be opened in the presence of a docked Cabin at that floor, by mechanisms installed either in the Cabin or in the Hoistway. This mechanism is child-safe and is designed in a way that prevents any possibility of tampering with the system for foul play or irresponsible actions.

In an embodiment, to ensure the airtight connection between the Cabin and the cross-sectional inner periphery of Hoistway, seal(s) are peripherally coupled to the Cabin. The seal(s) of the Cabin divide the Hoistway into a top portion and a bottom portion, in which different air pressures in the Hoistway may co-exist because the seals prevent the air in the top portion from entering the bottom portion and vice versa.

For example, the main Vacuum Seal is installed at the top of the Cabin, enabling the vacuum operation and lower air pressure above the Cabin, while maintaining normal atmospheric pressure inside the Cabin, for the comfort of its passengers.

Additionally, or alternatively, the secondary or auxiliary Vacuum Seal is installed at the bottom of the Cabin for the following reasons:

- Serving as a back-up seal in case of the main vacuum seal failure
- Protecting people and animals in the Cabin from a sudden increase of pressure in case the lower valve is deployed in an unlikely case of an emergency brake. This is done for the comfort of passengers, who otherwise may experience air popping in their ears from a sudden change in the Cabin pressure due to a sharp increase of the air pressure below the Cabin, and causing it to slow-down, preventing a fall.

In one embodiment the Vacuum Seal is implemented from HDPE (High Density Polyethylene) material that has low friction with glass and excellent longevity properties. In this embodiment the Vacuum Seal is slightly extended from the Cabin sides and is pressed against the Hoistway wall by vacuum damper that may be made of multitude of springs or a spongy resin tube pushing the Vacuum Seal to the Hoistway wall alongside the entire seal length. This Vacuum Seal may be placed on each side of the Cabin. Such construction allows the Vacuum Seal to float during motion, accommodating Hoistway manufacturing imperfections, while being constantly attached to the Hoistway wall for proper vacuum operation.

In an alternate embodiment, the Vacuum Seal is made from materials other than HDPE, also having low friction and high longevity properties, e.g., Polytetrafluoroethylene (also known as Teflon) or combination of aluminum alloys or other metals coated with Teflon.

In one embodiment the Vacuum Seal is implemented in the form of horizontal stripes. This form simplifies the construction of the seal; however, it presents a disadvantage of having an intermittent "flappy" noise sound when the seal is crossing edges of the Hoistway Belt and Hoistway glass panels. Such "flappy" noise may be tolerable for most installations.

In a different embodiment the Vacuum Seal is implemented in form waves, or angled beams or zigzags, or saw-like shape, or any other shape, allowing the seal shape to be "spread" vertically, in order to stretch in time the crossing of the Hoistway Belt seam by the Vacuum Seal, thus "spreading" the "flappy" noise across a longer time period, which ultimately reduces unwanted noise levels. This complicates the construction of the Vacuum Seal and makes it more expensive to manufacture, for the comfort of elevator passengers and may be better suited in "luxury" elevator installations.

The safety of the system is ensured at multiple levels, in an embodiment:

- Shatterproof. The tempered glass panels of the Hoistway and the Cabin are unbreakable
- Shockproof. Resistant to even strong earthquakes
- Fall-proof. Equipped with suspension and emergency brakes with multiple redundancy
- Fireproof. Withstands strong fires, as the system is made of non-burning materials
- Child-safe, injury hazard free. No child tampering or injury is possible throughout the system
- Accident-proof. Doors are locked during operation, impossible to tamper with Hoistway Doors
- Trap-proof. If stuck in the elevator, there is manual override, enabling escape from the Cabin
- Eco-friendly—no hazardous chemicals, all recyclable materials, lubricated for life
- 24/7 monitoring. Constant monitoring of sensors and reporting to the Tech. Support via TCP/IP The present solution is also an aesthetically pleasing design. The elevator system may include large transparent, translucent or matte glass panels running from floor to ceiling, also transparent, translucent or matte Cabin with glass walls and glass ceiling, and thin aluminum profiles.

Embodiments of the system do not exhibit any visible means of bolts and nuts both from the outside and from the inside of the Hoistway at any floor level. In the meantime, the system is assembled from many hundreds of pieces that are put together with bolts and nuts and other means of mechanical connectivity. The whole construction may be implemented in a way that hundreds of bolts are nuts are concealed from eyesight by design features (not by masking tapes), thus, making the entire design sleek and stylish. This challenging task was carried forward to improve the design aesthetics of the system and puts the present solution in the class of luxury machinery and luxury property.

In addition, there are not any visible bolts and nuts or any sticking out connectors to the Cabin either, whether from inside or outside—for the luxury and comfort of its passengers according to embodiments. The Cabin too—may be comprised hundreds of parts that are put together with classical bolts and nuts invisible to an observer, thanks to the special construction of the system manifesting this unique and luxury design property.

This bolt-less and nut-less design implementation, further referred to as "spotless" design, allows achieving smooth surfaces in the entire construction. Large glass panels and sleek aluminum frames from edge to edge—this is one of the unique aesthetic design features of the present solution.

And last, but not least, the design features of the metal frames, lines, curves and angles are smoothly transitioning and continuing a design pattern, upon sharp turn of metal frames (e.g. frames at four different sides of a glass panel), thus, complementing the "spotless" design style.

Accordingly, the present approaches are in the field of elevators, for transporting people, animals and things in an elevator cabin in a vertically situated or vertically inclined elevator shaft. More specifically, the present approaches are in the field of vacuum (or pneumatic) elevators, where the elevator cabin is brought into motion in a vertically situated or vertically inclined and hermetically sealed elevator shaft by means of air pressure differential above and below the elevator cabin. Such approaches do not require having any ropes, pulleys, chains, gears, or hydraulics that are traditionally used in conventional elevator systems. More specifically, the present approaches are in the field of panoramic vacuum elevators, where the elevator hoistway is built of panoramic glass panels running from floor to ceiling of every floor and the elevator cabin is built of panoramic glass panels running from floor to the ceiling of the cabin, and that this type of elevator does not incorporate any metal constructive structures—frames, mesh, guides or rails that are traditionally used in every conventional elevator product, in an embodiment. More specifically, the present approaches incorporate a special spotless signature design style which does not exhibit any visible bolts, nuts, screws or other fasteners, whether looking from outside the elevator hoistway or from inside of the elevator cabin, in an embodiment. More specifically, the present approaches claim the benefits of panoramic design, having the smallest footprint among all elevator products on the market, having low-noise, having the fastest and smoothest ride, requiring low maintenance, being eco-friendly and using low-cost construction materials, in an embodiment. Further, more specifically, the present approaches are claimed to exhibit the safest elevator features compared to other commercial elevator products, including being: shatter-proof, earthquake-proof, fireproof, fall-proof, child-safe, accident-proof, trap-proof.

For the purposes of simplicity, the Detailed Description section is divided into sections, each section representing a particular feature, design, or a technical solution.

Panoramic Vacuum Elevator Cabin

In the Hoistway Application and as described herein, the system relies on vacuum forces to move the elevator Cabin up and down in an airtight sealed Hoistway Shaft. It has also been shown that silicate-based tempered glass panels may be used as a material of choice in the composition of Hoistway walls, due to smooth and even surface properties of glass and the strength of tempered glass. It was also shown that due to fragility of tempered glass edges, each edge has a protective thin metal-made frame, protecting the glass panels from shock damage.

In the referenced description the glass Hoistway, an embodiment was shown of a rectangular shape, comprising of 3 large glass panels running from floor to ceiling and a doorway entry at each floor. In such embodiment a rectangular shaped Cabin is installed in the Hoistway and has a layout footprint that may accommodate a full-size wheelchair.

In an alternate embodiment the glass Hoistway is of a hexagonal form, comprising of 6 glass panels, running from floor to ceiling of each floor. Doorway entry, in such an embodiment, may be installed within 2 adjacent Hoistway glass panels. Such construction may accommodate a hexagonal shaped Cabin.

In another embodiment the glass Hoistway is of an octagonal shape, comprising of 8 glass panels, running from floor to ceiling of each floor. This form may be visualized as a rectangular shaped Hoistway, where the angular edges of the Hoistway are flattened to form additional panels. These "angular flat edges" allow reducing the width of other "non-angular flat" edges of the Hoistway. Such embodiment becomes useful for large size elevator models where the width of the Hoistway is wider than the opening of the Hoistway door. This embodiment utilizes an octagonal shaped Cabin in the Hoistway.

In another embodiment, the glass Hoistway is of a cylindrical shape with straight vertical or inclined axis. This embodiment employs a cylindrical shaped Cabin placed in a cylindrical Hoistway. This embodiment is more suitable for larger models carrying dozen and more people and heavy loads.

In a different embodiment, the glass Hoistway has an ellipsoid shape with straight vertical or inclined axis. This embodiment uses an ellipsoid shaped Cabin placed in an ellipsoid Hoistway and is more suitable for larger models carrying over dozen people and heavy loads.

In an alternate embodiment, the Cabin's one or more panels, or their parts, are made of matte glass, to obscure the contents of the Cabin completely or partially—for the taste and comfort of elevator users. In an alternate embodiment, one or more panels of the Cabin or their parts are painted or covered with a semi-translucent or non-translucent film, to hide the contents of the Cabin completely or partially, for the taste and comfort of elevator users.

Further in the document a detailed description of a rectangular shaped elevator Hoistway (Hoistway) and a rectangular shaped Cabin (Cabin) is provided, using large transparent or translucent glass panels; however, the concepts outlined in these approaches are adaptable to pentagonal, hexagonal, octagonal, cylindrical, and ellipsoid forms as well, including using matte, and/or painted, and/or tainted glass in the Cabin. Such side glass panels having a top end and a bottom end; the bottom end is coupled to a base apparatus of the Cabin and the top end to the top glass panel.

The FIG. 3, FIG. 6 and FIG. 8 show front, side and perspective views of the Cabin. The FIG. 10 shows an exploded view of the Cabin. As shown in FIG. 10, the Cabin includes the following main parts, in an embodiment:

Cabin Body

- Cabin Head apparatus that includes the top glass panel
- Cabin Base (also referred to as "base apparatus")

Further, as shown in FIG. 10, FIG. 11, FIG. 13, FIG. 25, FIG. 26, FIG. 48, FIG. 52 and FIG. 56, the Cabin Body has several glass panels:

- Cabin Left Panel 501501, Right Panel 502 and Back Panel 503—large glass panels running from floor to ceiling of the Cabin, shown in more details in FIG. 10 and FIG. 25
- Cabin Front Panel 504 running from the top of Cabin doors 520 and 530 and to the ceiling of the Cabin, shown in more details in FIG. 25
- Cabin left and right door panels 521, shown in more details in FIG. 26
- Cabin Ceiling Panel 601 (also referred to as "top panel") is a glass panel (strengthened, e.g., tempered glass or borosilicate glass) or may be made of any reinforced material, shown in more details in FIG. 48, FIG. 52 and FIG. 56.

It is shown in the description below how these glass panels are protected on their four edges by metallic frames from a shock damage.

The lower edges of the Cabin Left Panel 501501, Cabin Right Panel 502 and Cabin Back Panel 503 are being fastened to the Cabin Base and the upper edges of the Cabin Left Panel 501501, Cabin Right Panel 502, Cabin Back Panel 503 and the Cabin Front Panel 504 are being fastened to Cabin Head via link washers 505 that are being inserted into pre-cut holes (apertures that extend through the width of the panels) 509 of these glass panels at the lower and upper ends of each glass panel, as shown in an embodiment, in FIG. 10, FIG. 11, FIG. 13 and FIG. 25.

The upper edges of each of the Cabin Left Panel 501, Cabin Right Panel 502, Cabin Back Panel 503 and the Cabin Front Panel 504, together with installed washers 505 along glass panels upper edges, are being inserted into the opening 748 of the profile 744 of the Cabin Head Outer Edge frames 621, 622 and 623, as shown in FIG. 89-FIG. 91 and FIG. 121, in an embodiment.

The lower edge of each of the Cabin Left Panel 501, Cabin Right Panel 502 and Cabin Back Panel 503, together with installed washers 505, along glass panels lower edges, are being inserted into the opening 749 of the profile 741 of the Cabin Base Outer Edge frames 642, 643 and 644, as shown in FIG. 104, FIG. 105, FIG. 107 and FIG. 121, in an embodiment.

As may be seen from above description, in an embodiment, the horizontal edges of the glass panels that are fastened to the Cabin Head and to the Cabin Base, are being submerged in the bodies of the Cabin Head and the Cabin, Base, therefore being protected from a shock damage. The open horizontal edge may be the lower edge of the glass panel 504, that is protected by upper frames of the Cabin Doors 520 and 530 when in a closed position, in an embodiment. In such an embodiment, the vulnerability of the Cabin Front Panel 504 lower edge may be when the Cabin Doors are in open position. However, the Cabin Front Panel 504 is high up in the air, way above people's heads and inside the Hoistway, therefore exposition to a metal shock is an unlikely event, unless, artificially inflicted. Even if a shock is artificially inflicted and the small Cabin Front Panel 504 is shattered, it is not playing an important constructive role in Cabin's operation and the Cabin can temporarily operate even with removed Cabin Front Panel 504, and with temporarily removed Cabin doors 520 and 530, until the replacement of the Cabin Front Panel 504.

The vertical edges of the Cabin Back Panel 503 and the back vertical edges of the side glass panels 501 and 502 are protected from shock damage by means of Cabin Back Frames 506, that are attached to said glass panel edges by means of silicon or other adhesive, as shown in FIG. 10, FIG. 22, FIG. 21-FIG. 23 and FIG. 25, in an embodiment.

The front edges of side glass panels 501 and 502 are protected from shock damage by means of Cabin Side Frames 508, that are attached to glass panels 501 and 502 front edges by means of silicon, or other adhesive, or rubber seals, as shown in FIG. 10, FIG. 11-FIG. 21, FIG. 14-FIG. 17, FIG. 19 and FIG. 25, in an embodiment.

The vertical edges of the Cabin Front Panel 504 are protected from shock damage by means of Cabin Front Frames 507, that are attached to the Cabin Front Panel 504 vertical edges by means of silicon based or other adhesive, as shown in FIG. 10, FIG. 11, FIG. 13, FIG. 14-FIG. 17, FIG. 25, in an embodiment.

The Cabin Door glass panels 521 are protected from shock damage by Cabin Door Hinges 522 and 524, while edge frames 523, 525, 526 and 527 being affixed to the Door glass panel 521 by means of silicon based or other adhesive, thus, having four edges of the Door glass panel being enclosed into thin metallic (e.g. strengthened aluminum alloy) frames.

The Cabin Door Hinges 522 and 524 are built from a metal profile with a cross-section of the form 751, as shown in FIG. 26, FIG. 29, FIG. 32, FIG. 42 and FIG. 123.

The Cabin Door edge frames 523 and 525 are built from a metal profile with a cross-section of the form 755, as shown in FIG. 26, FIG. 29, FIG. 32, FIG. 34 and FIG. 123.

The Cabin Door edge frame 526 is built from a metal profile with a cross-section of the form 754, as shown in FIG. 26, FIG. 29 and FIG. 123.

The Cabin Door edge frame 527 is built from a metal profile with a cross-section of the form 756, as shown in FIG. 26, FIG. 29, FIG. 32, FIG. 34 and FIG. 123.

The top glass panel of Cabin may have its edges protected by frame(s). Such frames may also be used to couple the side panel(s) of the Cabin to the top glass panel of Cabin. The frames may extend vertically downward to the apertures of the side panels and using fasteners through the apertures, may couple the top glass panel with the side panels.

For example, the Cabin Ceiling panel 601 is a glass panel and is protected on all 4 edges by enclosing in the Cabin Head Outer Frames 621, 622 and 623 at 4 edges of the panel 601, by means of silicon based or other adhesive, as shown in FIG. 47, FIG. 48, FIG. 52, FIG. 65-FIG. 70, FIG. 89, FIG. 90. The upper edges of the Cabin Left Panel 501, Cabin Right Panel 502, Cabin Back Panel 503 and the Cabin Front Panel 504 are being fastened to Cabin Head (Cabin Head Outer Frames 621-624) via link washers 505 that are being inserted into pre-cut holes 509 of these glass panels at the upper ends of each glass panel, as shown in an embodiment, in FIG. 10, FIG. 11, FIG. 13 and FIG. 25. The upper edges of the glass panels 501, 502, 503 and 504 may be bolted to the upper edge frames 621, 622, 621 and 623 by means of bolts 626 through the washers 505. Cross-section of this construction is shown in more details in the FIG. 121 for the left and right Cabin walls, however the same technique is employed for attaching Cabin's front and back panels.

As may be seen from the description above, all glass panels used in the construction of the Cabin are being protected on their edges, making the presented construction truly shatterproof. Running large glass panels from floor to ceiling of the Cabin and having large glass panel installed also at the ceiling of the Cabin—makes the Cabin truly panoramic, supporting the unique design style of the Hoistway, as described herein and the Hoistway Application.

Tempered Glass as the Cabin Exoskeleton

In the Hoistway Application and as described herein, large tempered glass panels may be used in the construction of the Cabin in the Panoramic Vacuum Elevator System. It was shown how the edges of glass panels of the Cabin are protected by thin (strengthened) aluminum frames that are either attached to the edges of glass panels by means of adhesives or fastened using nylon washers and bolted to the Cabin Head and Base frames. However, from that description it was not evident how said glass panels (Cabin walls) and metal frames are put together to form a steady Cabin construction.

Large glass panels are exceptionally beautiful and are used in many applications, like large displays of storefronts, large windows, panoramic displays for buildings, etc. (collectively referred to as "display"), however, all these applications employ a hard metallic "frame" that is used as a skeleton of the "display" and glass panels are inserted into such metallic frame as a "filler".

The present approaches take a drastic new approach in the construction of the Cabin—the glass panels that the Cabin is made from—are not the "fillers" in the metallic "skeleton frame" of the Cabin, but are the construction in itself, carrying the weight of the entire Cabin together with its load. As such, the present approaches eliminate the need for a metallic skeleton frame in the Cabin construction and use a glass-made "exoskeleton" instead.

Similar to the usage of glass as an exoskeleton of the Hoistway, described in more details in the referenced materials, the glass panels of the Cabin support the weight of the Cabin and its load, however, there is one major difference compared to Hoistway: while Hoistway glass panels are exposed to compression forces of the Hoistway weight, the Cabin glass panels are exposed to tension (decompression) forces, because the entire Cabin and its load is "hanging" from the Cabin ceiling, when the Cabin is in motion, and carries the weight of the Cabin together with its load (less the weight of the Cabin Head). More specifically, when in motion, the Cabin glass panels are "stretched" under the weight of the Cabin and its load, "hanging" from the Cabin Head, where the upper Vacuum Seal is located, as shown in FIG. 6, FIG. 8 and FIG. 10. In such an embodiment, when the Cabin is resting, the glass panels of the Cabin are exposed to compression forces, carrying the weight of the Cabin Head, while the Cabin load is resting upon the Cabin Base, thus not exerting any compression forces to the Cabin glass panel walls.

The Cabin Head and, in some embodiments, Cabin Ceiling Panel 601 of the Cabin Head may form the barrier between the portions of the Hoistway with different air pressure, thereby may withstand at least a portion of the gravitation forces exerted by the Cabin weight and its load if any. As a non-limiting example, the weight of the Cabin Head is relatively small—within 50 lbs, therefore, when selecting the type and width of the glass for Cabin walls, tension characteristics of tempered glass are taken into account, in order to being able to support the Cabin weight and its load in tension state effortlessly. Tempered glass demonstrates excellent characteristics to tensile stress—in the amounts of tens of Gigapascal per unit area, therefore even a thin tempered glass may be an excellent material for Cabin walls. Calculations show that a thin 3-4 mm tempered glass can easily withstand the weight of the Cabin and a heavy load, plus acceleration and deceleration forces exerted on the Cabin during normal operation and emergency landing. However, in order to increase safety margins, a 5 or 6 mm tempered glass is used for Cabin walls, in an embodiment, which delivers several times safety margin for extreme forces that the Cabin may be exposed to during normal operation or even emergency landings.

Unlike Hoistway implementation, where Hoistway glass panels are being exposed to compression forces and a silicon or similar glue has been used to fasten Hoistway glass panels to protective metal frames, the Cabin glass panels are exposed to tensile forces. One of the viable and safe solutions in this case is bolting glass panels to the Base and Head of the Cabin but other coupling mechanisms may be used.

As shown in FIG. 10, FIG. 11, 0, FIG. 14-FIG. 19, FIG. 21, FIG. 25, the Cabin glass panels 501, 502, 503 and 504 are attached to the Cabin Head and to the Cabin Base by means of "link washers" 505. For this purpose, large round "link holes" 509 are drilled alongside of the lower and upper edges of Cabin glass panels interfacing the Cabin Head and the Cabin Base. These holes are approximately 1" in diameter and are located away from the edges of glass panels by at least 2" inches, in an embodiment, —this is a technical requirement for proper glass tempering process. Note that drilling of link holes 519 and any processing of Cabin glass panels is preferable to be performed before tempering the glass panels, as after tempering glass is no longer treatable due its strengthened characteristics and technological limitations. Link washers are made of softer than glass material, yet hard enough to become an anchor point for attaching the glass panel to other constructive parts. In one embodiment, an HDPE type material may be used for link washers 505. In an alternate embodiments LDPE or nylon or other plastics may be used for manufacturing link washers that have required softness, yet rigidity and not easily crackable and breakable due to compression forces and temperature variations.

Once all glass panels are processed and tempered, link washers 505 are placed into link holes 509. Then glass panels together with attached link washers are inserted into the Cabin Head Outer Frame 620, more specifically, into the opening 748 of the profile 744, used in the construction of the upper frame 620, as shown in FIG. 88-FIG. 92. Cross-section of this construction is shown in more details in the FIG. 121 for the left and right Cabin walls, however the same technique is employed for attaching Cabin's front and back panels.

Similarly, the lower edges of the glass panels 501, 502 and 503 are inserted into the opening 749 of the profile of form 741, of which the Cabin Base Outer Frame 640 is built. The three mentioned glass panels are then bolted through the link washers 505 to the lower edge frames 642, 643 and 644 by means of bolts 647 through the washers 505, as shown in more details in FIG. 10, 0, FIG. 19, FIG. 64, FIG. 104, FIG. 105, FIG. 107, 0. Cross-section of attaching left and right Cabin walls to the Cabin foundation is shown in more details in FIG. 121.

As was previously shown, similar to the technique used in protecting the edges of glass panels in the Hoistway, all edges of glass panels of the Cabin may also be protected by thin metal edge frames, however, unlike Hoistway walls, Cabin's glass panels don't need to have a smooth surface area with metal edge frames, as they are not exposed to elevator's vacuum operation—however, the Cabin's Vacuum Seal may be. This puts different requirements on how the edges of tempered glass panels of the Cabin may be treated and protected from accidental damage.

In more detail, in an embodiment, at the intersection where Cabin's back glass panel 503 interfaces Cabin's left and right glass panels 501 and 502, Cabin's back frames 506 of profile form 747 are used to "stitch" Cabin's left glass panel 501 with the Cabin's back glass panel 503 and Cabin's right glass panel 502 to "stitch" with Cabin's back glass panel 503, as shown in FIG. 7—FIG. 50, FIG. 49, FIG. 63, FIG. 10, FIG. 22, FIG. 21, FIG. 25 and FIG. 123. Here the Cabin Back Edge frame 506 is somewhat similar to the back-edge frame used in the Hoistway construction, as it allows 90-degree connection between the glass panels and protects the edges of glass panels from shock damage. This technique may require the edges of back glass panel 503 and the back edges of glass panels 501 and 502, interfacing the back glass panel 503, to be treated with a 45 degree chamfer before tempering, as shown in FIG. 22 and FIG. 21.

The front edges of Cabin glass panels 501 and 502 may not be chamfer treated and face front edge frames 508 of the profile form 753, as shown in FIG. 3, FIG. 6-FIG. 49, FIG. 63, FIG. 10, FIG. 11-FIG. 21, FIG. 14-FIG. 23, FIG. 19, FIG. 25 and FIG. 123, in an embodiment.

The left and right edges of the Cabin's front glass panel 504 may not require chamfer treatment and face front edge frames 507 of the profile form 754, as shown in FIG. 11, 0, FIG. 14-FIG. 17 and FIG. 123.

Glass panels 521 of the Cabin doors 520 and 530 may not be chamfer treated and are protected on the outer edges by means of Cabin's lower Door Hinge 522, Cabin's upper Door Hinge 524, lower door frame 523, upper door frame 525, edge door frame 526 and middle door frame 527, as shown in FIG. 26-FIG. 35. The cross-section of these edge frame profiles: 751 (for Cabin Door Hinges 522 and 524), 755 (for frames 523 and 525), 754 (for edge frame 526) and 756 (for middle frame 527) are shown in FIG. 123.

In addition to four sides of the Cabin being made of large glass panels, the central piece of Cabin's ceiling may also be made of a glass panel 601, as shown in FIG. 6, FIG. 8, FIG. 49, FIG. 10, FIG. 47, FIG. 48, FIG. 52, FIG. 56, FIG. 65-FIG. 70. This top glass panel is thick, because it is exposed to tensile vacuum forces of over 1,000 lbs across its surface. Hence the edges of the top glass panel 601 are chamfered and locked on both upper and lower sides of the glass panel edges by the upper frame 620, in an embodiment. The cross-section of this connection of the top glass panel 601 with the upper frame 620 is shown in more details in FIG. 121.

Metal edge frames, that are attached to the vertical edges of glass panels, are affixed to glass panels by means of silicon-based adhesive (e.g. silicon resin), or other material with good adhesive properties to glass and metals, or rubber seals. The horizontal edges of Cabin's glass panels are fastened, through link washers 505, to Cabin Head by means of bolts 626 and to Cabin Base by means of bolts 647, in an embodiment.

A solid frame may be attached to the edges of glass panels of the Cabin (e.g., glass panels 501, 502, 503, 504 or 601) to protect the glass panels from damage. In one embodiment, the edge frames are made of metallic material(s). For example, (strengthened) aluminum alloys are chosen for their outstanding performance, lightweight and low-cost characteristics compared to other solutions but other materials may be possible alternative protectors.

The Cabin Head constructive part, in an embodiment, includes: the Cabin Head Outer Frame 620 with front and back frames 621 and with left frame 622 and right frame 623, the Cabin Head Inner Frame 630 with front and back frames 631 and side frames, the top panel 601 and the Main Vacuum Seal 610A, in an embodiment.

The main constructive structure of the Cabin Head is the Cabin Head Outer Frame 620 that all other structures are attached to. Cabin glass panels 501, 502, 503 and 504 are bolted to the Cabin Head Outer Frame 620, as well, as shown in FIG. 47-FIG. 56. The frame 620 includes metal edge frames 621 (on the front and back), 622 (on the left), 623 (on the right). The metal edge frames 621, 622, 623 are connected together with connecting knee 624 via bolts 625, thus, forming a sturdy structure of the Cabin Head, that other Cabin constructive parts are being fastened to, as shown in FIG. 92.

The Cabin Head Inner Frame 630 with front and back edge frames 631 and side frames 632, in an embodiment, is fastened to the Cabin Head Outer Frame 620 using the bolts 625 via knee elements 624 (the latter in this fastener relationship is used as a spacer), as shown in FIG. 89, FIG. 90 and FIG. 92 and FIG. 121, in an embodiment.

The Cabin Head Outer Frame 620 uses a profile with cross-section 744 shown in FIG. 91 and FIG. 122; the Cabin Head Inner Frame 630 uses a profile with cross-section 745 shown in FIG. 98 and FIG. 122, in an embodiment.

The metal edge frames 621, 622 and 623 of the Cabin Head Outer Frame 620 contain ventilation slits 627 and 628, as shown in FIG. 89, FIG. 90 and FIG. 92, in an embodiment. The metal edge frames 631 and 632 of the Cabin Head Inner Frame 630 contain ventilation windows 633 and ventilation slits 634, as shown in FIG. 95, FIG. 97 and FIG. 99, in an embodiment.

Upon assembly of the Cabin, there is a small channel space 674 enclosed between the Cabin Head Outer Frame 620, the Cabin Base Inner Frame 630 and the Cabin Ceiling Panel 601, as shown in FIG. 121, in an embodiment. This channel space 674 may be used for installing Cabin lighting in form of an LED stripe.

The Cabin Base constructive part, in an embodiment, includes: the Cabin Base Outer Frame 640, the Cabin Base Inner Frame 650, the Cabin Base Deck 560 and the Secondary Vacuum Seal 610B.

The main constructive structure of the Cabin Base is the Cabin Base Outer Frame 640 that all other structures are attached to. Cabin glass panels 501, 502 and 503 are bolted to the Cabin Base Outer Frame 640, using bolts 647, as shown in FIG. 10, FIG. 61-FIG. 64 and FIG. 105. The frame 640 includes metal edge frames 641 (on the front), 642 (on the left), 643 (on the right) and 644 (on the back). The metal edge frames 641, 642, 643 and 644 are connected together with connecting knee 645 via bolts 646, thus, forming a sturdy structure of the Cabin Base, that other Cabin constructive parts are being fastened to, as shown in FIG. 104-0, in an embodiment.

The Cabin Base Inner Frame 650 with left frame 651, right frame 652 and back frame 653, having a cross-section profile form 742, are connected to the Cabin Head Outer Frame 620 using bolts 646 via knee element 645. The latter is used in this connection as a spacer and the bolts 646 are bolted to the bodies of the frames 651, 652 and 653, in an embodiment. Note, that the heads of the bolts 647 are submerged in the holes 657 of the Cabin Base Inner Frame 650, thus, allowing to insert/replace Cabin glass panels 501, 502 and 503 without having to disassemble the Cabin Base Outer Frame 640 and the Cabin Base Inner Frame 650. Note that the holes 657 are slightly larger than the heads of the bolts 646 for easy assembling/disassembling the Cabin Body 500, if needed.

The connecting knee 624 of the Cabin Head and the connecting knee 645 of the Cabin Base are made from a strong material (e.g. steel) and have a cross-section profile of the form 743, as shown in FIG. 122.

The metal edge frames 641, 642, 643 and 644 of the Cabin Base Outer Frame 640 contain ventilation slits 648 and 649, as shown in 0, in an embodiment. The metal edge frames 651, 652 and 653 of the Cabin Base Inner Frame 650 contain upper ventilation windows 658 and lower ventilation windows 659, used for intake and exhaust ventilation flow, respectively.

The Cabin Base Inner Frame 650 slightly extends above the Cabin Base Upper Deck 661, forming a protective baseboard 672 at the Cabin floor, also forming a channel 673 for ventilation airflow intake from the Cabin, as shown in FIG. 121, in an embodiment.

The Cabin Base Deck 560 includes:

Cabin Base Lower Deck 661

Cabin Base Parallel Dividers 662, 663, 664

Cabin Base Meridian Dividers 665 and 666

Cabin Base Upper Deck support frames 667 and 668

Cabin Base Upper Deck 669

The dividers on the Cabin Base Deck 560 are designed to accommodate Cabin Small Mechanics and to support the Cabin Base Upper Deck 560 and prevent latter from bending under a load of elevator cargo and passengers.

The glass-made exoskeleton design of the Cabin, that uses large glass panels running from Cabin's floor to ceiling and thin metal edge frames attached to the glass panels vertical edges, plus large transparent or translucent glass of the ceiling, thus, achieving a unique design properties of the present approaches without using any metal mesh skeleton frames and heavy metal structures for Cabin walls, unlike any other traditional elevator system, where heavy metal structures are traditionally part of any such elevator system.

Spotless Cabin Design

In the Hoistway Application and as described herein, large tempered glass panels may be used in the construction of the Cabin in the Panoramic Vacuum Elevator System. It was shown how the edges of glass panels of the Cabin are protected by thin metal-made frames that are either attached to the edges of glass panels by means of adhesives or fastened using nylon washers and bolted to the Cabin Head and Base frames. It was also shown how different parts of the Hoistway may be bolted together using unique forms of edge metal frames in such a way that all bolts are concealed from an observer, whether inside or outside the elevator.

Similar to the reasons discussed in the referenced material, the present approaches dismiss the use of weldments in the Cabin design. Whenever a glass edge is subject to compression or tangential forces, a silicon sealing material (e.g. silicon resin or other adhesive) is used to connect the edge of a glass panel to a metal frame. Whenever a glass edge is subject to tension forces, this edge is bolted to metallic constructive frame—Cabin Head Outer Frame 620 and Cabin Base Outer Frame 640, in an embodiment.

The present approaches intend to show that the Cabin constructive parts may be put together using bolts in such a way that all bolts used in the construction, whether fastening metal parts together, or bolting glass panels to metal frames, is concealed from a view of an observer, whether inside the Cabin or outside the Hoistway, from any angle of view, thus conforming to the "Spotless" signature design style of the present approaches.

The FIG. 6 shows a perspective upper front and lower front views of the Cabin and the FIG. 10 shows a Perspective exploded view of the Cabin, in an embodiment. The Cabin glass panels 501, 502, 503 and 504 are bolted to the Cabin Head via bolts 626 at the upper edge of glass panels, as shown in FIG. 88-FIG. 92. The bolts 626 are extending from the inside of the Cabin and into the body of the Cabin Head Outer Frame 620. These bolts 626 are concealed from the Cabin's outside observer by the Cabin Head Outer Frame 620, as shown in FIG. 3, FIG. 6, FIG. 8, FIG. 50 and FIG. 49. The Cabin Head Inner Frame 630 is concealing the bolts 626 also from the Cabin's inside observer, as shown in FIG. 6, FIG. 8, FIG. 49, FIG. 47, FIG. 48, FIG. 53, FIG. 54 and FIG. 55.

The Cabin glass panels 501, 502 and 503 are bolted to the Cabin Base via bolts 647 at the lower edge of these glass panels, as shown in FIG. 104, FIGS. 105 and 0, in an embodiment. The bolts 647 are extending from the inside of the Cabin Base and are submerged in the Cabin Base Outer Frame 640, and are covered by the Cabin floor surface 669, as shown in FIG. 62 and FIG. 64, therefore are concealed from an outside observer view by the Cabin Base Outer Frame 640 and from an inside observer—by Cabin Base Inner frame 650 and the Cabin Base Upper Deck 669, as shown in FIG. 3, FIG. 6-FIG. 8, FIG. 63, FIG. 61-FIG. 64. The FIG. 121 shows a cross-section of the Cabin with bolts 626 and 647, Cabin Head's and Cabin Base's outer and inner frames 620, 630, 640 and 650.

The glass link washers 505 are concealed from an inside and outside observer, as they are submerged in the channels 748 of the Cabin Head's Outer Frame and the channel 749 of the Cabin Base Outer Frame, in an embodiment. The FIG. 121 shows the described relationship for the left glass panel 501 and right glass panel 502 of Cabin, however, anyone skilled in the area of basic mechanics may appreciate this relationship, as it may be easily extended to the back glass panel 503 and the front glass panel 504 and applied to the connections to the Cabin Head and the Cabin Base. So far it has been shown how the Cabin glass panels are connecting to the Cabin Head and Cabin Base, however, the question of how the edge frames of the Cabin Head or the edge frames of the Cabin Foundation are fastened together—remains open and is subject for review below.

The Cabin Head's Outer Frame's 620 edge frames 621, 622, 621 and 623 are connected together by knee connectors 624 via bolts 625, as shown in FIG. 88-FIG. 92, in an embodiment. The bolts 625 extend from the outside of the Cabin and go through the frame 620, the knee connector 624 and to the inner frame 630, thus connecting the pieces of the Cabin's Head together. At this point the bolts 625 are concealed from the observer inside the Cabin but are still visible to the observer outside the Cabin, as shown in FIG. 52, FIG. 56, FIG. 88, FIG. 89 and FIG. 92.

Similarly, the edge frames of the Cabin Base are connected together by means of knee connectors 645 and bolts 646, connecting both outer frames 641, 642, 643 and 644 and inner frames 651, 652 and 653 of the Cabin Base together, in an embodiment. At this point the bolts 646 are concealed from the observer inside the Cabin but are still visible to the observer outside the Cabin, as shown in FIG. 64, FIG. 104, FIG. 106 and FIG. 108.

The bolts 625, in turn, are hidden from an outside observer by the Cabin Upper Vacuum Seals 610A/B with edge frames 611, 612, 612 and 613, which, when inserted into the upper Vacuum Seal channel, covers and conceals the bolts 625, as shown in FIG. 47 and FIG. 48, in an embodiment.

Similarly, the bolts 646, in turn, are hidden from an outside observer by the Cabin Lower Vacuum Seal 610B with edge frames 611, 612, 612 and 613, which, when inserted into the lower Vacuum Seal channel, covers and conceals the bolts 646, as shown in FIG. 61 and FIG. 62, in an embodiment.

The rest of the bolts and nuts used in the Cabin are completely submerged within the Cabin Base, connecting Small Mechanics parts to the Cabin Base between the Cabin Base lower and upper decks and are not visible to an observer, whether from inside or outside the Cabin, thus, conforming to the "Spotless" signature design style of the present approaches. In addition, all glass panels of the Cabin are "running" from Cabin's floor to its ceiling, complementing the unique panoramic signature design style of the present approaches.

Cabin Doors in a Swing Operation

In the Hoistway Application and as described herein, the Hoistway doors in the Panoramic Vacuum Elevator are operating in a swing operation outwards, in an embodiment.

The present approaches employ an airtight Hoistway and a Cabin that slides up and down the vacuum sealed Hoistway. The Hoistway has multitude of doors located at each floor level, allowing people, animal and things enter and exit the elevator Cabin. The Cabin has its own doors, protecting people inside the Cabin from coming into a contact with the Hoistway Shaft during the Cabin's ascent or descend. It has been described how a pair of Hoistway Doors at each floor of the Hoistway are opening and closing in a swing operation, in an embodiment. Using the techniques described herein, the Hoistway Doors, when closed, seal the Hoistway airtight (or close to airtight), to maintain vacuum operation. The Cabin is not required to be airtight, because it maintains the atmospheric pressure, as does the space of the Hoistway below the Cabin—for the comfort of its passengers.

There are several ways, in which the Cabin doors may be implemented, in order to shield Cabin's passengers from the moving walls of the Hoistway, thus, ensuring a safe elevator ride:

single-leaf door or a double-leaf door at each floor doors may roll over rails doors may swing on levers in a parallel motion doors may swing on regular hinges Single-leaf door is easier to implement, because, in most embodiments, there are less parts, however, it takes up too much space in an open position, may require extra clearance for large swing operation, making it impractical to use, however, both single-leaf and double-leaf doors may be used in different embodiments. For the purposes of this document, double-leaf doors embodiment are described.

For better look and feel and for simplicity, and to be similar to the operation of Hoistway Doors, plain hinges are selected for opening/closing the Cabin doors, as shown in FIG. 37, FIG. 38, FIG. 63, FIG. 22 and FIG. 20, in an embodiment.

The FIG. 14-FIG. 23, FIG. 19, FIG. 26-FIG. 32, FIG. 35 and FIG. 42 show different perspective, exploded and zoomed view of Cabin Door hinges, in an embodiment. The Cabin hinges are attached to the Cabin doors by means of silicon based or other adhesive and are blending into Cabin Door edge frames.

Each Cabin Door 520 and 530 has two hinges that are holding the Cabin doors at its positions. Cabin doors, unlike their Hoistway counterparts, are made of thin glass and are lightweight, yet these doors are not "hanging" on the Cabin hinges, as the Cabin hinges are just serving as guides for the doors swing operation. In fact, each of the Cabin doors leaf is resting on the Cabin Door Axle mechanism.

Contrary to the Hoistway hinges that are placed outside the Hoistway, the Cabin hinges are placed inside the Cabin, as shown in the presented Figures. This embodiment allows the Cabin walls to be at close distance from the Hoistway walls and unimpeded, thus, maximizing the usable Cabin space.

As shown in FIG. 42, in an embodiment, the Cabin hinges have a prolonged U-shape extension of the door axis, which is placed inward the Cabin in a way, that the Cabin doors, when opened, extend beyond the left glass panel 501 and the right glass panel 502 of Cabin, thus, fully opening the pathway to the Cabin. In other words, the Cabin doorway opening is equal to the maximum possible dimension—the distance between the Cabin walls 501 and 502. This is done for the most effective use of the Cabin, e.g. for accommodating a full-size wheelchair.

The FIG. 42 shows various views of Cabin's lower and upper hinges, in an embodiment. As shown in FIG. 26-FIG. 32 and FIG. 35, the Cabin Door Hinges 522 and 524 are attached to the Cabin's glass door 521 by means of adhesive. Cabin glass door 521 is made of relatively thin tempered glass compared to the Hoistway Doors, as it is not exposed to vacuum forces, therefore this door is much lighter than the Hoistway door and may be supported by glued hinges. To help the adhesion, the Cabin Door Hinges 522 and 524 are made with elongated support, to increase the glue surface area of the hinge-glass support, thus, lessening the requirements on adhesion of the hinges, as shown in FIG. 7, FIG. 37, FIG. 38, FIG. 22, FIG. 20, FIG. 14-FIG. 23. FIG. 19 and FIG. 26-FIG. 32.

Cabin's Vacuum Seal

In the Hoistway Application and as described herein, the system relies on vacuum forces to move the elevator Cabin up and down in an airtight sealed Hoistway Shaft. It has also been shown that silicate-based tempered glass panels were used as a material of choice in the composition of Hoistway walls because of smooth and even surface properties of glass and tempered glass strength, in an embodiment. It has been shown how the edges of Hoistway glass panels need to be shaped and what type and form of metal edge frames to use in the construction of the Hoistway, to obtain a smooth surface of the Hoistway Shaft for proper vacuum operation.

The present approaches describe the construction of Vacuum Seal that slides the rectangular based Hoistway Shaft, in an embodiment, however, the principles described in this section are applicable also to hexagonal, octagonal, cylindrical, and ellipsoid shaped Hoistway embodiments.

The FIG. 3, FIG. 6-FIG. 49, FIG. 63, FIG. 10 show various views of the Cabin Vacuum Seals 610A/B, being installed at the Cabin Base and Cabin Head levels, in an embodiment.

The FIG. 47-FIG. 51 show more detailed views of the Cabin Upper Vacuum Seal at the Cabin Head level and the FIG. 52 and FIG. 56 show exploded views of the Cabin Upper Vacuum Seal in relation to other building blocks of the Cabin Head, in an embodiment.

The FIG. 57, FIG. 58, FIG. 61, FIG. 62 show more detailed views of the Cabin Lower Vacuum Seal at the Cabin Base level and the FIG. 64 show exploded view of the Cabin Lower Vacuum Seal in relation to other building blocks of the Cabin Base, in an embodiment.

Further, the FIG. 71-FIG. 82 show more detailed views of the Cabin Vacuum Seal 610 and its composition, in an embodiment.

The Cabin Vacuum Seal 610 slides against the Hoistway Shaft, therefore, both the Hoistway Shaft and the Cabin Vacuum Seal 610 materials need to have a minimal friction relative to each other.

Hoistway uses tempered glass as a material of choice due to its strength and low friction characteristics, in an embodiment. As a material that has low friction with glass the current approaches use HDPE (high-density polyethylene), in an embodiment, which has excellent longevity, flexibility and resistance to tension and compression forces, also low friction with glass. The HDPE is also chosen for its low cost and easy manufacturing.

In an alternate embodiment, the Cabin Vacuum Seal 610 may be manufactured from materials other than HDPE, also having low friction and high longevity properties, e.g. Polytetrafluoroethylene (also known as Teflon) or a combination of aluminum alloys or other metals coated with Teflon (strengthened alloys).

The Cabin Vacuum Seal 610 includes: the Front Vacuum Seal edge frame 611, Side Vacuum Seal edge frames 612 and the Back Vacuum Seal edge frame 613, as shown in FIG. 78, in an embodiment.

In an embodiment, one or more elastic elements are coupled to the seal(s) and compressed to exert tension forces circumferentially outwards, thereby pushing the seals towards the Hoistway to create airtight connections between the Cabin and the Hoistway. For example, each of the Vacuum Seal edge frames 611, 612 and 613 have two rows of compression springs 615 installed along the edges of the Vacuum Seal edge frames and inserted into the holes 616, as shown in FIG. 78. The springs 615 are facing the Cabin Head Outer Frame 620 at the Cabin top or the Cabin Base Outer Frame 640 at the Cabin bottom. The purpose of these springs—is to ensure a constant contact of the Vacuum Seal edge frame surface along the length of the Vacuum Seal frame with the Hoistway Shaft walls. Indeed, when the Hoistway Shaft has variations in width and depth, the springs 615 press the edge frames 611, 612 and 613 against the Hoistway Shaft glass walls, ensuring constant contact with the Hoistway, complementing, adjusting for the Hoistway imperfections and sliding along the Hoistway Shaft—to ensure proper Vacuum Seal operation.

The FIG. 78 shows two rows of springs being used—this is done to avoid tilting of the Vacuum Seal edge frames during operation and to ensure constant and even pressure of Vacuum Seal surface to the Hoistway Shaft. In an alternate embodiment the Vacuum Seal employs one or multitude of rows of springs 615, depending on the height of the Cabin Vacuum Seal.

In an alternate embodiment each row of springs 615 is substituted by a "spongy" tube resin that can "press" the Vacuum Seal edge frame against the Hoistway Shaft by applying constant pressure along the entire edge frame. In this embodiment, instead of holes 616, the Vacuum Seal edge frames 611, 612 and 613 employ a channel trench along the edge frame of the seal for "receiving" said "spongy" tube, that may be extended above the Vacuum Seal edge frame and facing the Cabin Head Outer Frame 620 or the Cabin Base Outer Frame 640. This spongy tube(s) delivers the required resistive force to press the Vacuum Seal edge frame against the Hoistway Shaft.

The Vacuum Seal edge frame is made to be "thick" with cross-section of the Vacuum Seal edge shown in FIG. 82. The thickness is to accommodate for the spring holes 616 and for the Vacuum Edge Stripes 614, as shown in FIG. 83.

Deeper holes 616 allow using longer compression springs 615, in order to ensure relatively uniform and even pressure from springs, given the Hoistway Shaft dimensions variations from manufacturing imperfections. In other words, deeper the holes 616, the more even and uniform is the pressure force from the compression springs 615 to the Hoistway Shaft walls.

The Vacuum Edge Stripes 614 are in contact with the Hoistway Shaft, enabling the Vacuum Seal operation. In one embodiment the Vacuum Seal Stripes 614 are implemented in form of straight horizontal stripes. This form simplifies the construction of the seal, however, presents a disadvantage of having an intermittent "flappy" noise sound when the seal is crossing a seam located at the edge of the Hoistway Belt and the Hoistway glass panels. This "flappy" noise is a result of the Vacuum Seal Stripe crossing a horizontal seam of the Hoistway Belt with "full front" and all sections of the Vacuum Seal Stripe cross the Hoistway Belt seam at the same time, thus amplifying the flapping noise. In some applications it is not a big deal, as mild "flappy" noise may be easily tolerated. In other, more luxury applications, the "flappy" noise may be eliminated by using a more complex and more expensive Vacuum Seal.

In an alternate embodiment, the Vacuum Seal Stripes 614 are implemented such that different portion(s) of the Vacuum Seal Stripes 614 are on different horizontal cross-sectional planes of the Cabin, for example, in form of "waves" along the edges of Vacuum Seal Edge Frames 611, 612 and 613, as shown in FIG. 76-FIG. 80. The wave form allows the Vacuum Seal Stripes to cross the Hoistway Belt seam not with "all front" but rather gradually, exposing few smaller sections of the Seal to the Hoistway Belt seam. This technique significantly reduces the "flapping" noise from crossing the Hoistway Belt seam, rendering it to be an incredibly quiet Vacuum Seal operation.

In an alternate embodiment, the Vacuum Seal Stripes 614 may be arranged as angled beams or zigzags, or saw-like shape, or any other shape, allowing the seal shape to "spread" vertically in order to stretch in time the crossing of the Hoistway Belt seam, thus "spreading" the "flappy" noise across longer time period, which ultimately reduces unwanted noise levels. This complicates the construction of the Vacuum Seal and makes it more expensive to manufacture, on the other hand, it improves the comfort of elevator passengers, practically eliminating the noise from Vacuum Seal operation.

Further, as shown in FIG. 75, FIG. 78-FIG. 80 and FIG. 83, two adjacent Vacuum Seal Edge Frames 611 and 612 or 612 and 613—are being attached to each other via "chess-like" connectors in such a way, that the bars 617 of the Vacuum Seal Front Frame 611 go inside the openings 618 of the Vacuum Seal Side Frame 612, in an embodiment. Similarly, the bars 617 of the Vacuum Seal Side Frame 612 go inside the openings 618 of the Vacuum Seal Front Frame 611.

This "chess-like" connector at each corner of the Vacuum Seal, connecting adjacent Vacuum Seal Edge Frames, forms a "lock" that prevents the front and side Vacuum Seals frames from moving vertically relative to each other. This "lock" still allows the frames 611, 612 and 613 to have a limited freedom for moving in a horizontal plane relative to each other. This limited "horizontal freedom" of the Vacuum Seal Edge Frames allows the Vacuum Seal to float and adjust to the Hoistway Shaft imperfections automatically, while preserving the maximum airtightness of the Vacuum Seal. The "chess-like" endcap of the Vacuum Seal edge frames also allows minimizing the air gap that may form between the corners of the Vacuum Seals 610A/B and the Hoistway Shaft, due to Hoistway Shaft width and depth variations.

The length of the front and back Vacuum Seal Edge Frames 611 and 613 may be chosen to be slightly smaller than the minimum width of the Hoistway Shaft, to accommodate for manufacturing and assembly imperfections. For example, if the Hoistway Shaft measurements tolerance limit is +/−1 mm, then the length of the front and back Vacuum Seal Edge Frames 611 and 613 are chosen to be 1 mm shorter than the Hoistway Shaft intended width. Similarly, the length of the Vacuum Seal Side Frames 612 is 1 mm shorter than the Hoistway Shaft intended depth.

Based on the position of each Vacuum Seal Edge Frame within the Hoistway Shaft, a small rectangular air gap is being created, at each corner of the Cabin Vacuum Seal, between the Vacuum Seal and the Hoistway Shaft, due to variations of the Hoistway Shaft width and depth, that creates a small air leak through the said air gap. For practical reasons and for the tolerance limit examples provided above, the total area, through which an air leak through the Cabin Vacuum Seal may develop, is measured at up to 4 sq·mm. This value, relative to the air flow of the vacuum compressor is incredibly small and may be ignored in practical applications.

Trapezoid formed cross-section of the Cabin Vacuum Seal Edge Frames 611, 612 and 613 meant to repeat the form of the opening for the Vacuum Seal in the Cabin Head Outer Frame 620 and the Cabin Base Outer Frame 640, in an embodiment. The upper and lower horizontal planes of the Vacuum Seal Frame allow the Vacuum Seal to slightly float in and out of the Cabin Head Outer Frame 620 and the Cabin Base Outer Frame 640, being forced by the compression springs 615, thus, being constantly pressed against the Hoistway Shaft walls.

In summary, the "chess-like" locks at all corners of the Cabin Vacuum Seal limit the Vacuum Seal edge frames relative move in horizontal direction, also limit the amount of air leaks at the corners of the Vacuum Seal, while allowing the Vacuum Seal to "float" and adjust to the Hoistway Shaft shape at any altitude in the Hoistway. Hoistway Shaft dimensional fluctuations are being absorbed by this "chess-like" lock and a negligibly small air leak may escape the Vacuum Seal, as a result of Hoistway Shaft manufacturing and assembly variations. The wave-like form of Vacuum Seal Stripes allows substantially reducing the noise from the Vacuum Seal during operation.

Cabin's Dual Vacuum Seal Mechanism

In the Hoistway Application and as described herein, the Cabin Vacuum Seal may be built to ensure effective and low-noise Vacuum Seal operation.

One Vacuum Seal may be sufficient for Cabin's full operability—this is called the Main Vacuum Seal. The Main Vacuum Seal is located at Cabin's Head, as shown in FIG. 3, FIG. 6, FIG. 8, FIG. 50, FIG. 38, FIG. 49, FIG. 10, in an embodiment. During an operation of the Vacuum Compressor the Hoistway Shaft above the Main Vacuum Seal (Upper Hoistway Chamber) may be exposed to a vacuum, while the space below the Cabin (Lower Hoistway Chamber) and the space inside the Cabin may maintain normal atmospheric pressure for the comfort of its passengers.

The Main Vacuum Seal, besides shielding the Cabin atmospheric pressure from entering a lower pressure environment above the Cabin, has another role—it stabilizes Cabin's Head from shaking and vibrating during Cabin's motion, due to variations of the Hoistway, as the variations of the Hoistway are being absorbed by the floating Main Vacuum Seal.

In a similar manner, the Cabin's Base is "stabilized" too, to overcome possible Hoistway variations. In addition, the outer shape of the Cabin Base is smaller than the Hoistway Shaft shape and may become "loose" without proper stabilization.

In one embodiment the Cabin Base has roller wheels on compression springs and extended from the Cabin Base and being pressed against the Hoistway Shaft. These roller wheels may roll along the Hoistway Shaft during ascend and descend of the Cabin, absorbing the irregularities of the Hoistway Shaft walls and keeping Cabin's position intact, relative to the Hoistway cross-section.

In an alternate embodiment, a secondary vacuum seal (Secondary Vacuum Seal) is being installed at the Cabin base, replicating the Main Vacuum Seal, as shown in FIG. 3, FIG. 6-FIG. 49, FIG. 63, FIG. 10.

The Secondary Vacuum Seal is slightly different from the Main Vacuum Seal in that it has round openings for the Docking Pin mechanisms, as shown in FIG. 64.

Besides stabilizing the Cabin Base during Cabin's motion, the Secondary Vacuum Seal has another particularly important role: it is used in emergency situation of a sudden loss of vacuum and a deployment of emergency brakes (Emergency Brakes).

Upon deployment of Emergency Brakes, the Upper Hoistway Chamber may "build-up" air decompression with air pressure rapidly dropping below atmospheric, while the Lower Hoistway Chamber may "build-up" compressed air with pressure above atmospheric.

The Main Vacuum Seal of the Cabin shields the Cabin and its passengers from the low air pressure entering the Cabin from the Upper Hoistway Chamber, while the Secondary (lower) Vacuum Seal shields the Cabin and its passengers from the high air pressure entering the Cabin from the Lower Hoistway Chamber in an emergency situation of a free-fall scenario. As such, both Vacuum Seals create a "comfort zone" inside the Cabin, maintaining atmospheric pressure at all times, including during emergency brakes. The absence of the Secondary Vacuum Seal may create a discomfort for Cabin's passengers during emergency brakes, as the high air pressure below the Cabin may enter the Cabin, to the discomfort of its passengers, hence the usage of Secondary Vacuum Seal in emergency scenario.

It was shown that the Dual Vacuum Seal mechanism of employing the Main and Secondary Cabin Vacuum Seals ensures Cabin's stability during Cabin's motion and shields Cabin's passengers from low or high air pressure, that may be developed in Upper or Lower Hoistway Chambers during elevator operation or during emergency brakes.

What is claimed is:

1. An elevator apparatus comprising a cabin apparatus and a hoistway apparatus, the cabin apparatus comprising:
- a cabin head apparatus extending parallel to a cross-section of the hoistway apparatus;
- a base apparatus that supports load of the cabin apparatus;
- one or more side glass panels that are load-bearing and couple the cabin head apparatus with the base apparatus;
- wherein the one or more side glass panels are coupled to the cabin head apparatus using a plurality of linking elements inserted into a plurality of apertures extended through respective widths of the one or more side glass panels, thereby transferring, at least in part, the load of the cabin apparatus from the base apparatus through the one or more side glass panels to the cabin head apparatus;
- wherein air pressure inside the cabin apparatus is different from air pressure within at least a portion of the hoistway apparatus.

2. The elevator apparatus of claim 1, wherein the cabin apparatus further comprises a cabin door frame having one or more cabin doors;
- wherein the cabin apparatus has a cross section shape of:
- a triangle, resulting in a substantially triangular form of the cabin apparatus,
- a rectangle, resulting in a substantially rectangular form of the cabin apparatus,
- a pentagon, resulting in a substantially pentagonal form of the cabin apparatus,
- a hexagon, resulting in a substantially hexagonal form of the cabin apparatus,
- an octagon, resulting in a substantially octagonal form of the cabin apparatus,
- a circle, resulting in a substantially round tubular form of the cabin apparatus,
- an ellipse, resulting in a substantially ellipsoid tubular form of the cabin apparatus, or
- a horseshoe, resulting in a substantially ellipsoid tubular form of the cabin apparatus flattened on one side.

3. The elevator apparatus of claim 1,
- wherein each of the one or more side glass panels of the cabin apparatus having a top end and a bottom end;
- wherein the bottom end is coupled to the base apparatus of the cabin apparatus and the top end is coupled to the cabin head apparatus of the cabin apparatus.

4. The elevator apparatus of claim 3, wherein the one or more side glass panels of the cabin apparatus are coupled via fasteners to the base apparatus of the cabin apparatus at the bottom end and to the cabin head apparatus at the top end.

5. The elevator apparatus of claim 1,
- wherein the cabin head apparatus comprises a top panel coupled to the one or more side glass panels;
- wherein each side glass panel of the one or more side glass panels of the cabin apparatus has a bottom edge and a top edge, the top edge having one or more apertures of the plurality of apertures;
- wherein the top panel, having one or more side edges, is coupled to one or more frames along the one or more side edges;
- wherein the one or more frames extend vertically along the one or more side glass panels at least beyond the one or more apertures of said each side glass panel;
- wherein the one or more frames are coupled to said each side glass panel via one or more fasteners, of the plurality of linking elements, extending through the one or more apertures thereby coupling the top panel of the cabin apparatus to said each side glass panel via the one or more frames and the one or more fasteners.

6. The elevator apparatus of claim 1,
- wherein the cabin head apparatus comprises a top panel coupled to the one or more side glass panels;
- wherein the top panel and the one or more side glass panels are load-bearing for at least a portion of the load of the cabin apparatus.

7. The elevator apparatus of claim 6, wherein the one or more side glass panels or the top panel are made of a strengthened glass material.

8. The elevator apparatus of claim 7, wherein the strengthened glass material is made of tempered silicate or borosilicate glass.

9. The elevator apparatus of claim 6, wherein each edge of the one or more side glass panels of the cabin apparatus is coupled to a protective metallic frame.

10. The elevator apparatus of claim 9, wherein the protective metallic frame is made of strengthened aluminum alloy.

11. The elevator apparatus of claim 1, wherein the one or more side glass panels sustain tensile forces caused by bearing, at least in part, the load of the cabin apparatus of the cabin apparatus.

12. The elevator apparatus of claim 1, wherein the cabin apparatus further comprises at least one side panel having an inside surface and an outside surface, and a cabin door frame having at least one cabin door that is coupled to the at least one side panel; and wherein, when the at least one cabin door is in an open position, at least a portion of the at least one cabin door extends over at least a portion of the outside surface of the at least one side panel thereby creating an opening within the cabin door frame that has a width of the at least one cabin door.

13. A method by an elevator apparatus comprising a cabin apparatus and a hoistway apparatus, the method comprising:

generating an air pressure difference between inside the cabin apparatus and within a particular portion of the hoistway apparatus;

wherein the cabin apparatus comprises a cabin head apparatus extending parallel to a cross-section of the hoistway apparatus;

wherein the cabin apparatus further comprises a base apparatus that supports load of the cabin apparatus;

wherein the cabin apparatus further comprises one or more side glass panels that are load-bearing and couple the cabin head apparatus with the base apparatus;

wherein the one or more side glass panels are coupled to the cabin head apparatus using a plurality of linking elements inserted into a plurality of apertures extended through respective widths of the one or more side glass panels, thereby transferring, at least in part, the load of the cabin apparatus from the base apparatus through the one or more side glass panels to the cabin head apparatus.

14. The method of claim 13, wherein each of the one or more side glass panels of the cabin apparatus having a top end and a bottom end;

wherein the bottom end is coupled to the base apparatus of the cabin apparatus and the top end is coupled to the cabin head apparatus of the cabin apparatus.

15. The method of claim 13, wherein the cabin head apparatus comprises a top panel coupled to the one or more side glass panels;

wherein each side glass panel of the one or more side glass panels of the cabin apparatus has a bottom edge and a top edge, the top edge having one or more apertures of the plurality of apertures;

wherein the top panel, having one or more side edges, is coupled to one or more frames along the one or more side edges;

wherein the one or more frames extend vertically along the one or more side glass panels at least beyond the one or more apertures of said each side glass panel;

wherein the one or more frames are coupled to said each side glass panel via one or more fasteners, of the plurality of linking elements, extending through the one or more apertures thereby coupling the top panel of the cabin apparatus to said each side glass panel via the one or more frames and the one or more fasteners.

16. The method of claim 13, wherein the cabin head apparatus comprises a top panel coupled to the one or more side glass panels;

wherein the top panel and the one or more side glass panels are load-bearing for at least a portion of the load of the cabin apparatus.

17. The method of claim 13, wherein the one or more side glass panels sustain tensile forces caused by bearing a portion of the load of the cabin apparatus.

18. The method of claim 13, wherein the cabin apparatus further comprises at least one side panel having an inside surface and an outside surface, and a cabin door frame having at least one cabin door that is coupled to the at least one side panel; and wherein, when the at least one cabin door is in an open position, at least a portion of the at least one cabin door extends over at least a portion of the outside surface of the at least one side panel thereby creating an opening within the cabin door frame that has a width of the at least one cabin door.

19. The method of claim 13, wherein the particular portion of the hoistway apparatus is a top portion of the hoistway apparatus that is at least in part above the cabin apparatus, the method further comprising:

generating low air pressure in the top portion of the hoistway apparatus;

wherein the top portion of the hoistway apparatus is separated from a bottom portion of the hoistway apparatus at least by a portion of the cabin head apparatus;

wherein the generating of the low air pressure in the top portion of the hoistway apparatus causes higher air pressure at the bottom portion of the hoistway apparatus than at the top portion of the hoistway apparatus thereby causing the cabin apparatus to ascend through the hoistway apparatus.

20. The method of claim 19, further comprising decreasing air pressure difference between the top portion and the bottom portion of the hoistway apparatus thereby causing the cabin apparatus to descend through the hoistway apparatus.

21. The method of claim 19, wherein air pressure difference between the top portion of the hoistway apparatus and the bottom portion of the hoistway apparatus exerting a force opposite to gravitational force of the cabin apparatus onto the cabin head apparatus of the cabin apparatus thereby causing the cabin head apparatus to bear, at least in part, of the load of the cabin apparatus.

22. The method of claim 19, wherein air pressure difference between the top portion of the hoistway apparatus and the bottom portion of the hoistway apparatus exerts tensile forces on the one or more side glass panels of the cabin apparatus.

* * * * *